(12) United States Patent
Conrad

(10) Patent No.: US 10,422,449 B2
(45) Date of Patent: Sep. 24, 2019

(54) METHOD OF JOINING PIPES AND FITTINGS

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton, Ontario (CA)

( * ) Notice: Subject to any disclaimer, the term of this patent is extended or adjusted under 35 U.S.C. 154(b) by 1021 days.

(21) Appl. No.: 14/851,189

(22) Filed: Sep. 11, 2015

(65) Prior Publication Data

US 2016/0076682 A1 Mar. 17, 2016

(30) Foreign Application Priority Data

Sep. 12, 2014 (CA) ..................... 2863272

(51) Int. Cl.
*F16L 13/10* (2006.01)
*F16L 47/02* (2006.01)
(Continued)

(52) U.S. Cl.
CPC ............ *F16L 13/103* (2013.01); *B29C 65/18* (2013.01); *B29C 66/0042* (2013.01); *B29C 66/1222* (2013.01); *B29C 66/1224* (2013.01); *B29C 66/52241* (2013.01); *B29C 66/52292* (2013.01); *B29C 66/7392* (2013.01);
(Continued)

(58) Field of Classification Search
CPC ........ B29C 66/52241; B29C 66/81455; B29C 65/18; B29C 66/81471; B29C 66/0042; B29C 66/1222; B29C 66/1224; B29C 66/52292; B29C 66/7392; F16L 13/103; F16L 17/10; F16L 21/08; F16L 47/02; F16L 47/03; F16L 47/32; F16L 41/021; F16L 43/008; B32B 2262/0253;
(Continued)

(56) References Cited

U.S. PATENT DOCUMENTS 2,961,363 A 11/1960 Lowes
3,305,420 A * 2/1967 Brownlee ........... B29C 43/3642
100/211
(Continued)

FOREIGN PATENT DOCUMENTS

DE 102009061082 A1 5/2012
WO 2011045607 4/2011

*Primary Examiner* — Bayan Salone
(74) *Attorney, Agent, or Firm* — Philip C. Mendes da Costa; Bereskin & Parr LLP/S.E.N.C.R.L. s.r.l.

(57) ABSTRACT

A method for joining a first conduit section with a second conduit section. The method includes: a) inserting a first end of the second conduit section in an open first end of the first conduit section with a gasket extending between an inner surface of the first conduit section and an outer surface of the second conduit section; b) positioning a flexible substrate having a bonding agent provided on at least a portion of an inner side of the flexible substrate to extend from an outer surface of the first conduit to an outer surface of the second conduit; c) applying pressure to the flexible substrate whereby the bonding agent is pressed against an outer surface of the first and second conduit sections; and d) heating the bonding agent whereby the bonding agent is secured to the outer surface of the first and second conduit sections.

21 Claims, 63 Drawing Sheets

(51) Int. Cl.
| | |
|---|---|
| *F16L 47/03* | (2006.01) |
| *F16L 47/32* | (2006.01) |
| *F16L 41/02* | (2006.01) |
| *F16L 43/00* | (2006.01) |
| *F16L 21/08* | (2006.01) |
| *F16L 17/10* | (2006.01) |
| *B29C 65/18* | (2006.01) |
| *B32B 5/02* | (2006.01) |
| *B32B 15/02* | (2006.01) |
| *B32B 15/08* | (2006.01) |
| *B32B 15/18* | (2006.01) |
| *B32B 15/20* | (2006.01) |
| *B32B 27/12* | (2006.01) |
| *B32B 27/30* | (2006.01) |
| *B32B 27/36* | (2006.01) |
| *B32B 27/40* | (2006.01) |
| *B32B 1/08* | (2006.01) |
| *B32B 3/26* | (2006.01) |
| *B29C 65/00* | (2006.01) |

(52) U.S. Cl.
CPC .. *B29C 66/81455* (2013.01); *B29C 66/81471* (2013.01); *B32B 1/08* (2013.01); *B32B 3/266* (2013.01); *B32B 5/022* (2013.01); *B32B 5/024* (2013.01); *B32B 15/02* (2013.01); *B32B 15/08* (2013.01); *B32B 15/18* (2013.01); *B32B 15/20* (2013.01); *B32B 27/12* (2013.01); *B32B 27/308* (2013.01); *B32B 27/36* (2013.01); *B32B 27/40* (2013.01); *F16L 17/10* (2013.01); *F16L 21/08* (2013.01); *F16L 41/021* (2013.01); *F16L 43/008* (2013.01); *F16L 47/02* (2013.01); *F16L 47/03* (2013.01); *F16L 47/32* (2013.01); *B29C 66/5344* (2013.01); *B29C 66/71* (2013.01); *B29C 66/8122* (2013.01); *B32B 2260/021* (2013.01); *B32B 2260/046* (2013.01); *B32B 2262/02* (2013.01); *B32B 2262/0238* (2013.01); *B32B 2262/0253* (2013.01); *B32B 2262/0269* (2013.01); *B32B 2262/06* (2013.01); *B32B 2262/08* (2013.01); *B32B 2262/101* (2013.01); *B32B 2262/106* (2013.01); *B32B 2307/54* (2013.01); *B32B 2307/546* (2013.01); *B32B 2597/00* (2013.01)

(58) Field of Classification Search
CPC ........... B32B 2260/046; Y10T 29/4943; Y10T 29/49432; Y10T 29/49435; Y10T 29/49425
See application file for complete search history.

(56) References Cited

U.S. PATENT DOCUMENTS

| | | | |
|---|---|---|---|
| 3,307,997 A | 3/1967 | Detrick | |
| 3,475,239 A * | 10/1969 | Foss | B29C 65/022 |
| | | | 252/183.14 |
| 3,663,335 A | 5/1972 | Sheedy | |
| 3,751,308 A | 8/1973 | Bishop et al. | |
| 3,847,694 A | 11/1974 | Stewing | |
| 3,854,756 A | 12/1974 | Couch | |
| 3,929,538 A | 12/1975 | Diebel | |
| 3,957,382 A | 5/1976 | Greuel et al. | |
| 3,996,091 A * | 12/1976 | Daunt | B29C 33/02 |
| | | | 156/285 |
| 4,132,578 A | 1/1979 | Gell | |
| 4,191,407 A | 3/1980 | Bretone | |
| 4,274,662 A | 6/1981 | de Groot et al. | |
| 4,585,607 A | 4/1986 | Krackeler et al. | |
| 4,657,287 A * | 4/1987 | Nimke | F16L 21/005 |
| | | | 285/373 |
| 4,804,209 A | 2/1989 | Fisher | |
| 4,852,914 A | 8/1989 | Lyall | |
| 4,880,579 A | 11/1989 | Murata | |
| 5,158,327 A | 10/1992 | Rowe | |
| 5,182,440 A | 1/1993 | Dufour et al. | |
| 5,333,916 A * | 8/1994 | Burkit | F16L 17/10 |
| | | | 138/99 |
| 5,443,056 A | 8/1995 | Smith et al. | |
| 5,466,916 A * | 11/1995 | Iguchi | B29C 37/0082 |
| | | | 156/274.2 |
| 5,487,411 A | 1/1996 | Goncalves | |
| 5,532,459 A | 7/1996 | Steinmetz | |
| 5,921,587 A | 7/1999 | Lueghamer | |
| 6,000,436 A * | 12/1999 | Auvil | B29C 47/28 |
| | | | 138/109 |
| 6,059,319 A * | 5/2000 | Wyke | B29C 65/344 |
| | | | 219/535 |
| 6,431,282 B1 | 8/2002 | Bosma et al. | |
| 6,652,690 B1 * | 11/2003 | Rovira | B29C 35/04 |
| | | | 126/263.05 |
| 7,338,085 B2 | 3/2008 | Toriyabe et al. | |
| 2002/0100540 A1* | 8/2002 | Savitski | B29C 65/1435 |
| | | | 156/157 |
| 2003/0080561 A1 | 5/2003 | Martin | |
| 2004/0251575 A1 | 12/2004 | St. Onge et al. | |
| 2006/0197338 A1 | 9/2006 | Ziu | |
| 2007/0051016 A1* | 3/2007 | Zorin | A43B 3/24 |
| | | | 36/11.5 |
| 2008/0257604 A1 | 10/2008 | Becker et al. | |
| 2009/0173441 A1* | 7/2009 | Lutz | B29C 65/485 |
| | | | 156/296 |
| 2010/0212766 A1 | 8/2010 | Kiest | |
| 2011/0168289 A1 | 7/2011 | Kourogi et al. | |
| 2011/0197987 A1 | 8/2011 | Koravos et al. | |
| 2012/0048417 A1 | 3/2012 | Smith et al. | |

\* cited by examiner

METHOD OF JOINING PIPES AND FITTINGS

CROSS-REFERENCE TO RELATED APPLICATIONS

This application claims foreign priority benefits under 35 U.S.C. § 119 (a)-(d) to Canadian Patent Application no. 2,863,272, filed on Sep. 12, 2014, which is hereby incorporated by reference in its entirety.

FIELD

This disclosure relates generally to the connection of pipes and fittings that are used to convey a fluid, and more particularly to a mechanical restraint member to secure components of a piping system to each other and methods for joining pipes and fittings that involves the application of the mechanical restraint member.

INTRODUCTION

Piping systems are used to convey liquids and/or gasses to, between, or within, residential, commercial, and/or industrial buildings. For example, most municipalities have a piping system for providing potable and/or non-potable water from one or more reservoirs, pumping stations, and/or water towers to one or more buildings (e.g. residential, commercial, or industrial) and/or other locations (e.g. fire hydrants). Other examples of municipal piping systems include sanitary sewers, storm sewers, and the like.

Typically, piping systems are made up of a number of components including straight or curved pipe sections, fittings (e.g. elbow fittings, T-junctions, straight connectors and the like), valves, etc. to provide an interior flow path for the liquid being conveyed. The pipe sections and fittings may be fabricated from concrete, ductile iron, plastics such as polyvinyl chloride (PVC), polyethylene or polypropylene, and/or a combination of these materials. Typically, a piping system (such as a system comprising thermoplastic pipes), is assembled such that the components are joined in a manner that provides a durable connection that prevents or inhibits the components from separating or cracking due to mechanical, thermal, and/or hydraulic stresses applied to the piping system. Separation of any of the components of the piping system or cracking of any element of the piping system may permit fluid to leak out of the piping system and, e.g., thereby damage the surrounding structure and/or pollute the ground water.

Municipal piping systems (e.g. potable water distribution systems) often operate with relatively high internal hydraulic pressures and flow rates. When coupling components of a piping system together (e.g. two lengths of pipe, a length of pipe to a fitting or a valve) the joint must resist both forces imposed by the internal hydraulic pressure of the water (e.g. internal fluid pressure which tends to separate the coupled components) and those forces imposed by a flowing mass of liquid within the piping system when it changes direction. These combined forces tend to both separate the joint and to also force the liquid out of the joint. In addition, the joint must resist external forces that may be applied, such as by movement of the ground in which the piping system is located, e.g., due to settling of the soil and the like.

Joint architectures in general use include insertion fits, wherein one end of one part of a piping system is inserted into an open end of another part of the piping system. For example, in bell and spigot type couplings, an end of a pipe is inserted into a socket or bell of another pipe that receives the pipe end therein. To capture and hold or restrain the pipe end within the recess, a separate fitting may be used to secure the components of the piping system together. Types of fittings in general use today include push-on joint fittings and mechanical joint fittings.

A push-on joint fitting is exemplified by U.S. Pat. No. 3,963,298. As disclosed therein, a push-on joint fitting receives a pipe end and frictionally holds the pipe end within a bell of the push-on fitting. In use, a gasket is placed inside the bell in a gasket seat and the pipe is then inserted into the bell past the gasket. A considerable force is typically required to insert the pipe end past the gasket. Accordingly, a jacking mechanism may be attached to the pipe end and the bell in order to force the tapered end of the pipe past the gasket until the pipe bottoms out in the socket. The assembly of push-on fittings can be complicated and time consuming.

Typically, mechanical joint fittings utilize a flange provided on both components that are to be connected together, e.g., the end of a pipe and a bell of the fitting in which the pipe end is to be inserted. The flanges have axial bolt holes. In use, the pipe end may be inserted into the bell with minimal force until the pipe end bottoms out in the socket. The gasket may then be inserted into the gasket seat of the bell, where it is caulked or pounded into place as necessary. A gland may be brought into position touching the gasket. T-bolts may then be inserted into holes provided in the flanges and then tightened. The bolts are typically tightened in a star pattern. The use of external fittings requires care to ensure that the bolts are tightened to the required degree. A further issue is that many fittings are installed in a trench, making access to the bolts on the bottom of the joint a problem.

Once an installation is complete (e.g. a piping system is buried under a road), accessing the piping system to repair a leak is typically time consuming and expensive.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

This disclosure sets out methods for joining components of a piping system (e.g. pipes, fittings, and the like) utilizing a mechanical restraint member located directly on the exterior surface of the components that resists axial outward movement of the components. The disclosure also sets out a mechanical restraint member that may be utilized as well and a pipe securing apparatus that may be used and an apparatus for examining a joint so made.

In one broad aspect, the mechanical restraint member is positioned on the outer surface of the components so as to extend from one component to the other component to thereby inhibit or prevent axial outward movement of the components. Accordingly, once two piping system conduits have been joined together, such as by using an insertion fit, a restraint member extending in the axial direction is applied to the outer surface of the conduits to inhibit or prevent the conduits from moving away from each other wherein the restraint member is located essentially at the outer wall of the conduits.

In accordance with this aspect, the restraint member may be bonded or chemically adhered to the outer surface of the conduits. An advantage of this design is that a mechanical member is not physically secured to an outer wall of a conduit, such as by wedges that are inserted into an external groove of a pipe, or the like. An axially extending member that is bonded or chemically adhered to the outer surface enables the loading to be applied over a larger surface area and thereby reduces point stresses that may otherwise occur. Therefore, the area of contact between the restraint member and the components is greater than in typical designs in common use today. This allows the restraining force to be distributed over a relatively large area, and thereby decreases the high load-per-unit-area on the components of the piping system that may be produced by typical designs in common use today. In particular, the area of contact between typical mechanical joint fittings and the components being restrained is relatively small (e.g. point contact loads where discrete mechanical fasteners such as wedges and the like press into the outer surface of the pipe). The axial restraint force provided by such typical mechanical joint fittings is transmitted through a relatively small area of the component's surface which may result in localized loading at these points of contact that can be quite high, imposing a relatively high load-per-unit-area. This requires that the portion of the wall of the conduit on which these point loads are applied have sufficient structural integrity to absorb the axial stresses so that a fluid tight seal is maintained at the joint. In addition, the point loads may also impose a relatively high inward radial stress on the wall of the component, in addition to the axial stresses resulting from the restraining forces being transferred to the components by the mechanical joint fittings.

Another advantage of this design is that the restraint member is radially located at (or directly adjacent) the position at which the outward axial forces (e.g., the hydrostatic pressure internal of the piping system once in use) are applied. In contrast, typical mechanical joint fittings use flanges or collars through which bolts to secure the components together. These bolts are located radially outwardly of the pipe as they are inserted into flanges that are applied to the components. Therefore, the axial restraint force provided by the bolts is transmitted radially inwardly by the flanges to the components. One problem with this design is that localized angular point loading is applied at the juncture of the flange and the axial wall of the component. In particular, a moment arm is created by the flange, and the wall of the component must be design to withstand the increased stress produced by the moment arm.

Another advantage of this design is that the restraint member does not mechanically penetrate the wall of the components being restrained. In contrast, typical mechanical joint fittings use mechanical attachment means that are inserted into grooves provided in the outer wall of the piping system component, or may otherwise penetrate at least a portion of the outer wall. One problem that this may create is that the effective thickness of the wall of the piping system component is decreased, which leads to the component having a lower strength.

In accordance with this aspect, the restraint member may be bonded or chemically adhered to the outer surface of the conduits. An advantage of this design is that a mechanical member is not physically secured to an outer wall of a conduit, such as by wedges that are inserted into an external groove of a pipe, of the like. An axially extending member that is bonded or chemically adhered to the outer surface enables the loading to be applied over a larger surface area and thereby reduces point stresses that may otherwise occur.

Various types of mechanical restraint members may be used. Generally, a mechanical restraint member comprises a flexible substrate bonded by a bonding agent to the outer surface of each of the piping system components that are used to form a joint. The bonding agent may be selected based on the composition of the substrate and the components that are to be joined together. It will be appreciated that the type of flexible substrate and/or the type and amount of bonding agent used to secure a joint may vary, depending on the requirements of the joint to be restrained. For example, a mechanical restraint member may be provided around most or substantially all of the outer perimeter of the joint being restrained. Alternatively, the mechanical restraint member may only be applied to a portion of the perimeter of the joint. For example, multiple mechanical restraint members that are spaced apart may be applied around a joint.

In one embodiment, a mechanical restraint member suitable for use with a plastic piping system such as a thermoplastic piping system may comprise a woven or non-woven synthetic-fiber substrate, such as fiberglass or carbon fiber, bonded to the piping system components using a thermally activated bonding agent, such as a thermoplastic or thermoset resin.

The bonding agent may be any composition that may chemically secure the flexible substrate to a component of the piping system. The bonding agent may be in the nature of an adhesive (which may be a thermally activated or solvent based adhesive) or the same material or a material that is compatible with, the material from which the components are made. For example, if the components that are to be joined together are made of polyvinylchloride (PVC), then the bonding agent may be PVC or a compatible plastic. Accordingly once the outer wall of the component and the bonding agent are heated, the PVC may blend together to form a unitary assembly (the substrate, the bonding agent and the component) once the PVC cools and solidifies. It will be appreciated that the method used to activate the bonding agent will vary depending upon the nature of the bonding agent.

It will be appreciated that if the components that are to be joined together are made of different materials, then the flexible substrate may contain two or more different bonding agents. For example, considered in the axial direction, one half may have a bonding agent suitable for the first component to which it will be applied and the other half may have a different bonding agent suitable for the second component to which it will be applied.

The mechanical restraint members described herein may be applied to a connected, but unrestrained joint in a piping system by wrapping or otherwise positioning a sheet or sheets of the flexible substrate comprising the bonding agent about the joint to be restrained, and then applying both heat (to activate the bonding agent) and pressure (to promote a good bond) to the sheet or sheets until the bonding agent has sufficiently cured.

In one method of application, a pressure cuff which may have an integrated heating element may be wrapped around the joint once the sheet(s) of flexible substrate are in position, and the pressure cuff may automatically apply the proper amount of temperature and pressure to provide a good quality bond.

An advantage over traditional methods of restraining piping system components is that by chemically—as opposed to mechanically—bonding the mechanical restraint member to the piping system components, the risk of deformation, cracking, or other structural damage to the piping system components during installation are significantly reduced (if not eliminated).

Another advantage is that since the area of bonded contact of mechanical restraint member with the piping system components will generally be much greater than in traditional methods, known structural issues relating to e.g. point loading may be alleviated or eliminated.

The mechanical restraint member may be used with piping system components may be made of concrete, metal, or plastic materials known in the piping arts. The plastic material may be a thermoplastic material and may be one or more of acrylonitrile butadiene styrene (ABS), PVC, chlorinated PVC (CPVC), ethylene vinyl acetate (EVA), polyethylene (PE), and the like. Preferred materials comprise PVC and/or CPVC.

In accordance with one broad aspect, there is provided a method for joining a first conduit section having an open first end and an inner surface with a second conduit section having an outer surface, the method comprising: a) inserting a first end of the second conduit section in the open first end of the first conduit section with a gasket extending between the inner surface of the first conduit section and the outer surface of the second conduit section; b) positioning a flexible substrate having an activatable bonding agent provided on at least a portion of an inner side of the flexible substrate to extend from an outer surface of the first conduit to an outer surface of the second conduit; c) applying pressure to the flexible substrate whereby the bonding agent is pressed against an outer surface of the first and second conduit sections; and, d) activating the bonding agent whereby the bonding agent is secured to the outer surface of the first and second conduit sections.

In accordance with another broad aspect, there is provided a method for joining a first conduit section having an open first end and an inner surface with a second conduit section having an outer surface, the method comprising: a) inserting a first end of the second conduit section in the open first end of the first conduit section with a gasket extending between the inner surface of the first conduit section and the outer surface of the second conduit section; b) positioning a flexible substrate on each of the first and second conduits with an activatable bonding agent positioned between an inner side of the flexible substrate and an outer surface of each of the first conduit and the second conduit; c) applying pressure to the flexible substrate whereby the bonding agent is pressed against an outer surface of the first and second conduit sections while the bonding agent bonds to the outer surface of the first and second conduit sections.

In some embodiments, at least some of the activatable bonding agent is positioned between an inner side of the flexible substrate and an outer surface of each of the first conduit and the second conduit prior to the pressure being applied.

In some embodiments, at least some of the activatable bonding agent is positioned between an inner side of the flexible substrate and an outer surface of each of the first conduit and the second conduit after the pressure is applied.

In some embodiments, the step of positioning the flexible substrate comprises wrapping the flexible substrate around the exterior surface of the first and second conduits.

In some embodiments, the flexible substrate is secured in position by an adhesive after the flexible substrate has been wrapped around the exterior surface of the first and second conduits.

In some embodiments, the adhesive is a releasable adhesive whereby the flexible adhesive is repositionable.

In some embodiments, the step of applying pressure comprises positioning an inflatable member around an exterior surface of the flexible substrate and inflating the inflatable member.

In some embodiments, the inflatable member comprises an inflatable annular member and the method further comprises sliding the inflatable member along one of the conduit sections and positioning the inflatable member to overlie at least a portion of the flexible substrate.

In some embodiments, the inflatable member comprises a longitudinally extending member having a first portion that is securable to a second portion and the method further comprises wrapping the longitudinally extending member around at least one of the conduit sections and securing the first portion to the second portion such that the inflatable member overlies at least a portion of the flexible substrate.

In some embodiments, the flexible substrate includes an inflatable member and the step of applying pressure comprises inflating the inflatable member.

In some embodiments, the flexible substrate comprises a plurality of discrete members and step (b) comprises positioning each of the discrete members on an outer portion of each of the first and second conduits.

In some embodiments, the activatable bonding agent is a thermally activatable bonding agent and the step of activating the bonding agent comprises applying heat to the bonding agent.

In some embodiments, the step of applying heat to the bonding agent comprises applying heat to the bonding agent from an external source.

In some embodiments, the external source comprises one or more of a resistive heating element, an exothermic reactive composition, an infrared source or a microwave source.

In some embodiments, the step of applying pressure comprises positioning an apparatus comprising an inflatable member around an exterior surface of the flexible substrate and inflating the inflatable member and the apparatus includes the external heat source.

In some embodiments, the flexible substrate incorporates at least one of a resistive heating element and an exothermic reactive composition and the step of heating the bonding agent comprises activating the at least one of the resistive heating element and the exothermic reactive composition.

In some embodiments, the first and second conduit sections comprise a thermoplastic material that has a melting temperature and the heating step comprises heating the bonding agent to a temperature above a melting point of the bonding agent.

In some embodiments, the melting temperature of the bonding agent is less than the melting temperature of the first conduit section and the second conduit section and the method further comprises heating the bonding agent to a temperature less that the melting temperature of the first conduit section and the second conduit section.

In some embodiments, the activatable bonding agent is settable at room temperature and the step of activating the bonding agent comprises exposing the bonding agent to the ambient.

In some embodiments, the activatable bonding agent is a thermally activatable bonding agent and the method further comprises applying heat to the bonding agent.

In some embodiments, the step of applying heat to the bonding agent comprises applying heat to the bonding agent from an external source.

In some embodiments, the external source comprises one or more of a resistive heating element, an exothermic reactive composition, an infrared source or a microwave source.

In some embodiments, the step of applying pressure comprises positioning an apparatus comprising an inflatable member around an exterior surface of the flexible substrate and inflating the inflatable member and the apparatus includes the external heat source.

In some embodiments, the flexible substrate incorporates at least one of a resistive heating element and an exothermic reactive composition and the step of heating the bonding agent comprises activating the at least one of the resistive heating element and the exothermic reactive composition.

In some embodiments, the first and second conduit sections comprise a thermoplastic material that has a melting temperature and the heating step comprises heating the bonding agent to a temperature above a melting point of the bonding agent.

In some embodiments, the melting temperature of the bonding agent is less than the melting temperature of the first conduit section and the second conduit section and the method further comprises heating the bonding agent to a temperature less that the melting temperature of the first conduit section and the second conduit section.

In some embodiments, the activatable bonding agent is settable at room temperature and the method further comprises exposing the bonding agent to the ambient.

In accordance with another broad aspect, there is provided a method for joining a first conduit section having an open first end and an inner surface with a second conduit section having an outer surface, the method comprising: a) inserting a first end of the second conduit section in the open first end of the first conduit section with a gasket extending between the inner surface of the first conduit section and the outer surface of the second conduit section; b) positioning a first flexible substrate on the first conduit section with an activatable bonding agent positioned between an inner side of the first flexible substrate and an outer surface of the first conduit section; c) positioning a second flexible substrate on the second conduit section with an activatable bonding agent positioned between an inner side of the second flexible substrate and an outer surface of the second conduit section; d) applying pressure to the first flexible substrate whereby the bonding agent is pressed against an outer surface of the first conduit section while the bonding agent bonds to the outer surface of the first conduit section; and, e) applying pressure to the second flexible substrate whereby the bonding agent is pressed against an outer surface of the second conduit section while the bonding agent bonds to the outer surface of the second conduit section; and, f) securing the first and second flexible substrates together.

In some embodiments, each of the first and second flexible substrates comprises a connection member and the step of securing the first and second flexible substrates together comprises tensioning at least one tie member that engages each of the connection members.

In some embodiments, the at least one tie member comprises a plurality of rigid connection members and the method further comprises tightening each of the rigid connection members.

In some embodiments, the at least one tie member comprises a flexible elongate member and the method further comprises engaging the flexible elongate member with the connection members and tensioning the flexible elongate member.

In some embodiments, the first flexible substrate is secured in position by an adhesive after the first flexible substrate has been positioned on the first conduit section.

In some embodiments, the adhesive is a releasable adhesive whereby the adhesive is repositionable.

In some embodiments, the steps of applying pressure comprise positioning an inflatable member around an exterior surface of the flexible substrate and inflating the inflatable member.

In some embodiments, the inflatable member comprises an inflatable annular member and the method further comprises sliding the inflatable member along one of the conduit sections and positioning the inflatable member to overlie at least a portion of the first or second flexible substrate.

In some embodiments, the inflatable member comprises a longitudinally extending member having a first portion that is securable to a second portion and the method further comprises wrapping the longitudinally extending member around at least one of the conduit sections and securing the first portion to the second portion such that the inflatable member overlies at least a portion of the first or second flexible substrate.

In some embodiments, the first flexible substrate includes an inflatable member and step (d) comprises inflating the inflatable member.

In some embodiments, the first flexible substrate comprises a plurality of discrete members and step (b) comprises positioning each of the discrete members on an outer portion of the first conduit section.

In some embodiments, the activatable bonding agent is a thermally activatable bonding agent and the steps of activating the bonding agent comprise applying heat to the bonding agent.

In some embodiments, the steps of applying heat to the bonding agent comprise applying heat to the bonding agent from an external source.

In some embodiments, the external source comprises one or more of a resistive heating element, an exothermic reactive composition, an infrared source or a microwave source.

In some embodiments, the steps of applying pressure comprise positioning an apparatus comprising an inflatable member around an exterior surface of the flexible substrate and inflating the inflatable member and the apparatus includes the external heat source.

In some embodiments, the first flexible substrate incorporates at least one of a resistive heating element and an exothermic reactive composition and the steps of heating the bonding agent comprise activating the at least one of the resistive heating element and the exothermic reactive composition.

In some embodiments, the first and second conduit sections comprise a thermoplastic material that has a melting temperature and the heating steps comprise heating the bonding agent to a temperature above a melting point of the bonding agent.

In some embodiments, the melting temperature of the bonding agent is less than the melting temperature of the first conduit section and the second conduit section and the method further comprises heating the bonding agent to a temperature less that the melting temperature of the first conduit section and the second conduit section.

In some embodiments, the activatable bonding agent is settable at room temperature and the step of activating the bonding agent comprises exposing the bonding agent to the ambient.

It will be appreciated by a person skilled in the art that a method or apparatus disclosed herein may embody any one or more of the features contained herein and that the features may be used in any particular combination or sub-combination.

These and other aspects and features of various embodiments will be described in greater detail below. The apparatus and methods described herein may be used to connect pipes and/or fittings of various materials (e.g. metallic pipes, thermoplastic pipes) to create piping systems for transporting various liquids or gasses. It will be appreciated that the piping system that uses the restraint member may be made from different materials (e.g., the pipes may be made of PVC and/or CPVC and the fittings may be made of metal). Alternatively, the piping system components (or at least their inner surfaces through which fluid is conveyed) may be made of the same material.

Furthermore, the apparatus and methods may be applied to different sizes of piping, and/or piping systems made of the same or different materials, and therefore may be applicable to piping systems for domestic or commercial uses, such as conveying potable water, non-potable or waste water, or other liquids and/or gasses.

BRIEF DESCRIPTION OF THE DRAWINGS

For a better understanding of the described embodiments and to show more clearly how they may be carried into effect, reference will now be made, by way of example, to the accompanying drawings in which.

Figure 1A:
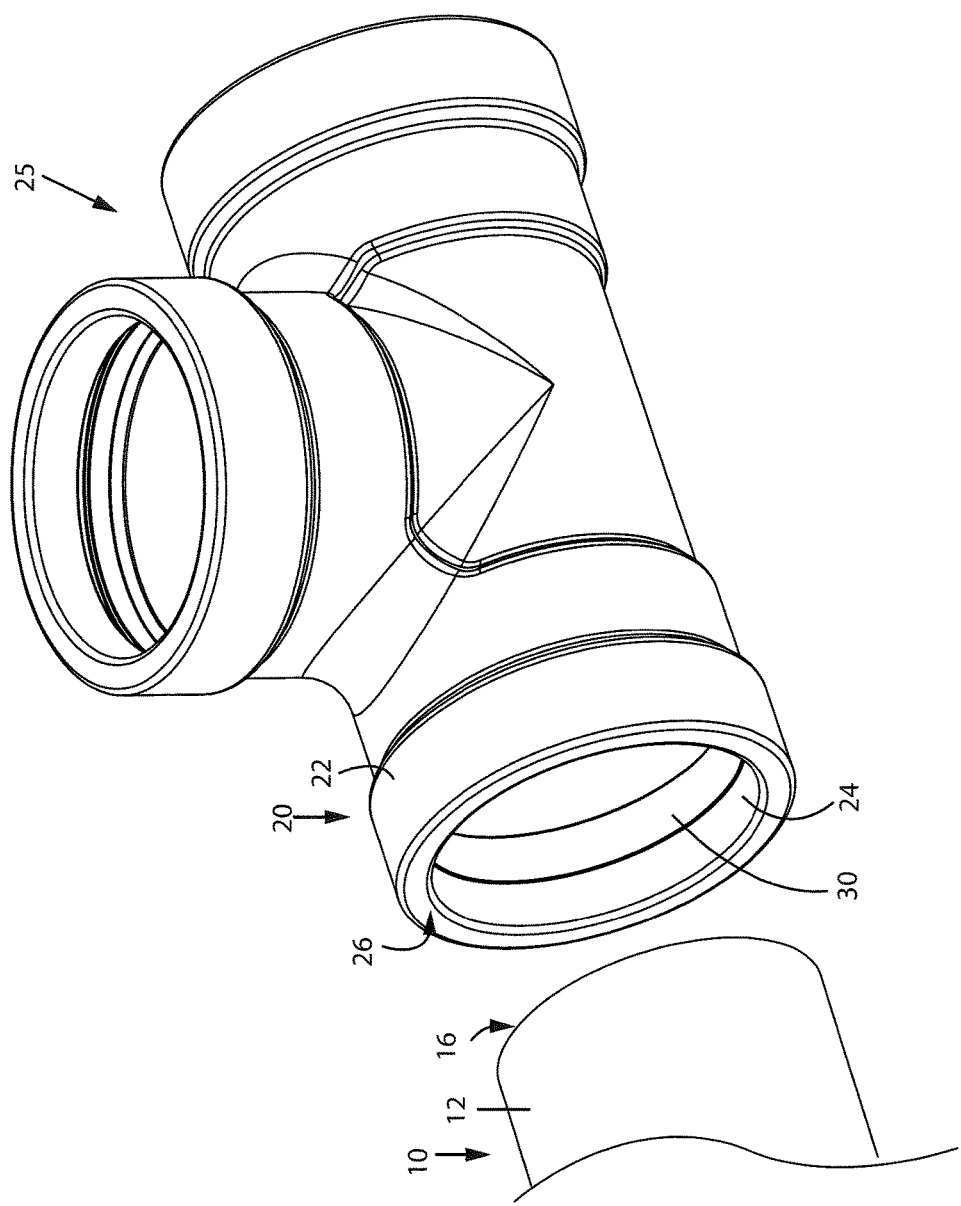
FIG. 1a is a perspective view of a pipe end positioned for installation within a T-fitting as is known in the prior art.
Figure 1B:
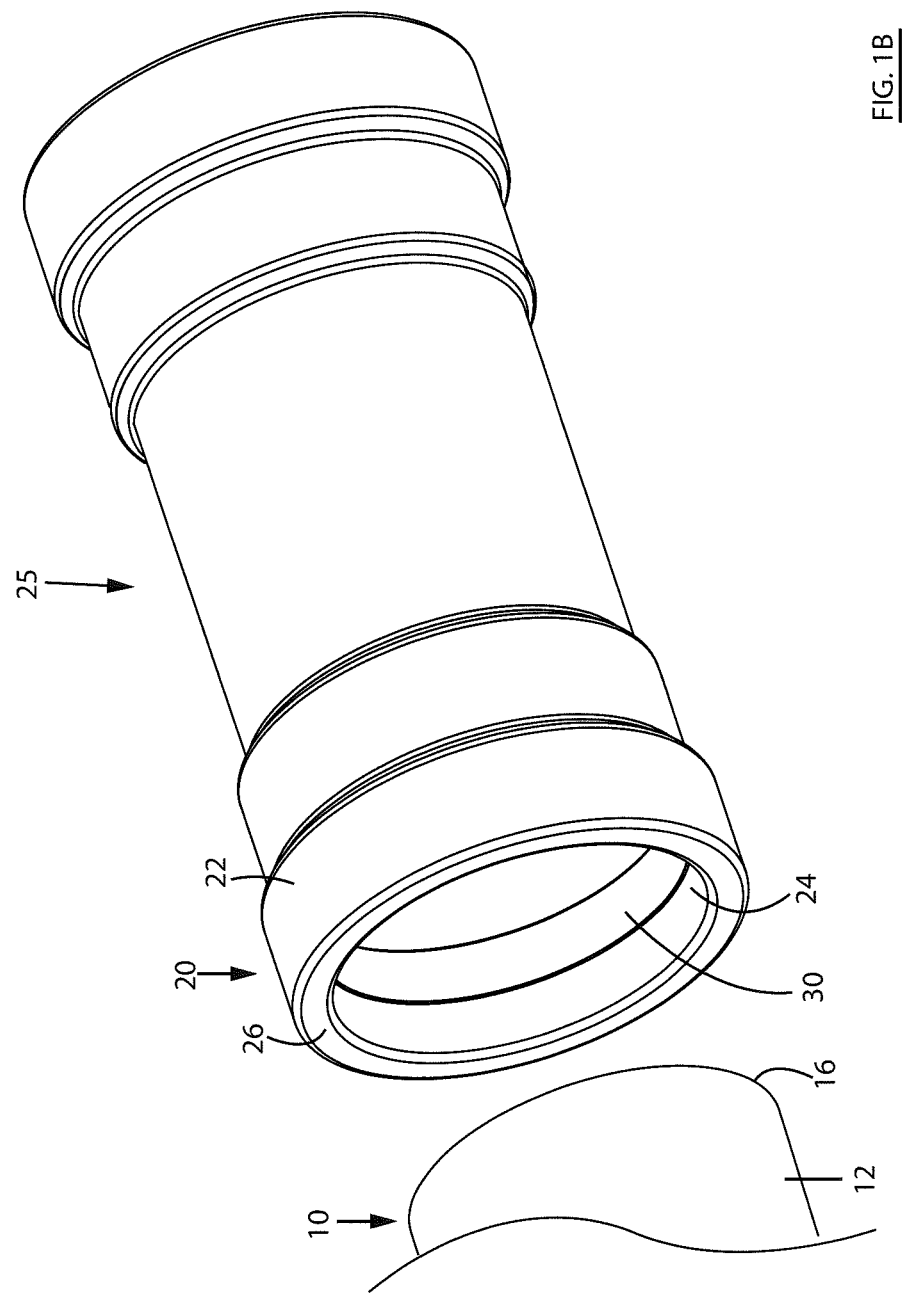
FIG. 1b is a perspective view of a pipe end positioned for installation within a straight conduit as is known in the prior art.
Figure 1C:
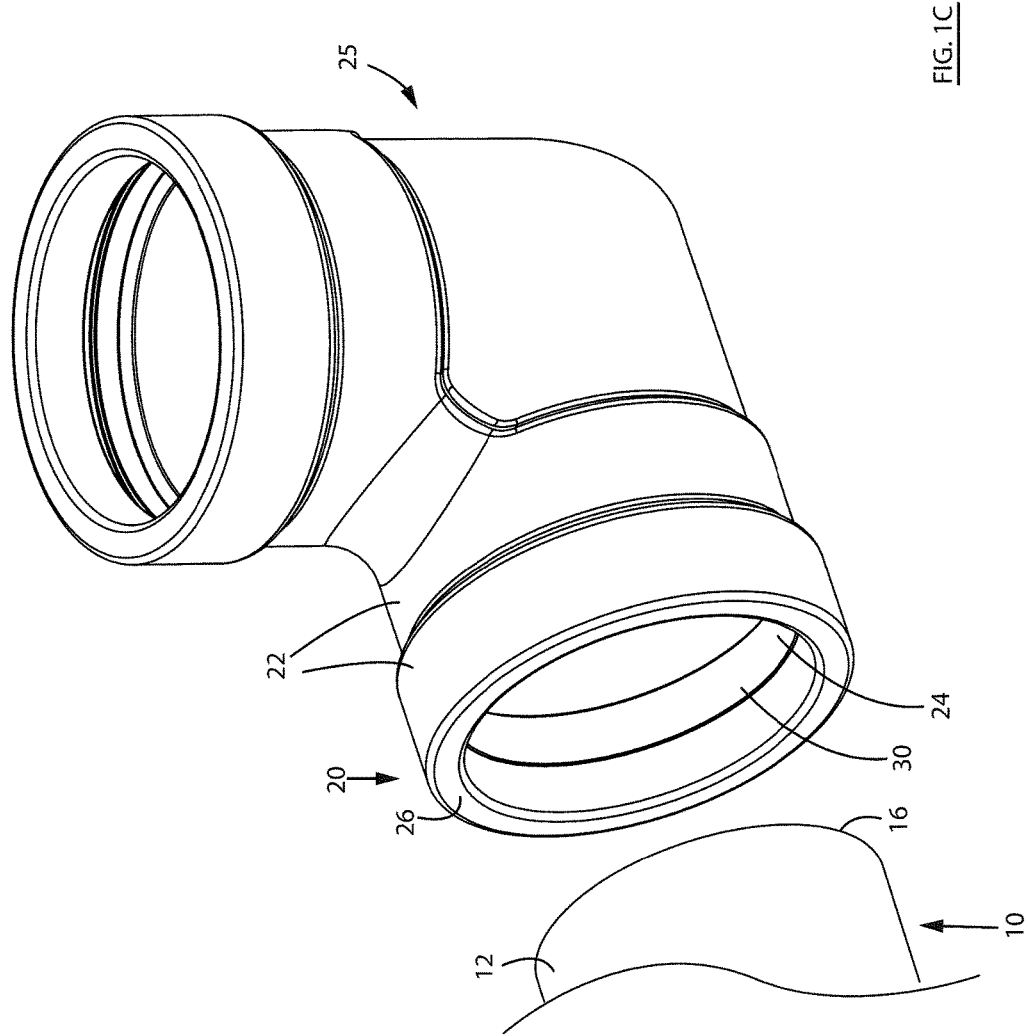
FIG. 1c is a perspective view of a pipe end positioned for installation within an elbow joint as is known in the prior art.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

The apparatuses, methods and compositions may be used with piping systems made of various materials. The piping system components, e.g. the pipes and/or fittings to be connected, may be made of concrete, fiberglass, a metal such as cast iron, steel, copper, stainless steel, titanium, zirconium and the like, and/or a plastic material (including a thermoplastic material), such as polypropylene, polystyrene, nylon, polycarbonate, acrylonitrile butadiene styrene (ABS), PVC, CPVC, ethylene vinyl acetate (EVA), polyethylene (PE), high density polyethylene, ultrahigh molecular weight polyethylene or the like. In one particular embodiment, the piping system components are made of plastic. In one particular embodiment, the plastic is a thermoplastic material.

The drawings exemplify the use of the restraint member to connect a section of pipe to a T-junction. It will be appreciated that the same restraint member may be used to connect any parts of a piping system together. For example, the restraint member may be used to connect two sections of pipe to each other, to connect a pipe with a fitting such as a valve, tees, couplers, elbows and the like, or to connect one fitting with another fitting.

The drawings exemplify the use of the restraint member with piping system components that are engaged using an insertion fit. It will be appreciated that other engagement systems, such as a butt joint, may be used Typical Mechanical Joint Fitting FIGS. 1a to 3 illustrate an insertion fit, i.e., one end of one part of a piping system (e.g. pipe 10) is inserted into an open end of another part of the piping system (e.g. fitting 25). As exemplified, end 16 of the pipe 10 is inserted into opening 20 of fitting 25, which may be a T-junction as exemplified in FIG. 1a, a straight conduit as exemplified in FIG. 1b, an elbow joint as exemplified in FIG. 1c, or any other fitting.

Preferably, pipe end 16 and opening 20 are dimensioned so that there is sufficient clearance between the outer surface 12 of pipe end 10 and the inner surface 24 of opening 20 to allow the pipe end to be inserted without requiring the application of undue axial force to pipe 10 and/or fitting 25. Typically clearances are provided in the American Society for Testing and Materials (ASTM) standards.

Figure 2:
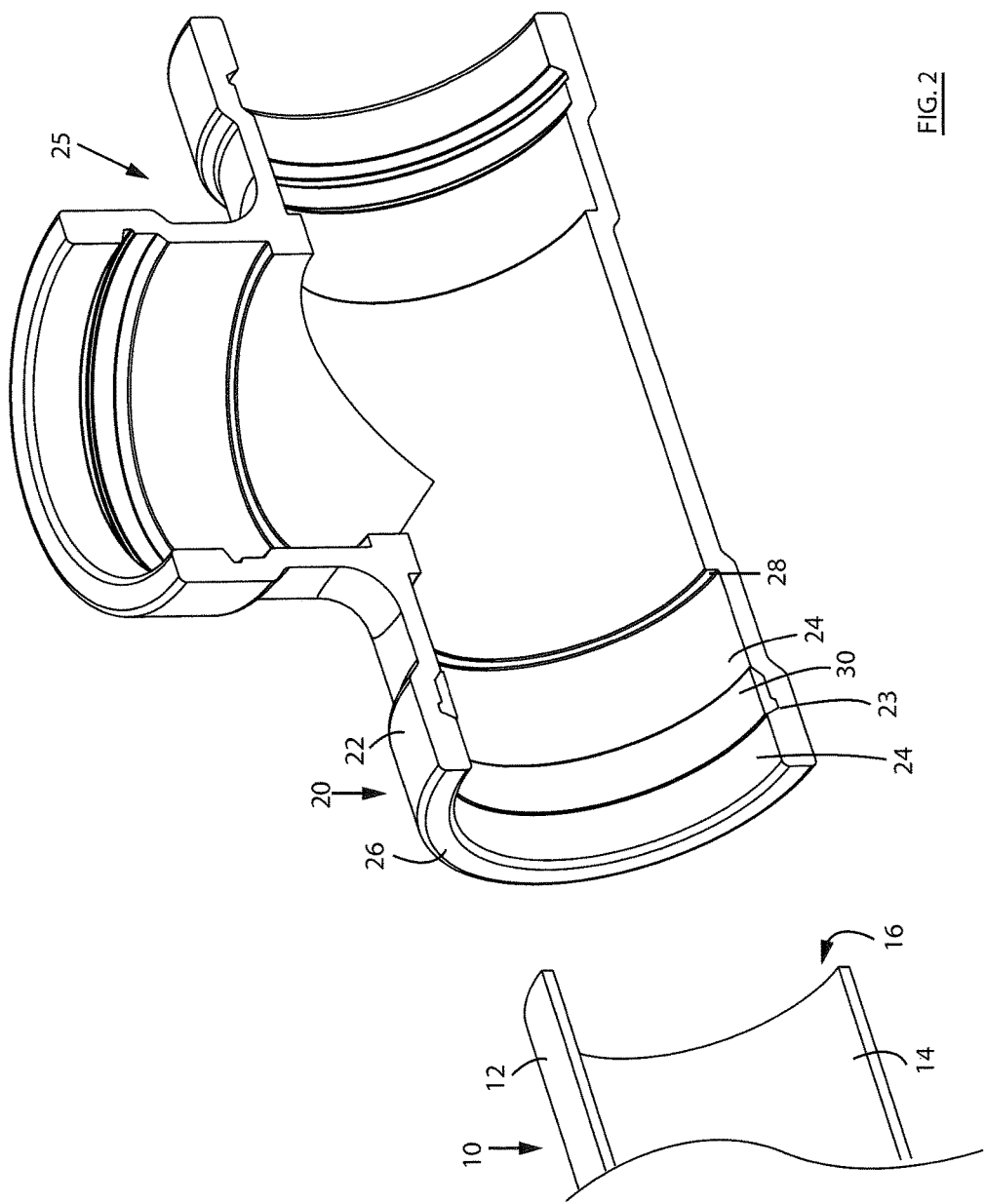
FIG. 2 is a perspective cross-section view of FIG. 1.
Figure 3:
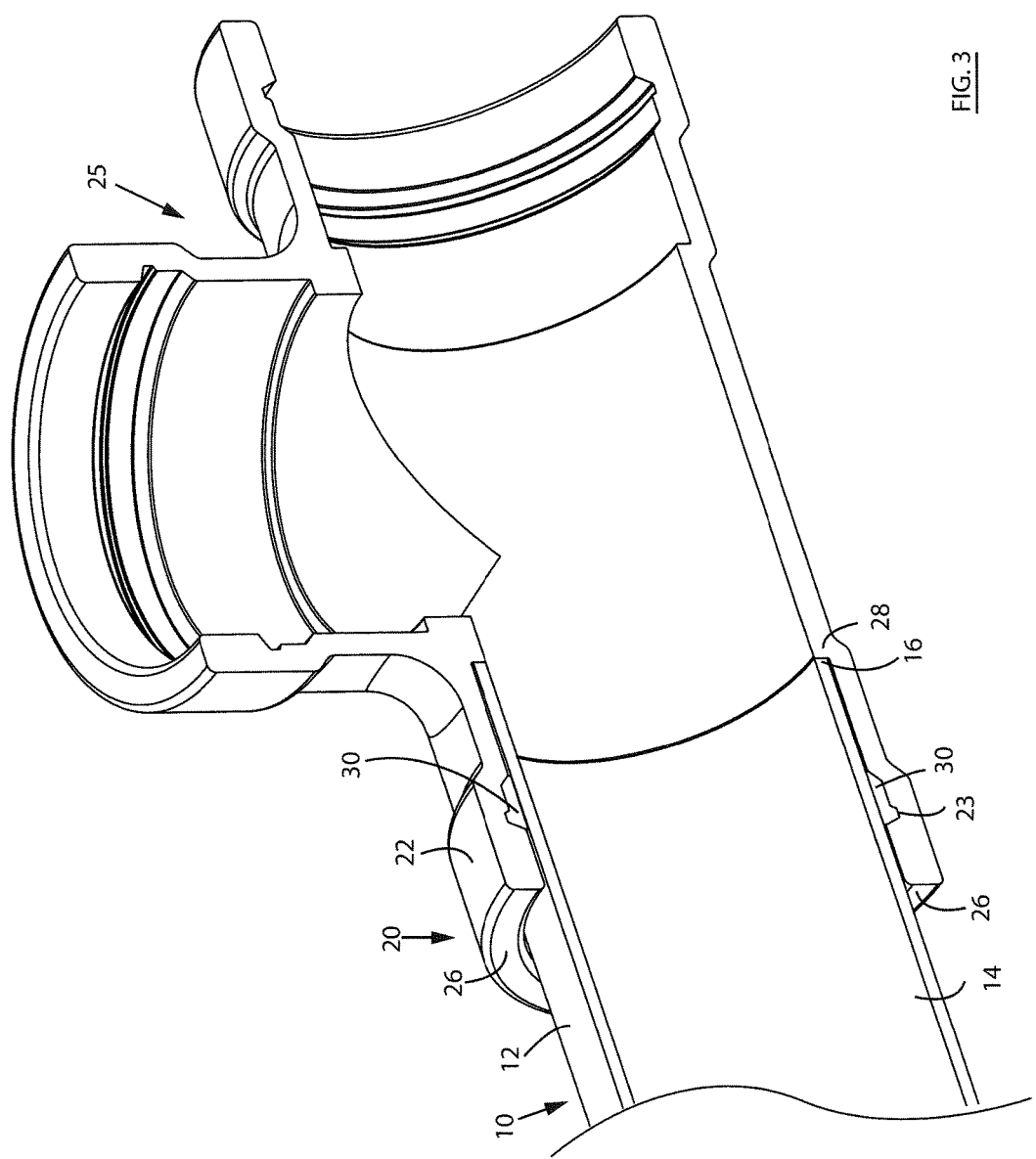
FIG. 3 is a perspective cross-section view of the pipe end and T-fitting of FIG. 1, with the pipe end inserted into the T-fitting.

One or more annular gaskets 30 (e.g. O-rings) may be provided between outer surface 12 of pipe 10 and inner surface 24 of opening 20 to ensure a fluid-tight seal is provided. As shown in FIGS. 2 and 3, an annular groove 23 may be provided on inner surface 24 of opening 20 to receive gasket 30 and to restrain the axial movement of gasket 30 during insertion of pipe 10. It will be appreciated that other alternative configurations for providing a gasket between pipe 10 and fitting 25 may be used. For example, a groove or other surface feature may be provided on the outer surface 12 of pipe 10, and gasket 30 may be positioned around pipe 10 prior to its insertion into opening 20.

Fitting 25 may be configured such that an end 16 of a pipe 10 may be inserted only up to a predetermined distance into fitting 25. This may assist in aligning one or more features (e.g. grooves, gaskets) of the fitting and/or the pipe end with each other. Therefore, a stop member may be provided inside fitting 25. For example, as exemplified in FIG. 2, in some embodiments fitting 25 may comprise an interior ridge 28 that provides an abutment surface against which a pipe end inserted into opening 20 will abut when inserted a predetermined distance, to assist in coupling fitting 25 to a pipe end, as shown in FIG. 3. It will be appreciated that interior ridge 28 may have a height that is similar to or the same as the thickness of the pipe 10 inserted into opening 20. Accordingly, the cross sectional area of flow through the pipe and the fitting is generally the same.

If a liquid at a sufficiently high internal hydraulic pressures and/or sufficiently high flow rates is conveyed through pipe 10 and fitting 25, the joint must resist both forces imposed by the internal hydraulic pressure of the liquid (e.g. internal fluid pressure which tends to separate the coupled components) and those forces imposed by a flowing mass of liquid within the piping system when it changes direction. These combined forces tend to both separate the joint and to also force the liquid out of the joint. Thus, the components of the piping system (e.g. pipe 10 and fitting 25) should be restrained relative to each other to prevent their separation, and to maintain the integrity of the joint.

Figure 4:
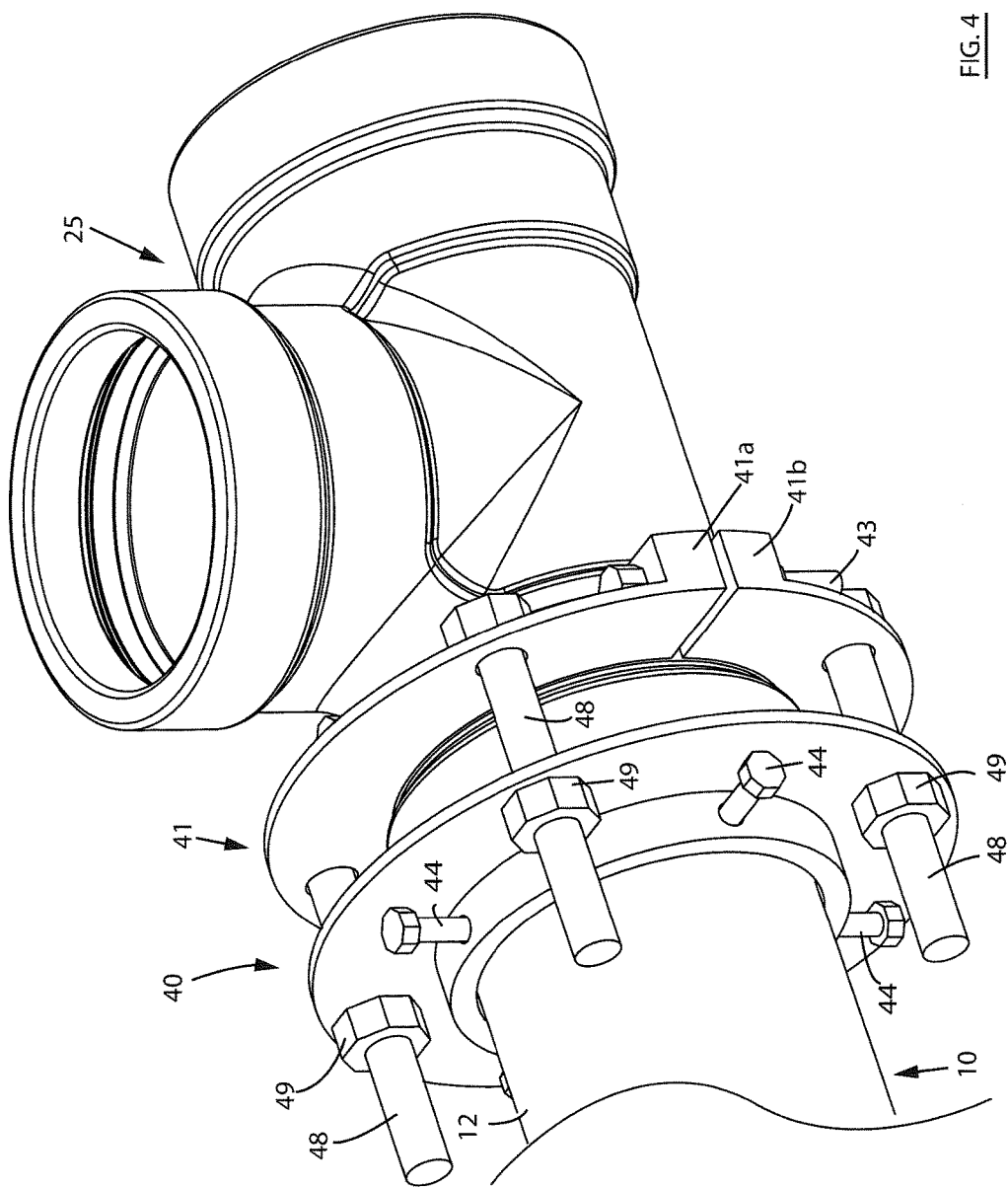
FIG. 4 is a perspective view of the pipe end and T-fitting of FIG. 3 secured using a traditional bolt-on collar.
Figure 5:
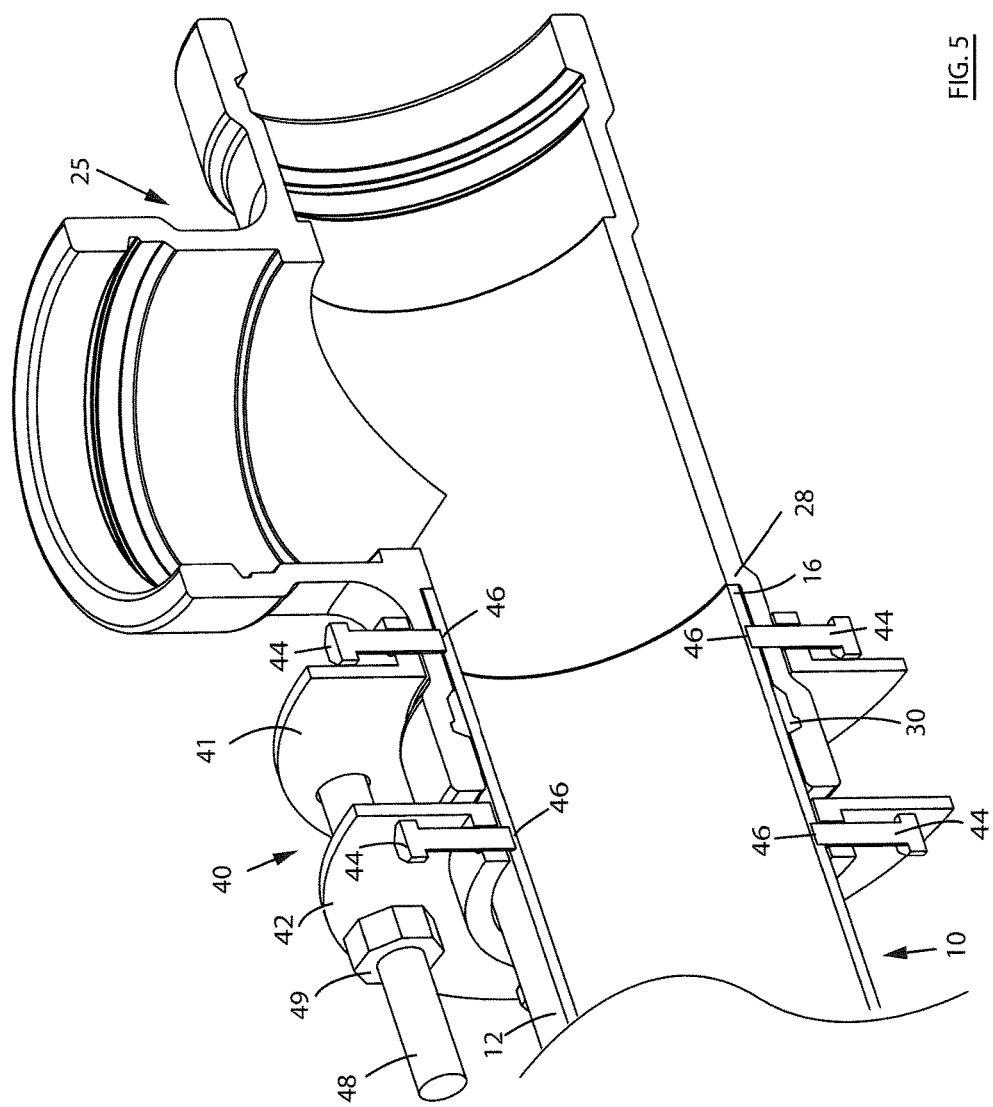
FIG. 5 is a cross-section view of FIG. 4.

FIGS. 4 and 5 exemplify a mechanical joint fitting apparatus 40 for securing two components of a piping system, according to a known method. Generally, a ring-shaped member 41, 42 is secured to each of the components (in this case fitting 25 and pipe 10, respectively), and then the ring-shaped-members are secured to each other to prevent the piping system components from separating.

In the illustrated example, ring-shaped member 41 is formed by securing two semi-circular portions 41a, 41b to each other about fitting 25 using one or more fastener 43, while ring-shaped member 42 is a unitary ring that is slid over pipe 10. The ring-shaped members 41, 42 are secured to fitting 25 and pipe 10, respectively, using a plurality of fasteners 44. Grooves or other recesses may be present on the outer surfaces 22, 12 of the fitting 25 and pipe 10, respectively at the points of contact 46 between the fasteners 44 and the piping system components. It will be appreciated that ring-shaped members 41, 42 may be flanges that are integrally formed with fitting 25 and pipe 10. Finally, bolts 48 and nuts 49 are used to restrain the relative position of the ring-shaped members 41, 42 to each other, and thus secure the relative position of pipe 10 and fitting 25.

While such an apparatus may be effective in securing the pipe and fitting (i.e. restraining the components from being separated), such an apparatus (and/or its method of installation) may have one or more disadvantages as discussed previously.

Construction of a Mechanical Restraint Member

Reference is now made to FIGS. 6 to 15, which exemplify different embodiments of a mechanical restraint member 100, each of which may be made by (or used with) the methods disclosed herein. Mechanical restraint member 100 may be used by itself or with one or more of: the application method, the pipe securing apparatus 200, and the quality control module 300 disclosed herein.

Mechanical restraint member 100 includes a flexible substrate, referred to generally as 110, and a bonding agent 120 for securing the flexible substrate 110 to components of the piping system that are to be secured to each other (i.e. restrained from separating), as will be discussed further subsequently.

Flexible substrate 110 may be made from any suitable material that has sufficient tensile strength to restrain the piping system components from separating due the anticipated outward axial forces imposed during operation of the piping system. For example, the tensile strength of flexible substrate 110 should be at least equal to the expected load (e.g. the total expected static and dynamic pressure in the piping system during operation of the piping system, multiplied by the internal cross sectional pipe area). Preferably, the tensile strength of flexible substrate 110 is between 1 to 5, 1.5 to 5, 1 to 1.5, or 3 to 5 times the expected load, to provide an acceptable safety margin.

It will be appreciated that the flexible substrate may be made of one or more of metal (e.g. a metal foil, a sheet of perforated metal, a metal mesh, and the like), a woven fabric, and a non-woven fabric. The woven fabric and non-woven fabrics may comprise a natural or synthetic fiber.

If the flexible substrate is made of a solid member, e.g., a sheet of metal, then the sheet may be perforated so as to provide openings through which the bonding agent may pass. Accordingly, the perforations or other openings provide locations through which the bonding agent may flow so as to increase the axial loads that may be restrained by the restraint member. For example, the bonding agent may flow through the openings and surround or encase both axially extending sides of the sheet, thereby essentially immersing the sheet in the bonding agent. Once the bonding agent solidifies (e.g. sets) or cures, the bonding agent may be secured to both axially extending sides of the sheet and also provide a solid member that extends through the openings to provide an additional portion that inhibits axial movement.

Alternatively, the flexible substrate may be porous, such as a porous material or a mesh material (e.g., woven metal wires or fibers, a plastic mesh, or the like). Once again, the bonding agent may flow through the pores or openings provided in the material.

In some cases, the bonding agent may not be able to flow through the substrate (e.g., the substrate is solid, or may have pores or openings that are too small to permit the bonding agent to enter into the substrate). In such a case, the adhesion between the inner surface of the substrate and the bonding agent provides the required mechanical strength to enable the mechanical restraint member to function.

Figure 42:
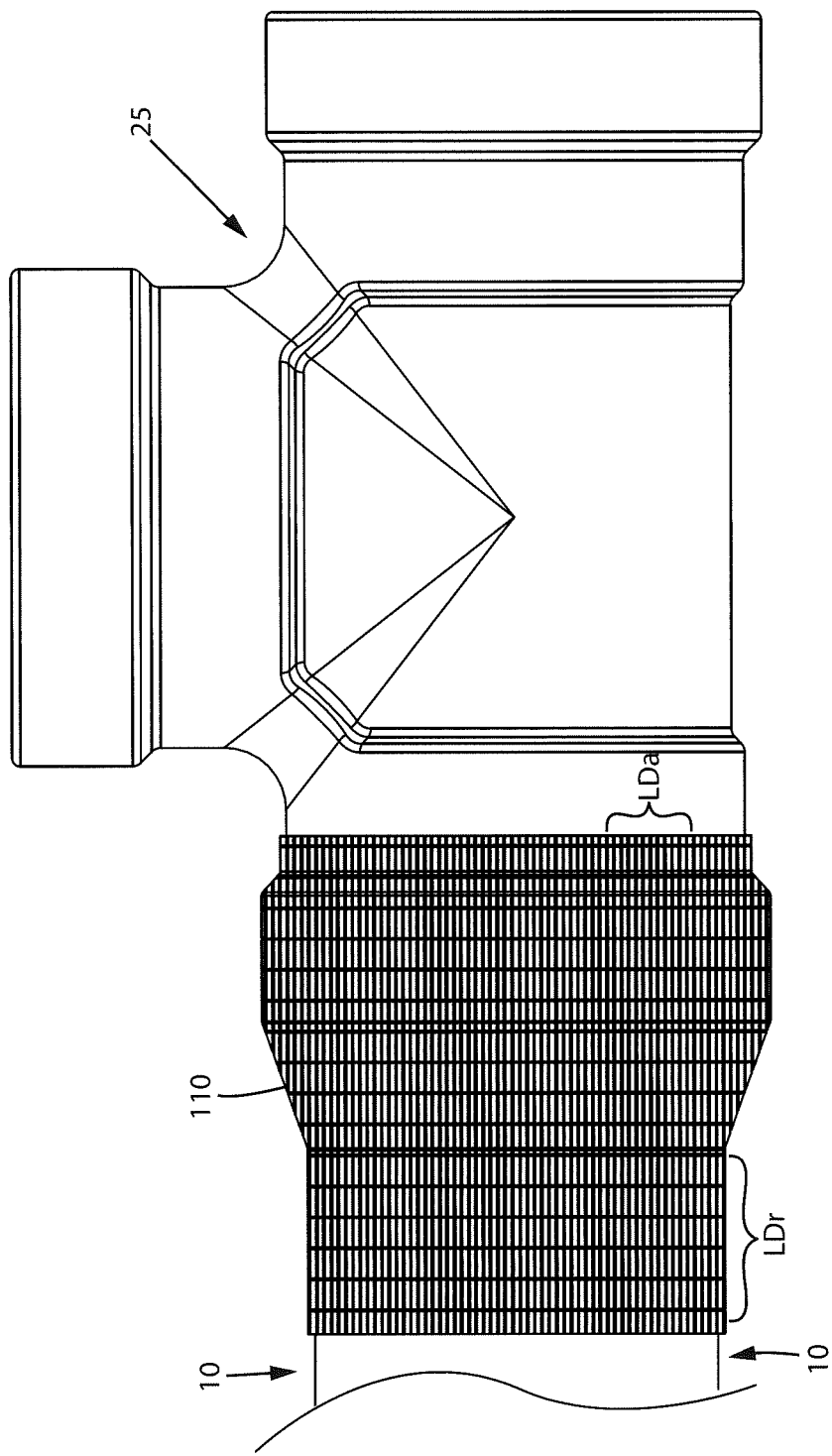
FIG. 42 is a side view of a flexible substrate with an oriented component aligned with a pipe end and a fitting in accordance with another embodiment.

If flexible substrate 110 is provided as a woven fabric, the weave may or may not have an oriented component to provide enhanced tensile strength of the flexible substrate 110 in one or more directions. This would allow the flexible substrate 110 to be bonded to the joint with a direction of relatively high strength aligned with the direction of the highest expected loading. For example, as illustrated in FIG. 42, flexible substrate 110 may have a first linear density, or linear mass density, $LD_r$ in the radial direction, and a second linear density, or linear mass density, $LD_a$ in the axial direction. This would allow the flexible substrate 110 to be bonded to the joint with a direction of relatively high strength (e.g. higher linear density) aligned with the direction of the highest expected loading (e.g. axially).

Examples of suitable materials include metals (e.g., steel, stainless steel, aluminum, brass, copper, and the like), fiberglass (e.g. E-glass, S-glass, E-CR-glass), carbon fiber, aramid fiber (e.g. Kevlar™, Twaron), ultra-high-molecular-weight polyethylene (UHMWPE) (e.g. Spectra®, Dyneema®), polycarbonate, polypropylene, polyethylene, PVC, CPVC, Teflon™, and the like.

The fabric may have a thickness that provides sufficient tensile strength based on the expected loading, while maintaining sufficient flexibility. For example, if the flexible substrate 110 comprises S-glass, it may have a weight density in the range of 9-64 oz/ft$^2$, or 18-36 oz/ft$^2$.

Flexible substrate 110 is provided with a first bonding agent 120. The bonding agent may be applied to a surface of the flexible substrate or it may be impregnated therein. The bonding agent comprises a chemical or thermal bonding agent that is compatible with the first and second conduits.

Bonding agent 120 may be a thermoplastic or a thermoset material, such as polyurethanes (PUR), or reactive urethanes, polyesters, polyacrylates, methyl acrylates (solvented or unsolvented), latex-based, or gelatin-based adhesives.

Bonding agent 120 may be a thermally activated bonding agent. Such bonding agents may be a plastic (e.g. a thermoplastic or a thermoset material). Accordingly, the bonding agent may be a plastic that will melt, at least partially, and adhere to the respective conduit. Accordingly, a thermally activated bonding agent may have the same composition as the conduit. Alternatively, it may be an adhesive that is activated when heated so as to adhere to the conduit. The bonding agent may comprises a thermal plastic urethane. Testing using the Polyurethane Reactive (PUR) EZ 250150 adhesive available from 3M showed acceptable performance.

Bonding agent 120 may alternatively be a chemically activated bonding agent (e.g. a multi-component adhesive that forms an adhesive when the components are combined), such as polyester resin/polyurethane resin, polyols/polyurethane resin, and acrylic polymers/polyurethane resin combinations, and the like.

It will be appreciated that some bonding agents may be activated or catalyzed at least partly by modes other than thermal or chemical activation (e.g. at room temperature). For example, bonding agent 120 may be a light curing adhesive, such as a UV curing adhesive, or a moisture curing adhesive, which may begin to cure in the presence of moist air. Accordingly, bonding agent 120 may be applied to flexible substrate 110 in a controlled environment, such as a dry air environment, and packaged in a moisture and/or light impermeable container, such as a sealed foil bag. Flexible substrate 110 may be transported and stored in such packaging, and only removed shortly or immediately before use. For example, the bonding agent may be activated by exposure to the ambient. For example, the bonding agent may be a solvent based adhesive which bonds to the conduit when the solvent evaporates. In such a case, the bonding agent may be maintained in an air tight container until use.

Bonding agent 120 may be provided as a thin layer of material. For example, bonding agent 120 may have a thickness of from 0.002 to 0.250 inches, more preferably from 0.005 to 0.080 inches, more preferably from 0.010 to 0.040 inches, and most preferably from 0.015 to 0.025 inches. An advantage of this design is that a relatively small amount of heat may be required to melt or activate the bonding agent and accordingly only the outer portion of the wall of the conduit may be melted.

In some embodiments, bonding agent 120 may have a melting or activation temperature that is proximate that, and optionally less than, the melting temperature of the conduit to which it is applied. For example, the bonding agent may have a melting or activation temperature that is approximately equal to, or from 100% to 110%, from 100% to 105%, or from 100% to 102% of the melting temperature of the conduit to which it is to be attached (wherein the percentage is a percentage of the melting temperature of the conduit). An advantage of this design is that only the outermost portion of the conduit will undergo slight melting and this will limit the extent to which the pipe may be degraded by heating. For example, the conduit may have a wall thickness of, e.g., 0.5-1.5 inches and only the outmost 25%, or 20%, or 15%, or 10%, or 2-5% of the wall may be heated above its melting point during bonding of the flexible substrate 110 to the conduit.

Alternatively, the bonding agent may have a melting or activation temperature that is below the melting temperature of the conduit to which it is to be attached, from 99% to 95%, from 95% to 90%, from 90% to 80%, or from 80% to 70% of the melting temperature of the conduit to which it is to be attached. An advantage of this design is that the outer surface of the conduit my not undergo melting during the bonding process. It will be appreciated that, in other cases, the melting or activation temperature may be substantially below the melting temperature of the conduit to which it is to be attached.

While the bonding agent may be provided on all portions of the inner surface of flexible substrate 110, it will be appreciated that, as will be discussed further subsequently with respect to FIGS. 33-40, in some embodiments, bonding agent 120 may be provided only on portions of the inner surface of flexible substrate 110.

Figure 6:
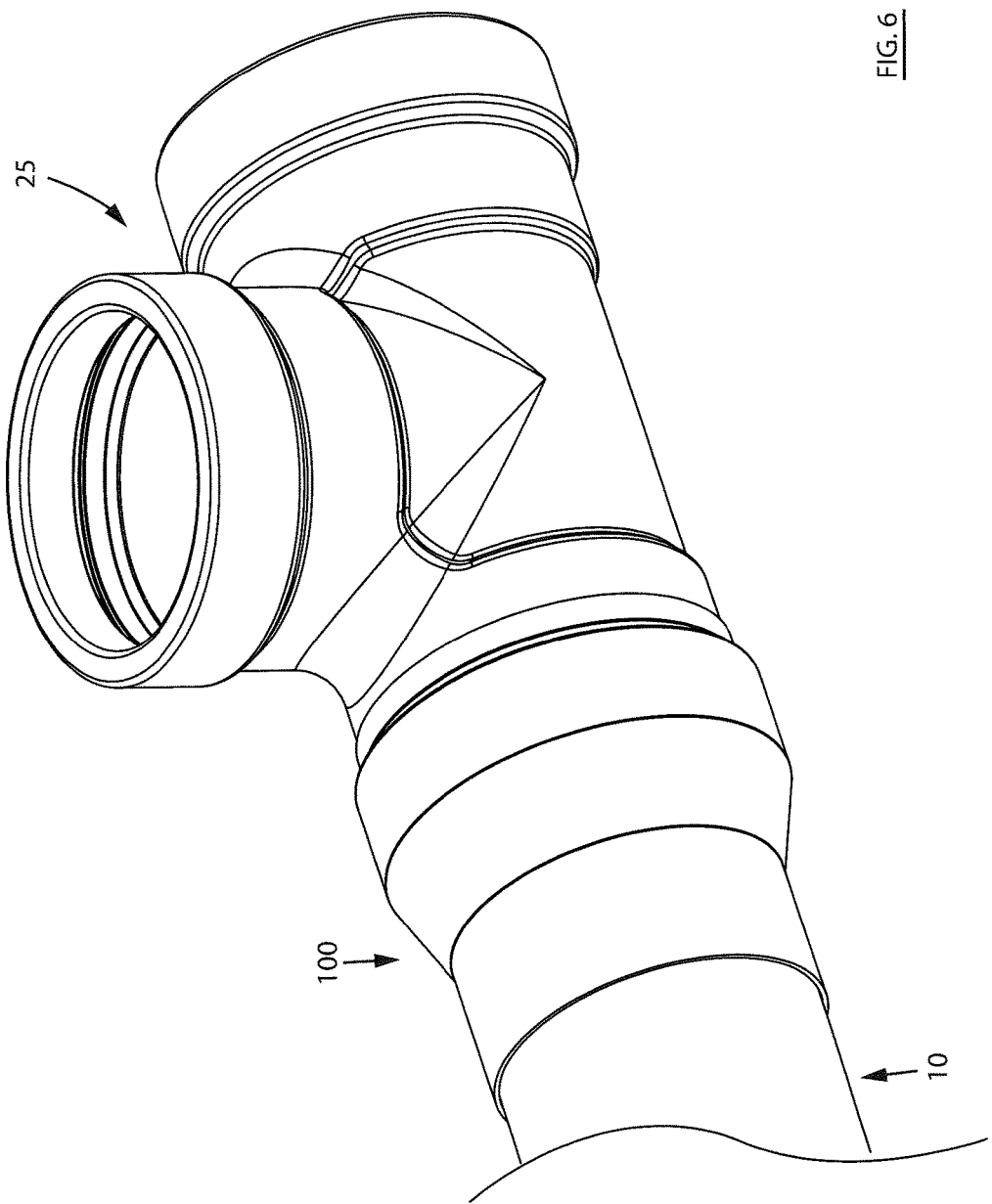
FIG. 6 is a perspective view of the pipe end and T-fitting of FIG. 3 secured with a mechanical restraint member in accordance with one embodiment of this disclosure.
Figure 7:
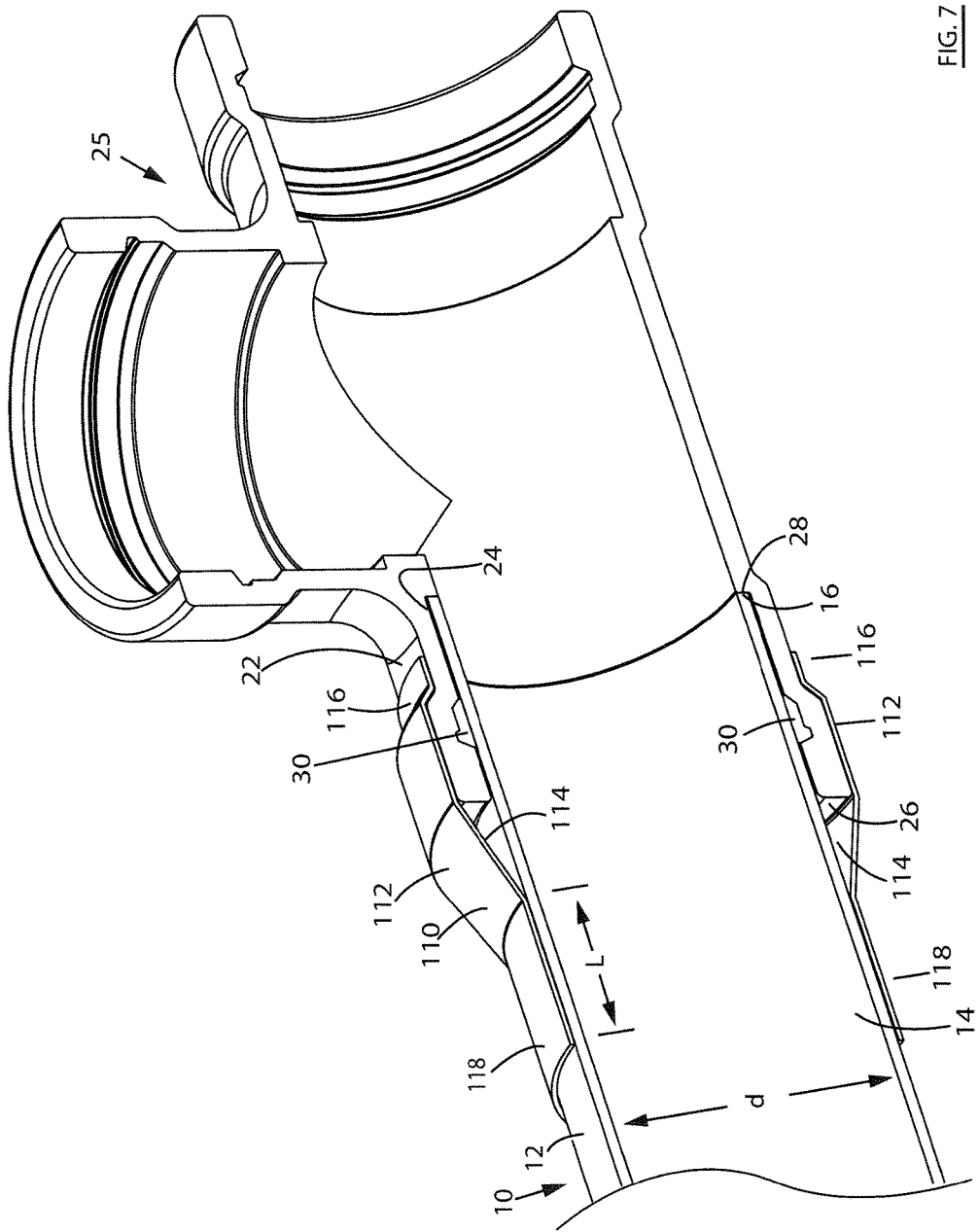
FIG. 7 is a perspective cross-section view of FIG. 6.

As shown in FIGS. 6 and 7, mechanical restraint member 100 may be applied to the outer surfaces 12, 22 of two components of a piping system (e.g., wrapped around the circumference of a joint between the two components), in this case pipe 10 and fitting 25, and bonded to a portion of the outer surfaces 12, 22 of each of the piping system components. More specifically, flexible substrate 110 has an outer side 112, an inner side 114, and first and second ends 116, 118. All or a portion of the inner side 114 at the first end 116 is bonded to an outer surface of one of the components of the piping system (in this case, to outer surface 22 of fitting 25), and all or a portion of the inner side 114 at the second end 118 is bonded to an outer surface of the other component (in this case, to outer surface 12 of pipe 10). In this way, mechanical restraint member 100 prevents the components from separating from each other.

As exemplified, a single sheet of mechanical restraint member 100 may be wrapped circumferentially around the joint. Accordingly, mechanical restraint member 100 may overlie all of the outer surfaces 12, 22 of pipe 10 and fitting 25 at the location of the joint. It will be appreciated that in some embodiments, mechanical restraint member 100 may be wrapped around the joint in more than one layer (e.g. 2 or 3 layers) so that mechanical restraint member 100 will also overlie itself. In such a case, the same bonding agent as is used to secure the mechanical restraint member to the conduit may be used. Alternatively, multiple layers of the substrate may be used (e.g., wrapped around a conduit). In such a case, substrate with bonding agent on an inner surface may be provided and wrapped around the joint. A layer of substrate that has or is provided with a bonding agent suitable for securing one layer of the substrate to another layer of the substrate may then be wrapped around the joint on top of the existing substrate. Multiple such layers may be provided. It will be appreciated that the substrate of each layer may be the same or different.

Figure 8:
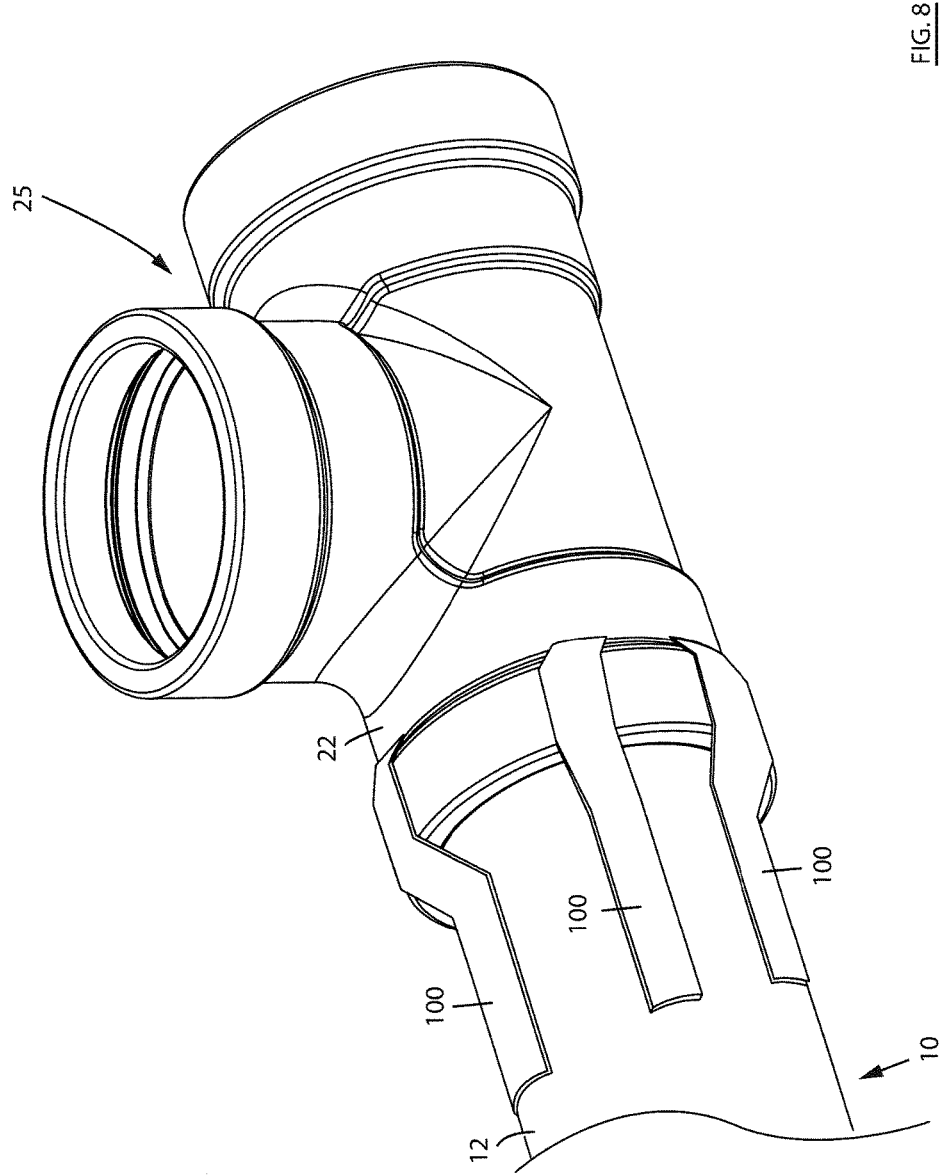
FIG. 8 is a perspective view of the pipe end and T-fitting of FIG. 3 secured with two or more mechanical restraint members in accordance with another embodiment.
Figure 9:
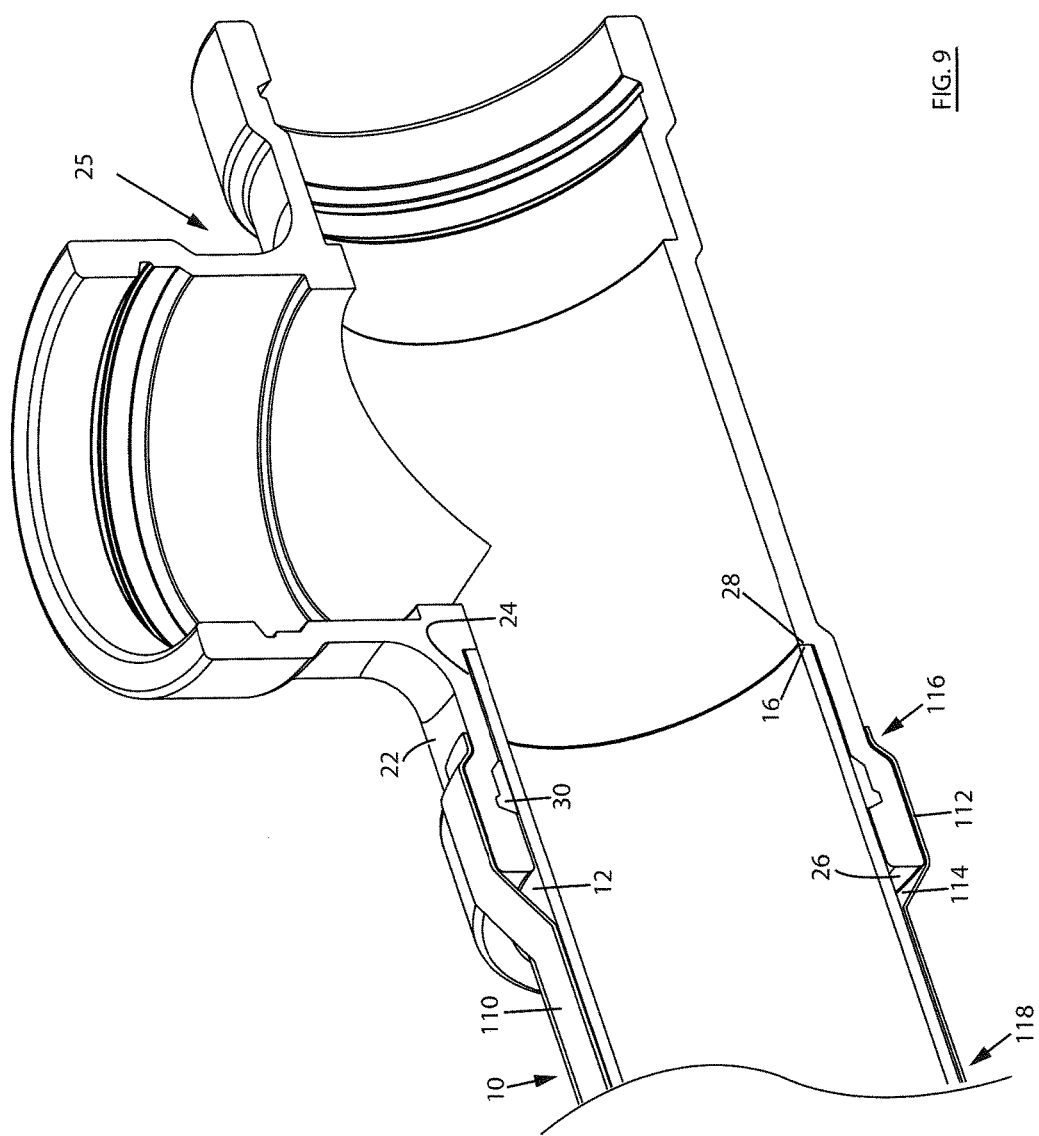
FIG. 9 is a perspective cross-section view of FIG. 8.

Alternatively, as shown in FIGS. 8 and 9, mechanical restraint member 100 may comprise one or more axially extending strips of flexible substrate 110, each strip having a first end 116 bonded to an outer surface of one of the components of the piping system and a second end 118 bonded to an outer surface of the other component. For example, 3, 4, or more strips that are circumferentially spaced apart may be applied in the axial direction.

It will be appreciated that the one or more gaskets 30 positioned between outer surface 12 of pipe 10 and inner surface 24 of opening 20 provide the water-tight seal, while mechanical restraint member 100 acts to restrain the pie system components from separating, and not necessarily to provide any sealing capabilities. Thus, while in some embodiments a continuous sheet of flexible substrate 110 may be wrapped around—and bonded to—all (or substantially all) of the circumference of the joint, the primary function of the flexible substrate 110 is to prevent the joint from separating, although in some embodiments it may provide a back-up seal should a gasket 30 leak.

Since mechanical restraint member 100 is chemically bonded to the piping system components, this significantly reduces (if not eliminates) the risk of plastic deformation, cracking, or other structural damage to the piping system components during installation, as compared to, e.g. the apparatus illustrated in FIGS. 4 and 5.

Also, since the area of bonded contact of mechanical restraint member 100 with the piping system components will generally be much greater than in prior art systems—c.f. the points of contact 46 in FIG. 4 with the area of contact in FIG. 7 between inner surface 114 of flexible substrate 110 and the outer surface 12 of pipe 10—structural issues relating to e.g. point loading may be substantially reduced or eliminated.

Figure 10:
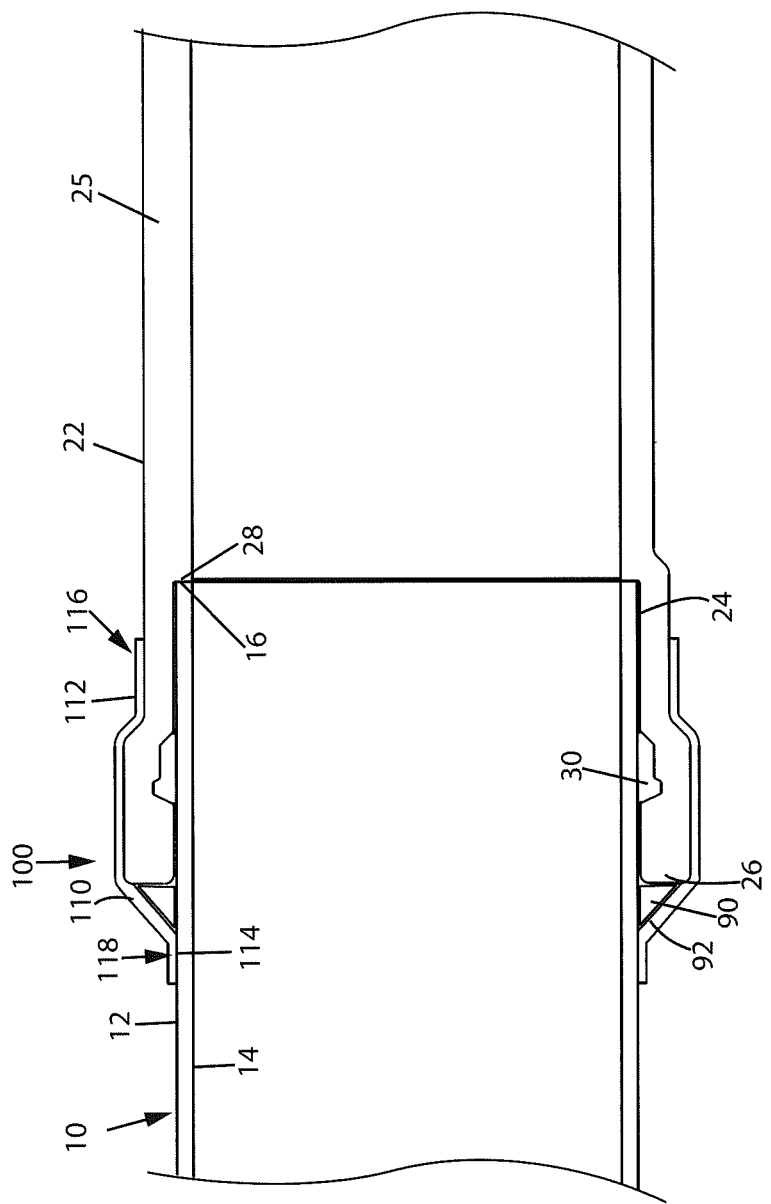
FIG. 10 is a cross-section view of a pipe end and a fitting secured in accordance with another embodiment, with a transition collar positioned at the end face of the fitting.
Figure 11:
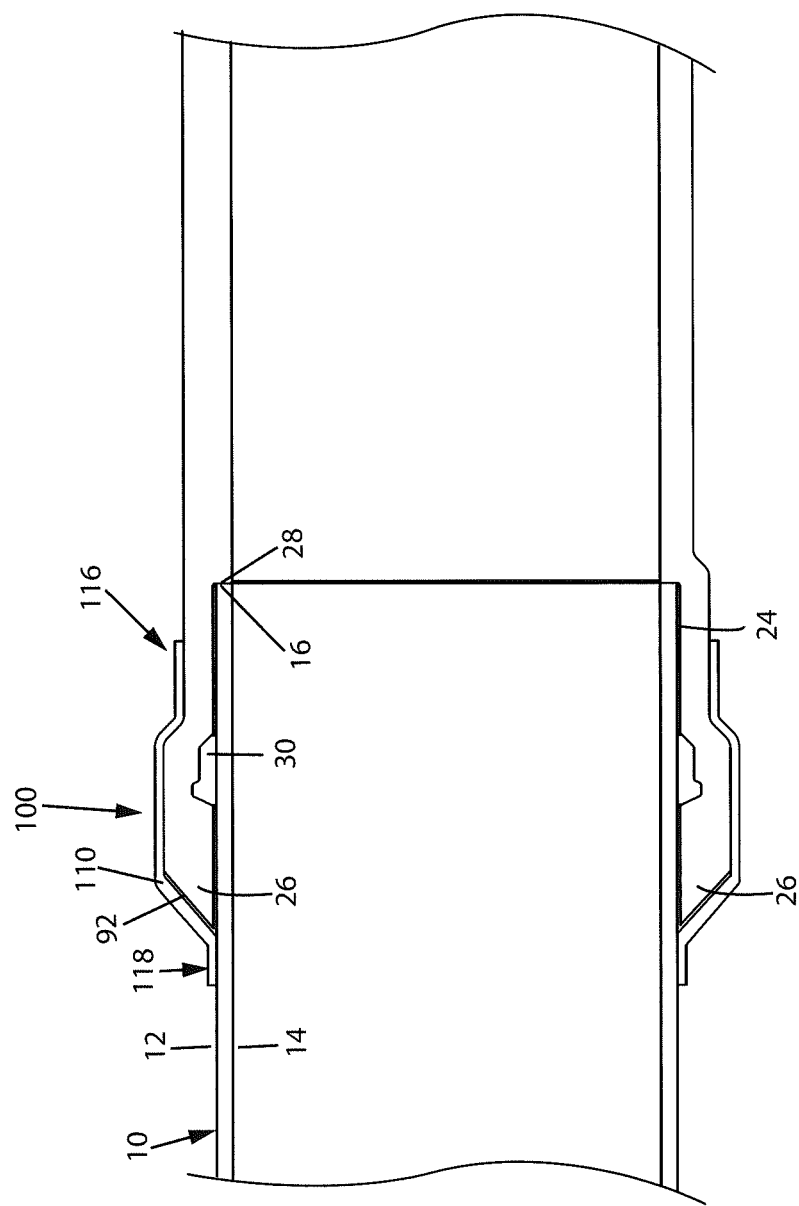
FIG. 11 is a cross-section view of a pipe end and a fitting secured in accordance with one embodiment, where the end face of the fitting is beveled.
Figure 12:
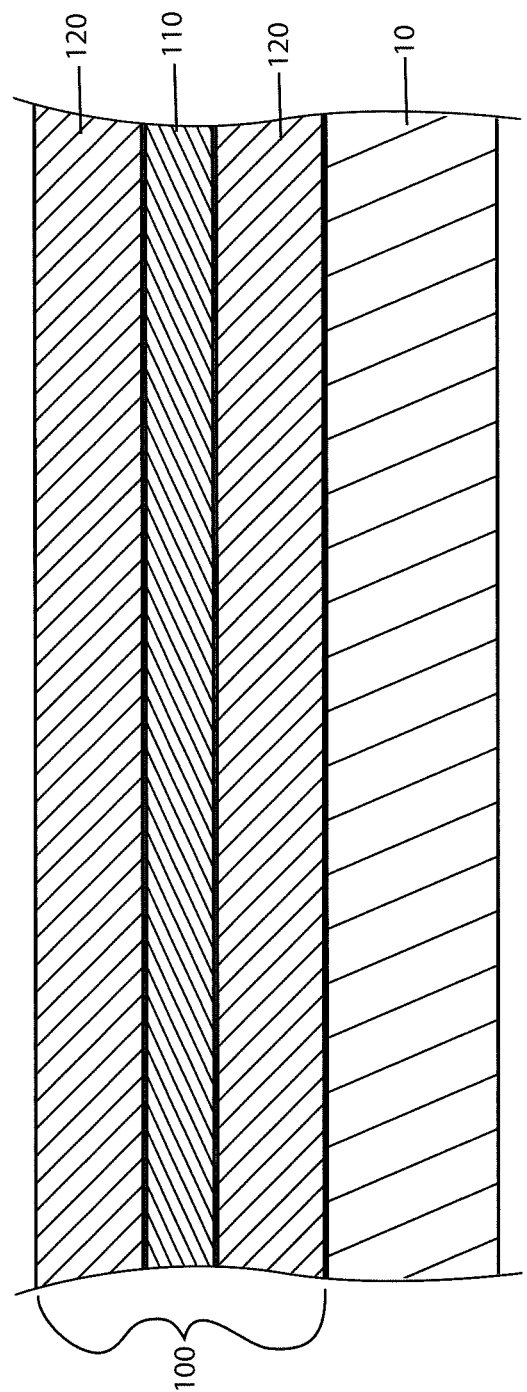
FIG. 12 is a cross-section view of a mechanical restraint member bonded to a pipe surface in accordance with one embodiment.
Figure 13:
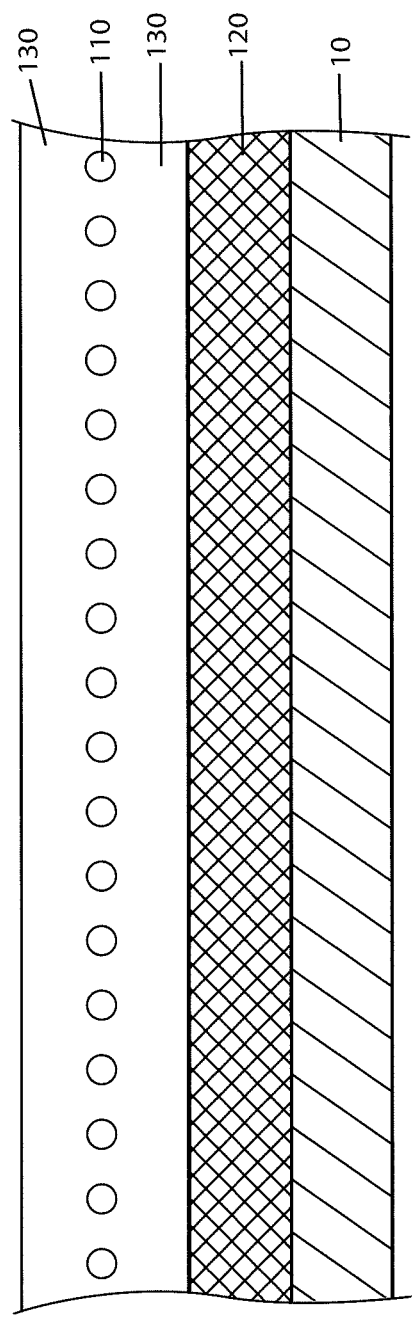
FIG. 13 is a cross-section view of another a mechanical restraint member with an outer protective layer bonded to a pipe surface.

Optionally, a transition surface may be provided between the outer surfaces 12, 22, of the components 10, 25 being secured using mechanical restraint member 100. For example, FIG. 10 shows an example of a transition ring 90 positioned about pipe 10 and against end face 26 of opening 20. Transition ring 90 has an outer transition surface 92 that extends between outer surface 12 of pipe 10 and outer surface 22 of opening 20. This outer transition surface 92 provides a less abrupt transition between the piping system components, which may facilitate securing and bonding flexible substrate 110 to surfaces 12, 22. For example, outer transition surface 92 may provide a continuous angled or curved surface from outer surface 12 of pipe 10 to outer surface 22 of fitting 25. Alternately, it may provide one or more step changes that is more gradual than the single step change from outer surface 12 of pipe 10 to outer surface 22 of fitting 25. An advantage of this design is that the juncture of end face 26 and outer surface 22 will not provide a sharp corner or transition that may cut into or fray substrate 110 over time. The geometry provided by transition surface 92 may also reduce the shear forces on the bonding agent when the piping system components try to move apart, as the force will be more parallel to, rather than perpendicular to, the bonded flexible substrate 110, which may reduce the tendency for flexible substrate 110 to peel free of the components to which it is bonded. It will be appreciated that outer surface 92 may have a variety or profiles and need not extend all the way to the radial outer position of outer surface 12 of pipe 10 and/or all the way to the radial outer position of outer surface 22 of fitting 25. Alternatively or additionally, as exemplified in FIG. 11, all (or at least a portion of) the end face 26 of opening 20 may be beveled to provide all or a portion of a transition surface 92 between outer surface 12 of pipe 10 and outer surface 22 of opening 20 and accordingly a separate transition ring may not be provided.

Flexible substrate 110 may extend axially for a length L (see FIG. 7) along each conduit to which it is applied for any desired length. It will be appreciated that the stronger the bond between flexible substrate 110 and the conduit, the smaller the overlap (length L) may be. For example, the axial length of the bonded portion of the flexible substrate 110 to a piping system component may be approximately equal to the diameter of the piping system component (diameter D in FIG. 7) being restrained. It will be appreciated that this ratio may vary based on changes in various parameters, e.g. the required tensile load performance, shear strength per unit area of the bonding agent, and the material of the outer surface of the piping system components being restrained. The ratio of the length of substrate secured to a conduit in the axial direction (L) to the diameter of the conduit (D) may be about 1:10 (i.e. L=0.1×D) or more, or about 1:5 or more, or from about 3:10 to 1:2, or from 1:2 to 1:1.

FIGS. 12-15 illustrate various examples of possible configurations of mechanical restraint member 100. Each example includes at least one layer of flexible substrate 110 and a bonding agent 120. It will be appreciated that other variants are possible, depending on the application requirements (e.g. required tensile strength, expected installation environment, etc.).

In one embodiment, the flexible substrate may be embedded in the bonding agent. Such an embodiment is exemplified in FIG. 12. As exemplified therein, a sheet of flexible substrate 110 is bonded to a pipe 10 using bonding agent 120. In the illustrated example, the flexible substrate 110 is fully saturated/embedded in the bonding agent 120, so that the cured bonding agent may also act as a protective layer for the individual fibers in the flexible substrate 110.

In some embodiments, a protective outer layer may be provided. This protective layer is preferably environmentally inert, and protects flexible substrate 110 and/or bonding agent 120 by providing a barrier to one or more environmental contaminants (e.g. ground water, acid rain, UV radiation, and the like). Accordingly, the protective layer may be selected to prevent or inhibit contact between the restraint member and groundwater. Alternatively, or in addition, the protective layer may be a flexible protective polymer that has been impregnated with $TiO_2$ to protect flexible substrate 110 and/or flexible protective polymer 130a from ultra-violet (UV) radiation). Exemplary protective layers may comprise one or more of PVC, polyvinylidene difluoride (PVDF), polytetrafluoroethylene (PTFE), and the like.

The protective layer may be provided as part of the restraint member, or it may be a separate layer. For example, the protective layer may be formed on an outer surface of the flexible substrate. It may be applied to the outer surface of the substrate prior to the application of the bonding agent (e.g. it may be poured or coated thereon, or it may have an inner adhesive side that is securable to the outer side of the flexible substrate). Alternatively, it could be a separate member that is applied after the restraint member has been applied to the joint. One such embodiment is exemplified in FIG. 13. As exemplified therein, the flexible substrate 110 is fully saturated/embedded in a flexible protective polymer 130, and the polymer-saturated flexible substrate 110 is bonded to a pipe 10 using bonding agent 120. The protective layer may extend beyond one or some or all of edges of flexible substrate 110 and contact (or be bonded to) the outer surface of one or both components being joined.

Figure 14:
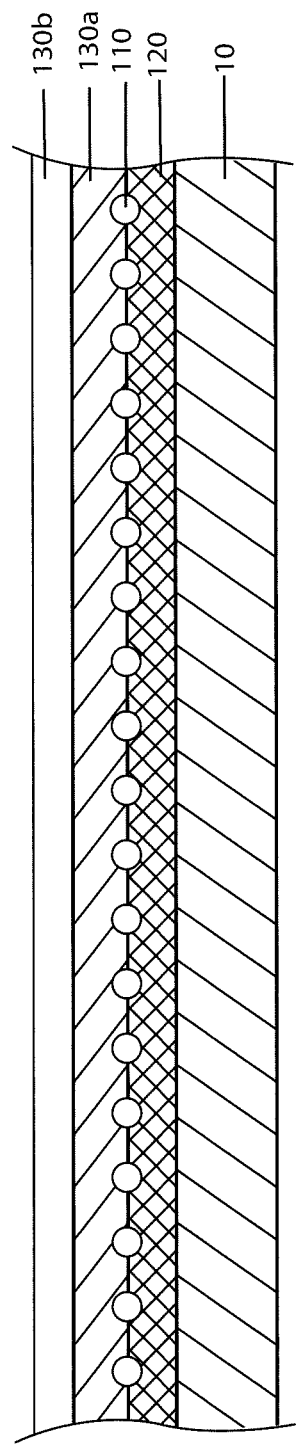
FIG. 14 is a cross-section view of another embodiment of a mechanical restraint member with an outer protective layer bonded to a pipe surface.
Figure 15:
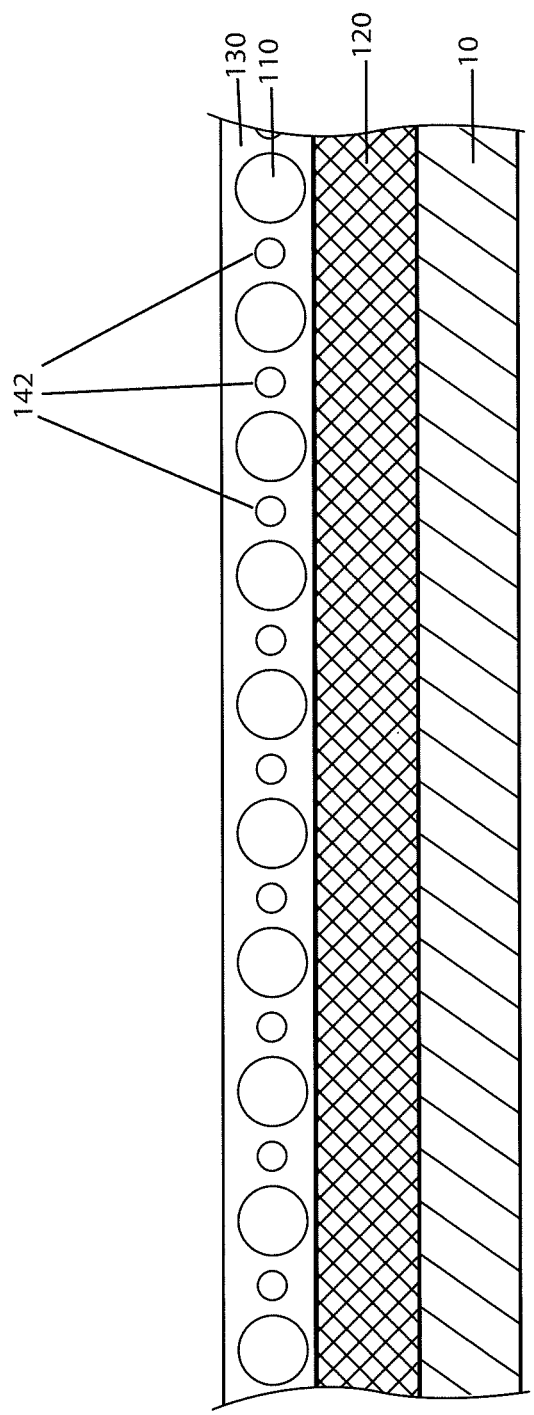
FIG. 15 is a cross-section view of another embodiment of a mechanical restraint member with an embedded heating element bonded to a pipe surface.

Alternatively, as exemplified in FIG. 14, the outer side 112 of flexible substrate 110 may be partially saturated/embedded in a flexible protective polymer 130a, such as PVC, PVDF, PTFE, and the like, and the inner side 114 of flexible substrate 110 may be partially saturated/embedded in the bonding agent 120, or had the bonding agent 120 applied thereto.

Also, as exemplified in FIG. 14, an optional additional protective layer 130b may be provided on the outer side of flexible protective polymer 130a. Alternatively, optional additional protective layer 130b may be applied to the outer surface of flexible substrate 110 of any embodiment.

Optionally, a resistive heating member 142 (whose purpose will be discussed further subsequently) may be incorporated into mechanical restraint member 100. As exemplified in FIG. 15, resistive heating member 142 may consist of electrically conductive fibers (e.g. Nichrome, Kanthal™, cupronickel, ceramic, carbon, and the like, and in some embodiments, may have a positive temperature coefficient (PTC)) interwoven into a sheet of flexible substrate 110, or one or more wire otherwise embedded therein. Alternatively, resistive heating member 142 may be provided adjacent, or at least near to, either side of flexible substrate 110. It will also be appreciated that in some embodiments, the flexible substrate 110 itself may be electrically conductive, allowing flexible substrate 110 to act as a resistive heating member 142.

Method of Securing Two Pipe Members

FIGS. 16 to 40 exemplify methods and apparatus for securing piping system components using a mechanical restraint member. In general, the method includes connecting the piping system components using, e.g., an insertion fit (with a gasket positioned between the components to provide a water-tight seal), positioning a flexible substrate having a bonding agent provided on at least an inner side of the flexible substrate across the joint, and activating (e.g. heating) the bonding agent and applying pressure to the flexible substrate at least when the bonding agent is activated (e.g. at an elevated temperature) in order to bond the flexible substrate to the piping system components. It will be appreciated that the method may be used with any mechanical interface of two members of a piping system. The method may be used to apply a mechanical restraint member 100, and may be used with pipe securing apparatus 200 and/or the quality control module 300 disclosed herein.

It will also be appreciated that the activation (e.g. the application of heat) and the application of pressure may occur in any order provided that the bonding agent is activated (e.g. at a temperature required for bonding (a bonding temperature)) when a pressure required for bonding (a bonding pressure) is applied. Accordingly, the bonding agent may be raised to the bonding temperature, exposed to the ambient, formed by combining two or more components, etc. prior to, concurrently with, or subsequent to the bonding pressure being applied. Accordingly, various different constructs may be used to produce the bonding temperature and/or apply the bonding pressure.

Figure 16:
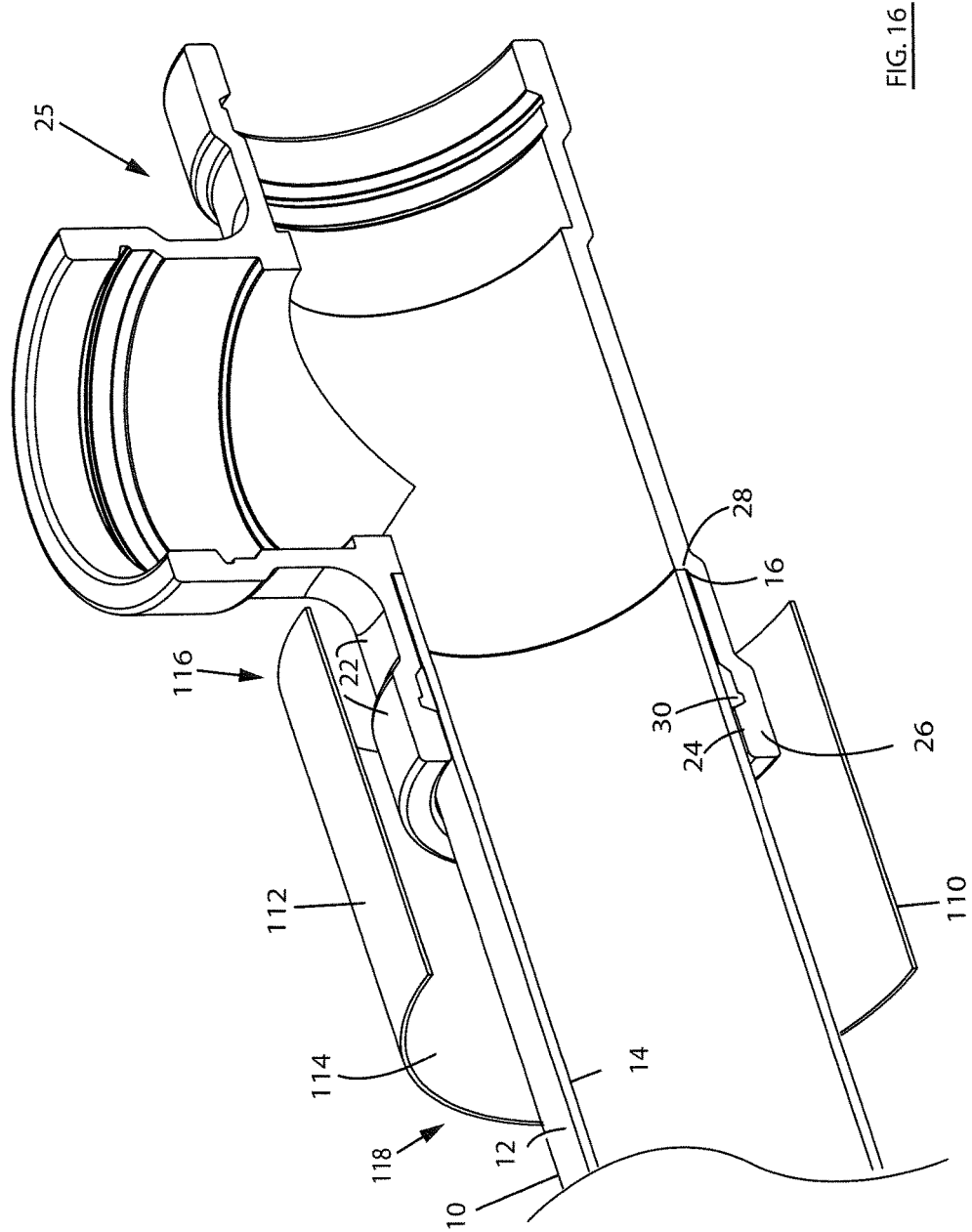
FIG. 16 is a perspective cross-section view of the pipe end and T-fitting of FIG. 3, with a flexible substrate being wrapped around the joint in accordance with one embodiment.

FIGS. 16 to 19 exemplify one embodiment of a method of applying a mechanical restraint member to secure two components of a piping system utilizing a pipe securing apparatus, which is also referred to herein as a pressure cuff, that incorporates a heating member. First, as illustrated in FIG. 16, the components are joined using an insertion fit, in this case by inserting pipe end 16 into opening 20 of fitting 25. One or more gaskets 30 may be provided to provide a fluid-tight seal between the components, as discussed above. Once the components are positioned as desired with any desired sealing system, a sheet of flexible substrate 110 is wrapped around all or a portion of the joint, so that all or a portion of inner surface 114 of flexible substrate 110 at a first end 116 is in contact with an outer surface 22 of one component (in this case fitting 25), and so that all or a portion of inner surface 114 of flexible substrate 110 at a second end 118 is in contact with an outer surface 12 of the other component (in this case pipe 10). In this example, a bonding agent 120 has been applied to at least a portion of the inner surface 114 of flexible substrate 110 at each of the first and second ends 116, 118 prior to wrapping flexible substrate 110 around the joint.

Flexible substrate 110 may be temporarily secured in position about the joint using any suitable means. For example, one or more pieces of tape or other fasteners (e.g. clamps, elastic bands, and the like) may be used to temporarily secure the sheet of flexible substrate 110 to the piping system components, e.g. by applying a tape to both the outer surface 112 of flexible substrate 110 and the outer surface 12 or 22 of the piping system components. Alternatively, or additionally, where the sheet of flexible substrate 110 is wrapped around substantially all of the perimeter of the joint, a tape or other fastener may be applied to the outer surface 112 of both longitudinal edges of the flexible substrate 110, i.e. taping the flexible substrate 110 to itself. Other fasteners (e.g. clamps, elastic bands, and the like) may alternatively or additionally be used.

Alternatively, or additionally, an adhesive, which may be a temporary or releasable adhesive, may be applied to all or a portion of inner surface 114 of flexible substrate 110 (and/or to all or a portion of the bonding agent 120 applied to the inner surface 114 of flexible substrate 110) to secure flexible substrate 110 in position while heat and pressure are applied. Accordingly, the adhesive enables flexible substrate 110 to be placed on the outer surfaces 12, 22 of the piping system components and to then remain in position. The temporary adhesive may be a releasable adhesive. An advantage of a releasable adhesive is that flexible substrate 110 may be removed and repositioned (e.g., rewrapped) if needed. Such a temporary adhesive may comprise a low-tack pressure-sensitive adhesive, such as an elastomer (e.g. acrylic, butyl rubber, EVA, natural rubber, nitrile, silicone rubber, styrene block copolymer (SBC), or vinyl ether and the like) compounded with a suitable tackifier.

Figure 17:
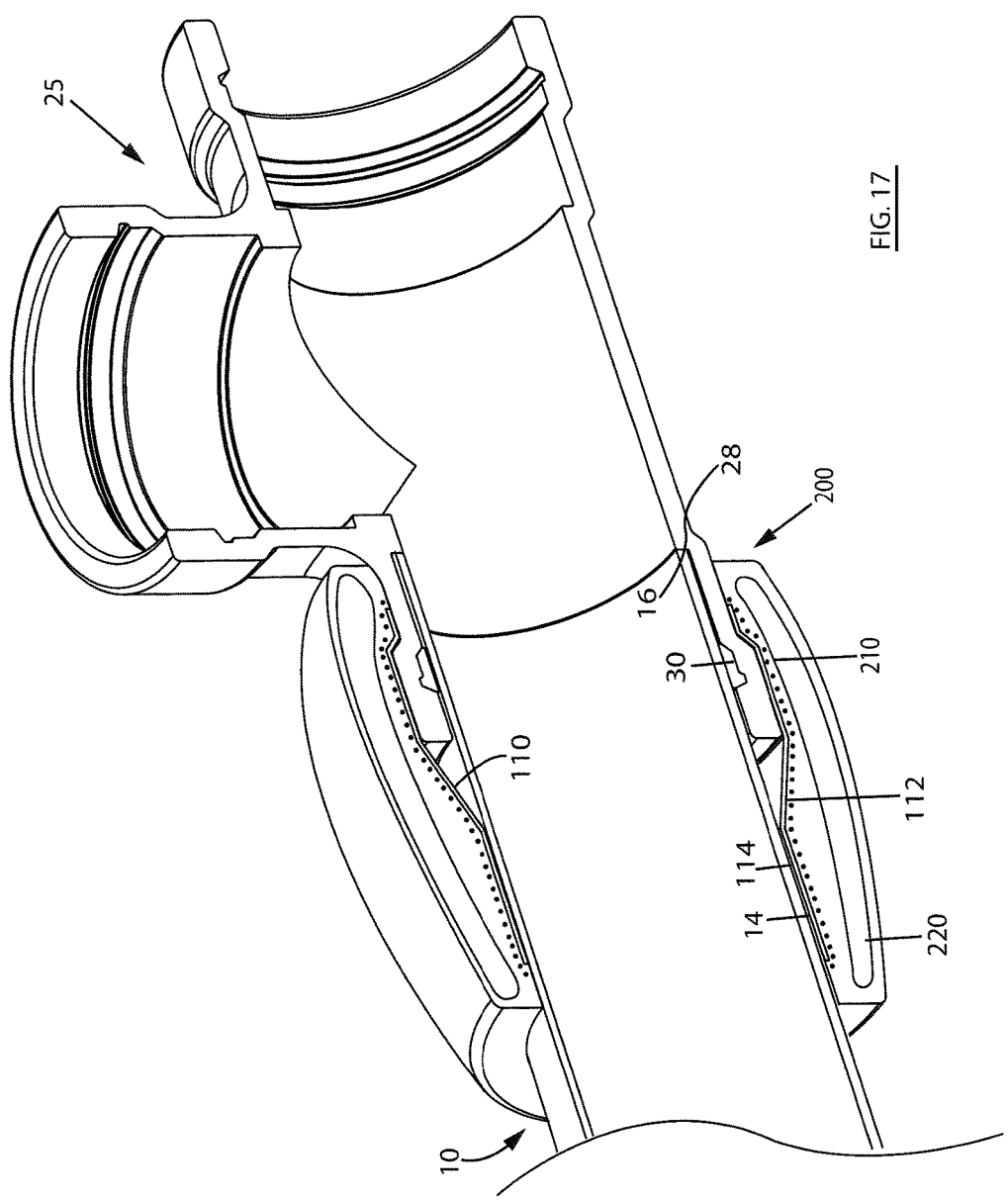
FIG. 17 is a perspective cross-section view of the pipe end and T-fitting of FIG. 3, with the flexible substrate of FIG. 16 and a pressure cuff wrapped around the joint in accordance with one embodiment, wherein the pressure cuff is in an un-inflated state.

Next, as illustrated in FIG. 17, a pressure cuff 200 (examples of which will be discussed further subsequently) is positioned around the sheet of flexible substrate 110 and, accordingly, around the perimeter of the joint. Pressure cuff 200 may be of any construct that enables pressure to be applied to the outer surface of flexible substrate 110. It will be appreciated that, as exemplified, pressure cuff 200 may be positioned directly over (i.e., in contact with) flexible substrate 110. Alternatively, an intermediary member or members that will transmit pressure may be positioned between pressure cuff 200 and flexible substrate 110, such as protective material 160 (e.g. a heat shrink and/or environmentally inert material) or the like. As exemplified, pressure cuff 200 includes one or more inflatable pockets. For example, pressure cuff 200 may be an annular cuff having a singular continuous annular inflatable pocket that may be brought into position by sliding pressure cuff 200 over a free end of one component being joined (e.g. pipe 10) and then along the component until it overlies flexible substrate 110. Alternatively, pressure cuff 200 may be a linear cuff that has one or more inflatable pockets; the linear cuff is wrapped around the joint and secured to itself to form an annular cuff. In the illustrated embodiment, pressure cuff 200 includes a heating element 210 and a single annular inflatable pocket or pressure chamber s.

Figure 18:
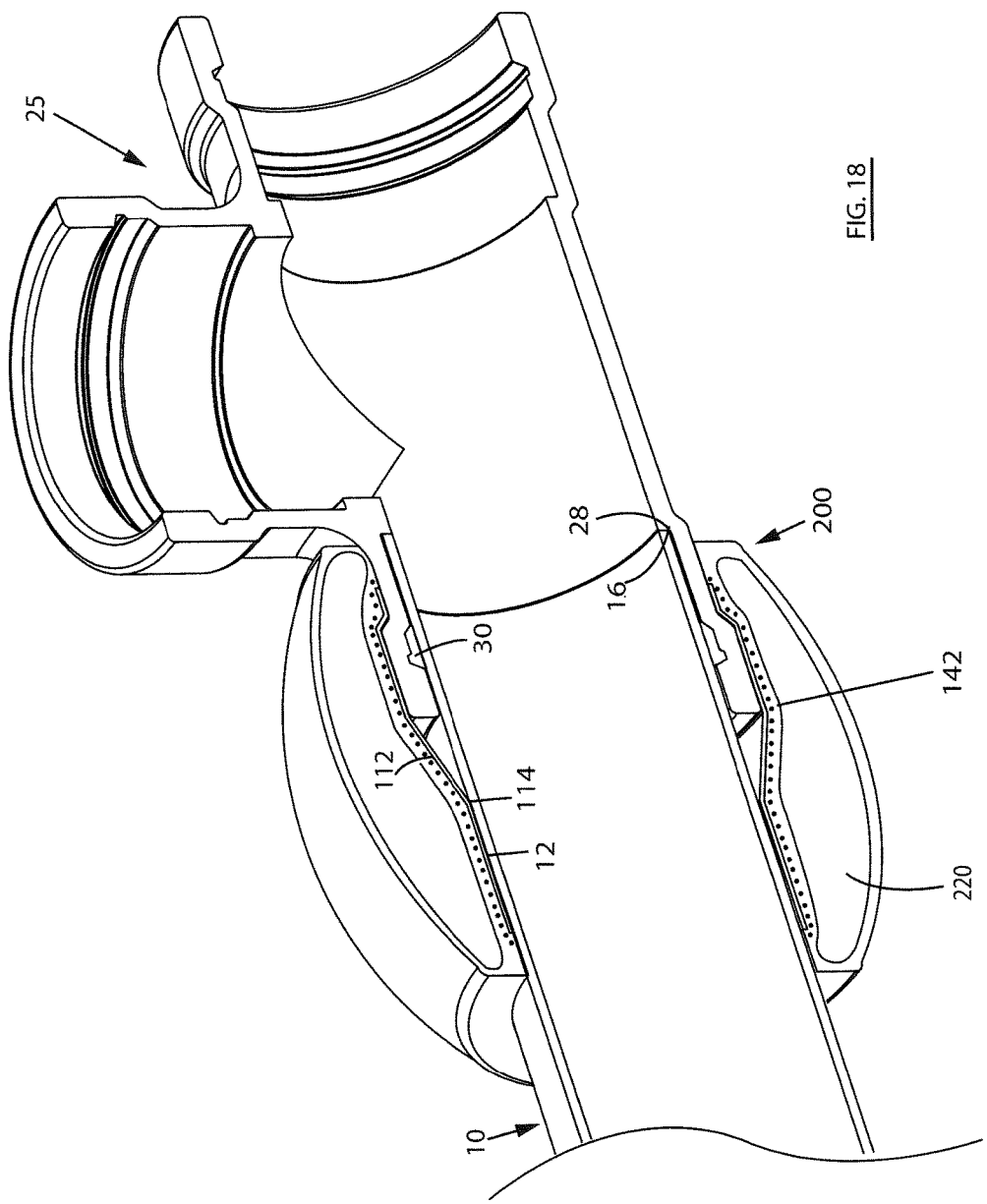
FIG. 18 is a perspective cross-section view of FIG. 17, with the pressure cuff in an inflated state.

Once pressure cuff 200 is in position, it may be used to apply heat and/or pressure to flexible substrate 110 and bonding agent 120. As illustrated in FIG. 18, pressure chamber 220 may be inflated to exert pressure on flexible substrate 110, and heating element 210 may be energized to apply sufficient heat to activate bonding agent 120. It will be appreciated that the heat and pressure may be provided concurrently, or in any order (i.e. heat then pressure, or pressure then heat).

Pressure chamber 220 may be inflated by any means known in the art. For example, pressure chamber may have one or more fluid inlet ports. Accordingly, a pressure source, such as a compressor, a tank of pressurized gas, or the like, may be connected to the inlet port. It will be appreciated that the inlet port may be used to subsequently depressurize the pressure cuff 200 and/or one or more fluid outlet ports may be provided. Pressure chamber 220 may also be inflated by, e.g., gas released by a chemical reaction, or the like.

Heating element 210 may be any member that is capable of raising the bonding agent to the bonding temperature. As exemplified, heating element 210 comprises a resistive heating element 142. Resistive heating element 142 may be heated by an on-board power source (e.g., batteries that are provided in pressure cuff 200) or it may be connectable to an external source of current, such as by electrical contacts that may be provided on pressure cuff 200 (similar to leads 144 shown in FIG. 19). In other embodiments, heating element 210 may comprise one or more of: an exothermic reactive composition; an infrared heat source; or other radiant energy source (e.g. a microwave source) and the like. For example, pressure cuff 200 may incorporate one or more radiant energy sources (e.g., IR emitters). These may be positioned around pressure cuff 200 so as to provide the required degree of heating. Alternatively, one or more radiant energy sources may be provided on only a portion of pressure cuff 200, and pressure cuff 200 may be constructed to permit the radiant energy sources to rotate around the joint to provide the required degree of heating to all portions of the bonding agent.

Once activated by the application of heat by pressure cuff 200, bonding agent 120 begins forming a bond between flexible substrate 110 and the components of the piping system 10, 25. Once bonding agent 120 has cured to provide a sufficient bond strength, pressure cuff 200 may be removed, leaving mechanical restraint member 100 in place to prevent components 10, 25 from separating. It will be appreciated that while bonding agent 120 may provide an initial bond strength (e.g. sufficient to allow the removal of pressure cuff 200 without disturbing or displacing mechanical restraint member 100) after a relatively short period of time (e.g. from 10, 20 or 30 minutes up to 1 or 2 hours and may be 10 to 30 minutes or 20 to 30 minutes) the strength of bonding agent 120 may increase as the bonding agent continues to cure. For example, bonding agent 120 may take from between 12 hours to 1 week. For example, Polyurethane Reactive (PUR) EZ 250150 achieves 50% of its strength within 30 minutes, about 75% of its strength after 12 hours, and 100% of its strength in about 7 days.

Figure 19:
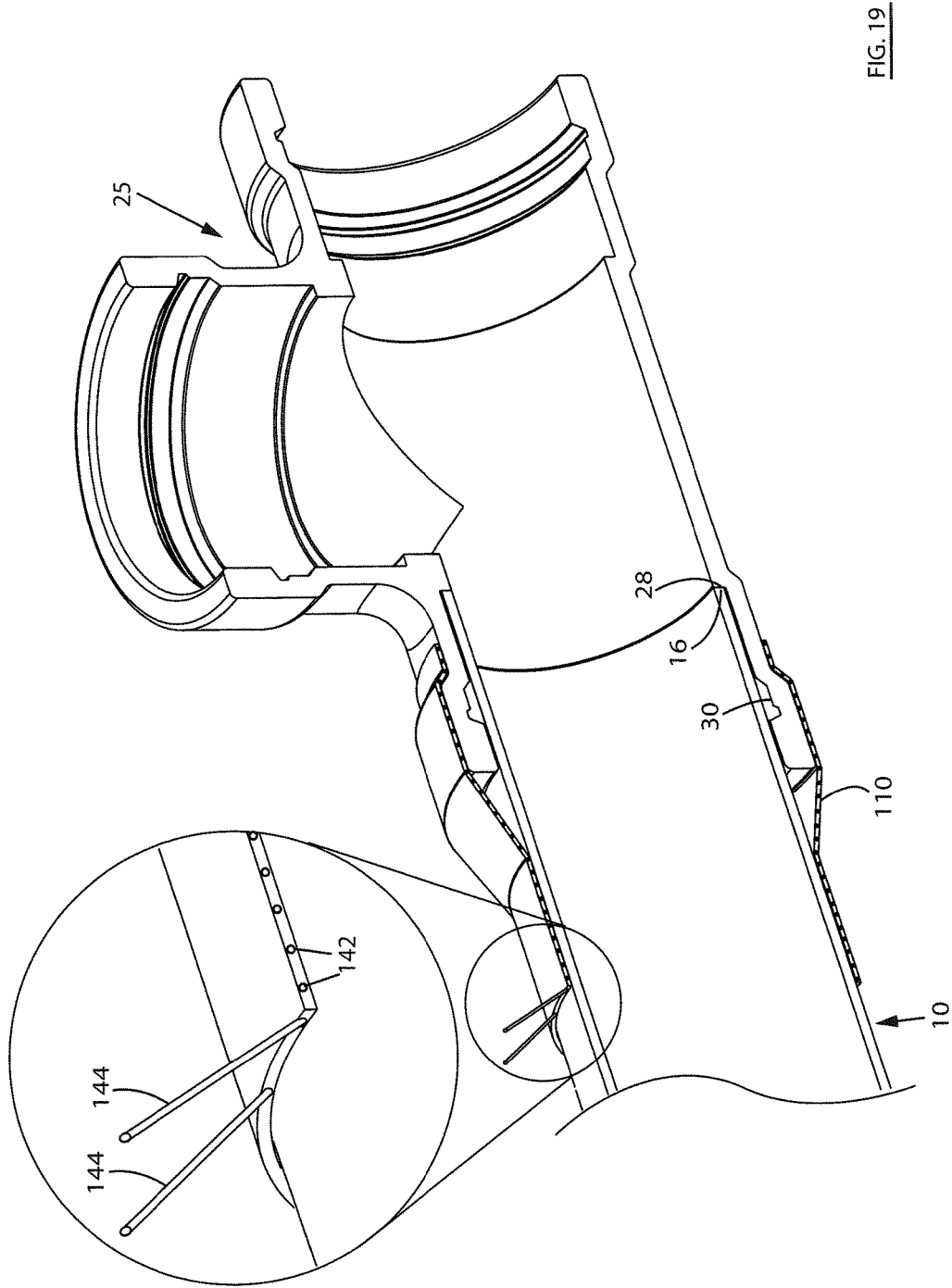
FIG. 19 is a perspective cross-section view of the pipe end and T-fitting of FIG. 3, with a flexible substrate wrapped around the joint, the flexible substrate having an embedded resistive heating element in accordance with another embodiment.
Figure 20:
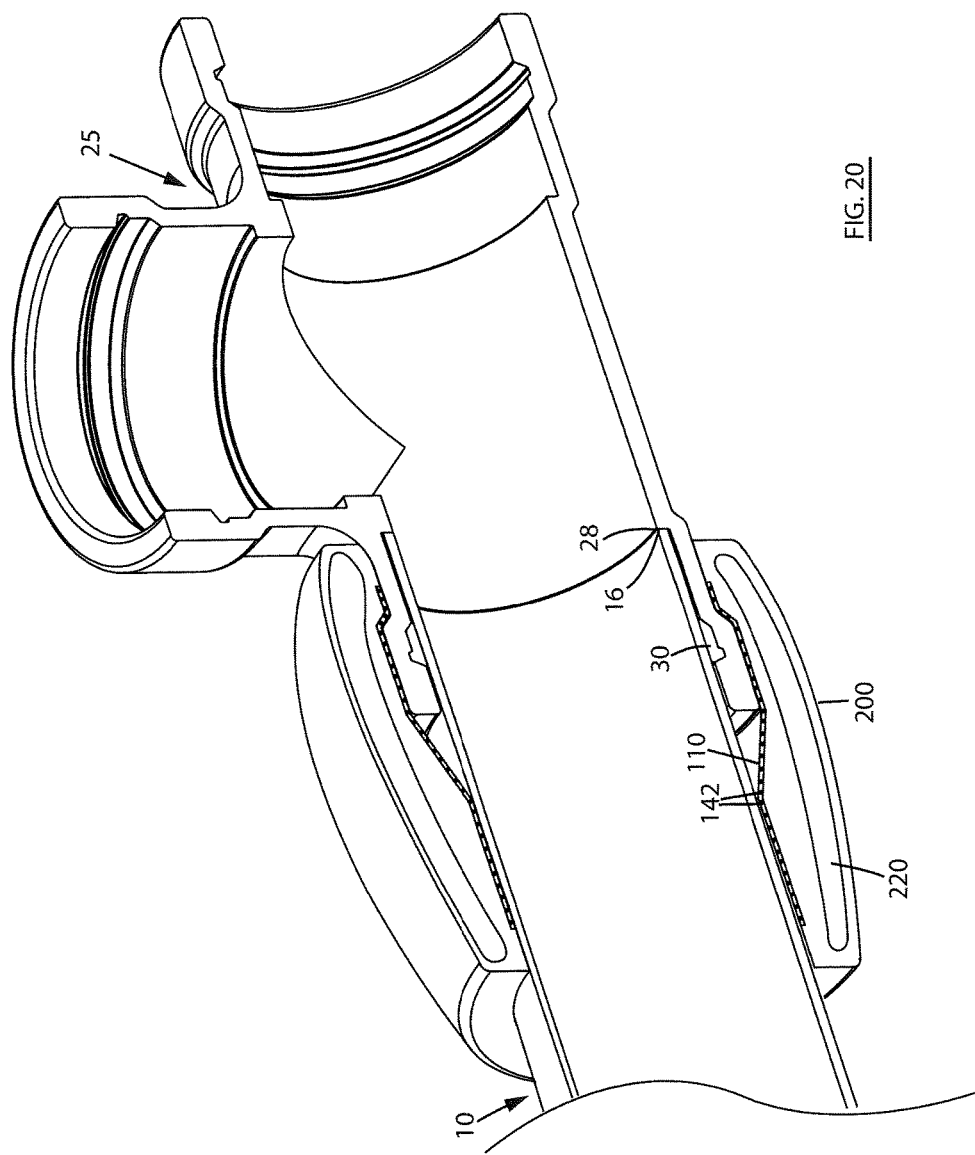
FIG. 20 is a perspective cross-section view of the pipe end and T-fitting of FIG. 3, with the flexible substrate of FIG. 19 and a pressure cuff wrapped around the joint in accordance with another embodiment, wherein the pressure cuff is in an un-inflated state.
Figure 21:
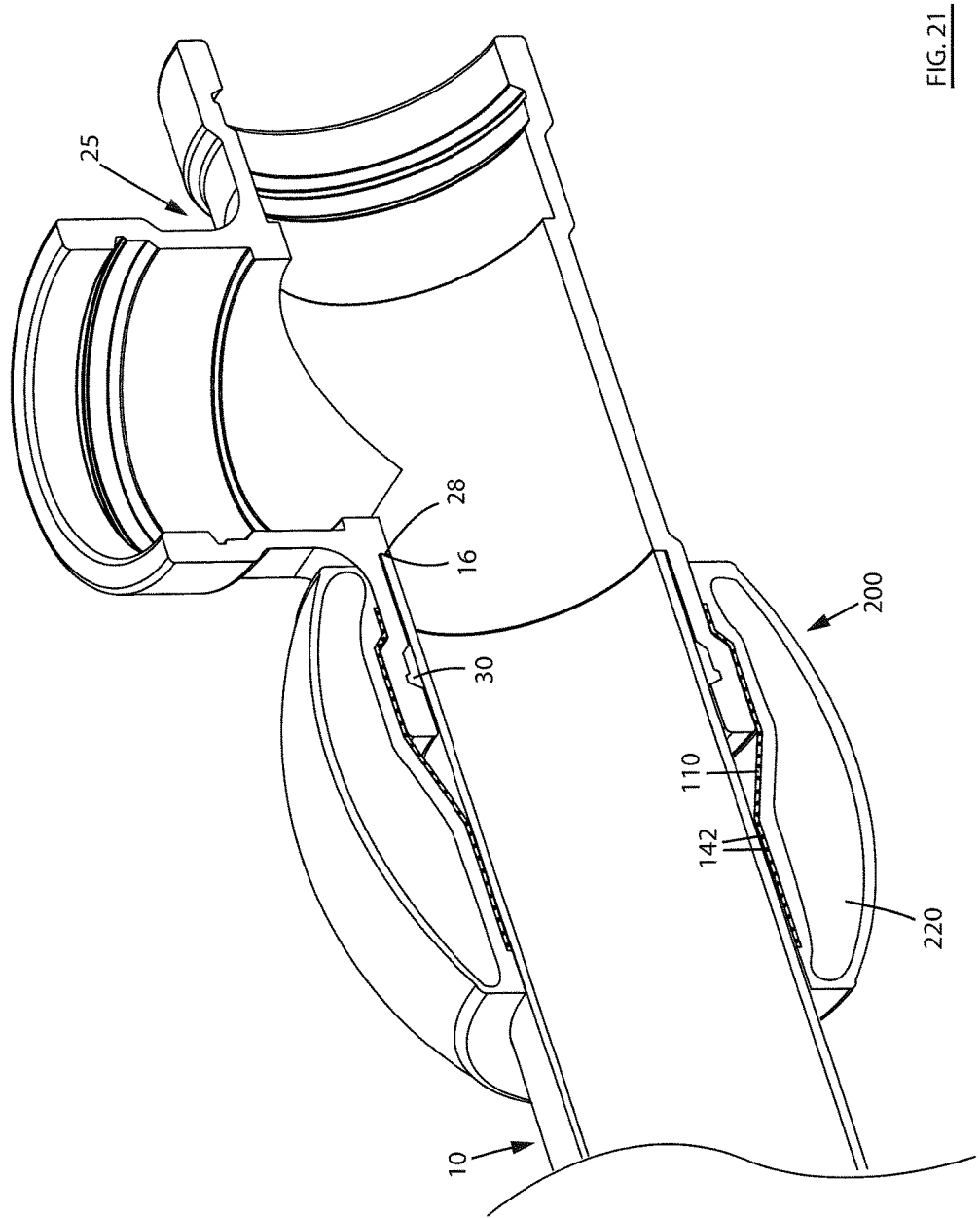
FIG. 21 is a perspective cross-section view of FIG. 20, with the pressure cuff in an inflated state.

FIGS. 19 to 21 exemplify another example of a method of applying a mechanical restraint member to secure two components of a piping system. In this example, flexible substrate 110 has a resistive heating element 142 woven into it. Resistive heating element 142 may be energized by applying an electrical current to two or more leads 144. Otherwise, this method is similar to the method described with respect to FIGS. 16 to 18. In accordance with this embodiment, pressure cuff 200 need not have a heating element. However, pressure cuff 200 may have a heating element 210 as a backup, in case resistive heating element 142 of flexible substrate 110 does not function correctly.

First, as illustrated in FIG. 19, the components are joined using an insertion fit, with one or more gaskets 30 provided between the components. Next, a sheet of flexible substrate 110 with an incorporated resistive heating element 142 is wrapped around all or a portion of the joint. As in the previous example, a bonding agent 120 has been applied to at least a portion of the inner surface 114 of flexible substrate 110 at each of the first and second ends 116, 118 prior to wrapping flexible substrate 110 around the joint. Flexible substrate 110 may be temporarily secured in position about the joint as discussed above.

Next, as illustrated in FIG. 20, a pressure cuff 200 is positioned around the sheet of flexible substrate 110 and around the perimeter of the joint. In the illustrated embodiment, pressure cuff 200 includes a pressure chamber 220, but does not include a heating element. Once pressure cuff 200 is in position, it may be used to apply pressure to flexible substrate 110 and bonding agent 120, while heating element 142 may be energized to apply sufficient heat to activate bonding agent 120. As will be discussed further subsequently, heating element 142 may be energized via pressure cuff 200. For example, leads 144 may be coupled to one or more electrical sockets or connectors located on pressure cuff 200.

As above, once bonding agent 120 has cured to provide a sufficient bond strength, pressure cuff 200 may be removed, leaving mechanical restraint member 100 in place to prevent components 10, 25 from separating.

Figure 22:
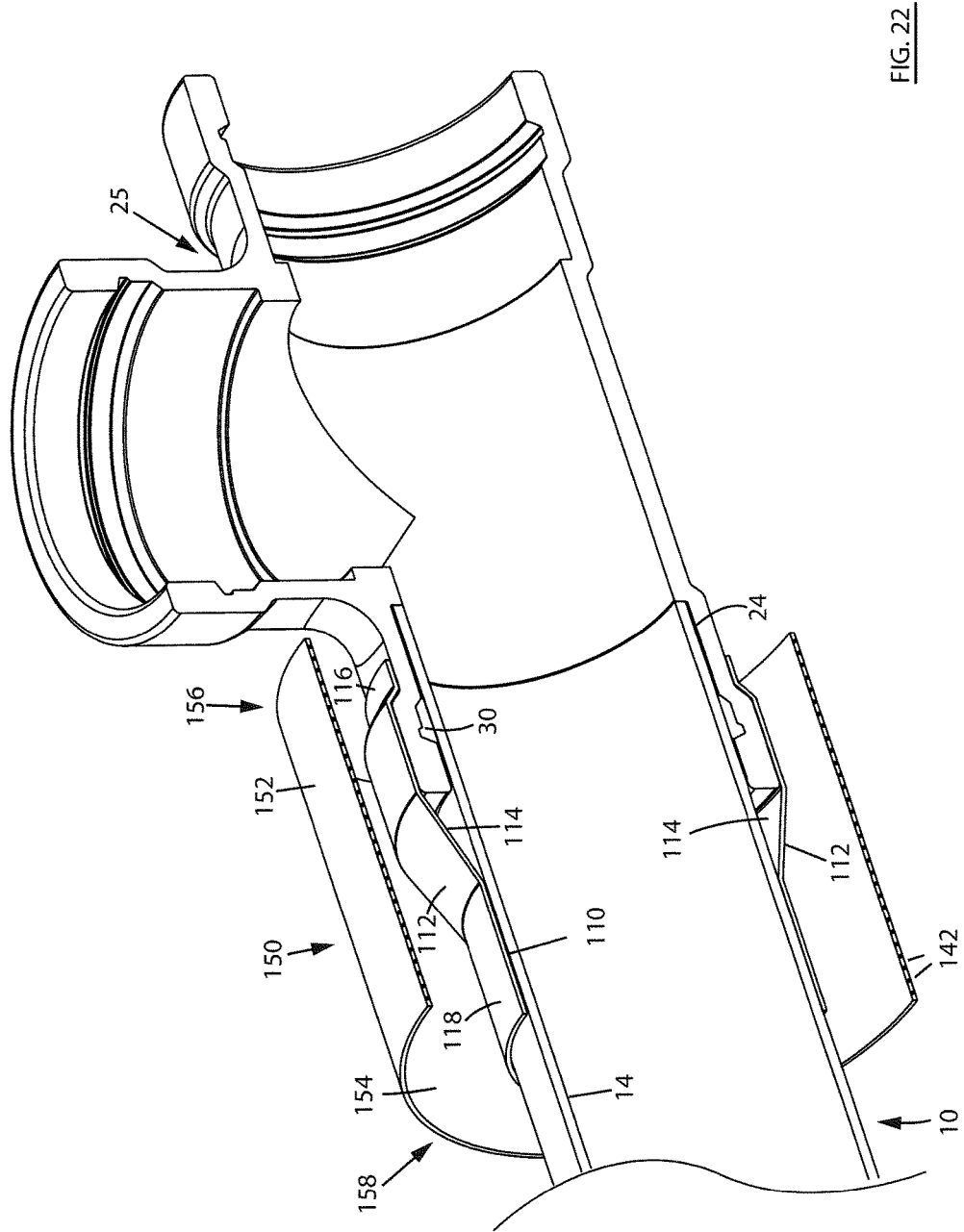
FIG. 22 is a perspective cross-section view of the pipe end and T-fitting of FIG. 3, with the flexible substrate of FIG. 16 wrapped around the joint, and with a heating blanket being wrapped around the joint and the flexible substrate in accordance with another embodiment.
Figure 23:
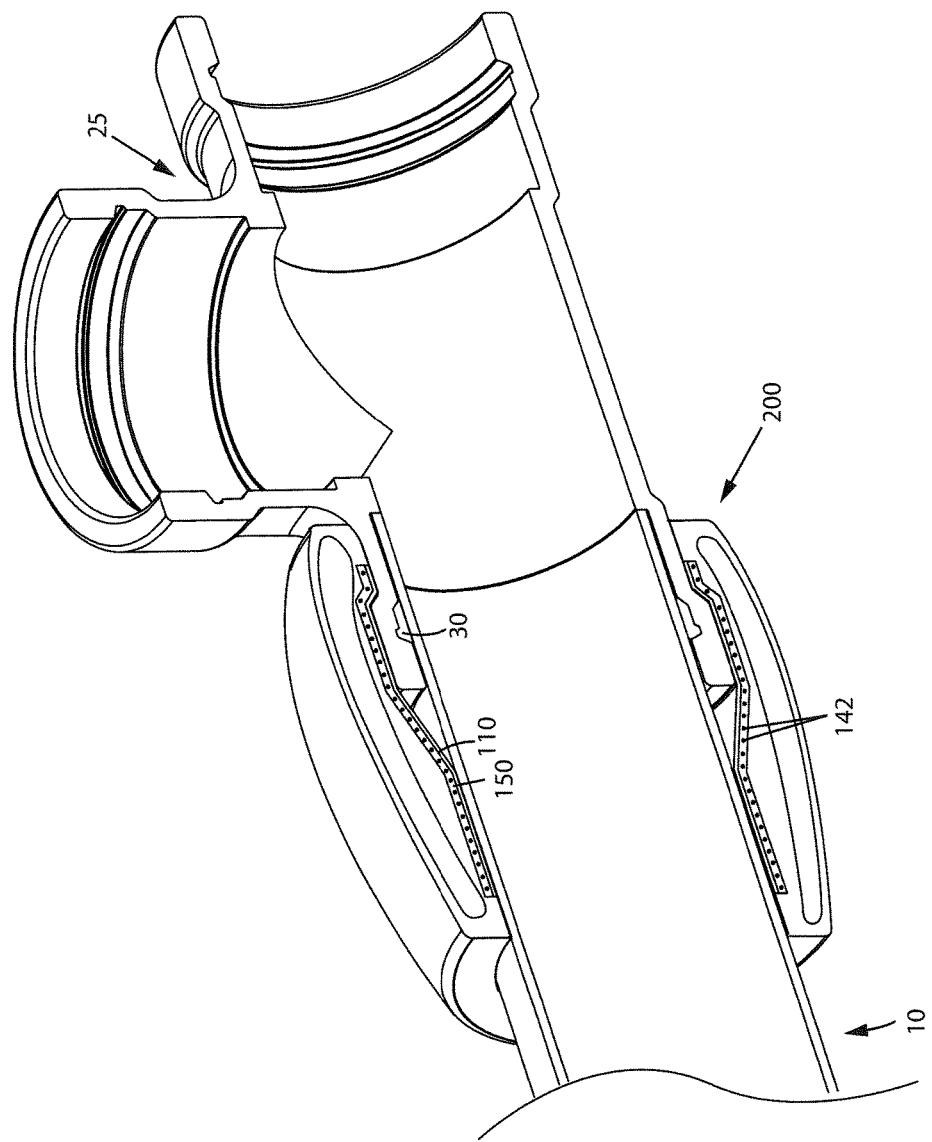
FIG. 23 is a perspective cross-section view of the pipe end and T-fitting of FIG. 3, with the flexible substrate and heating blanket of FIG. 22 and a pressure cuff wrapped around the joint in accordance with another embodiment, wherein the pressure cuff is in an un-inflated state.
Figure 24:
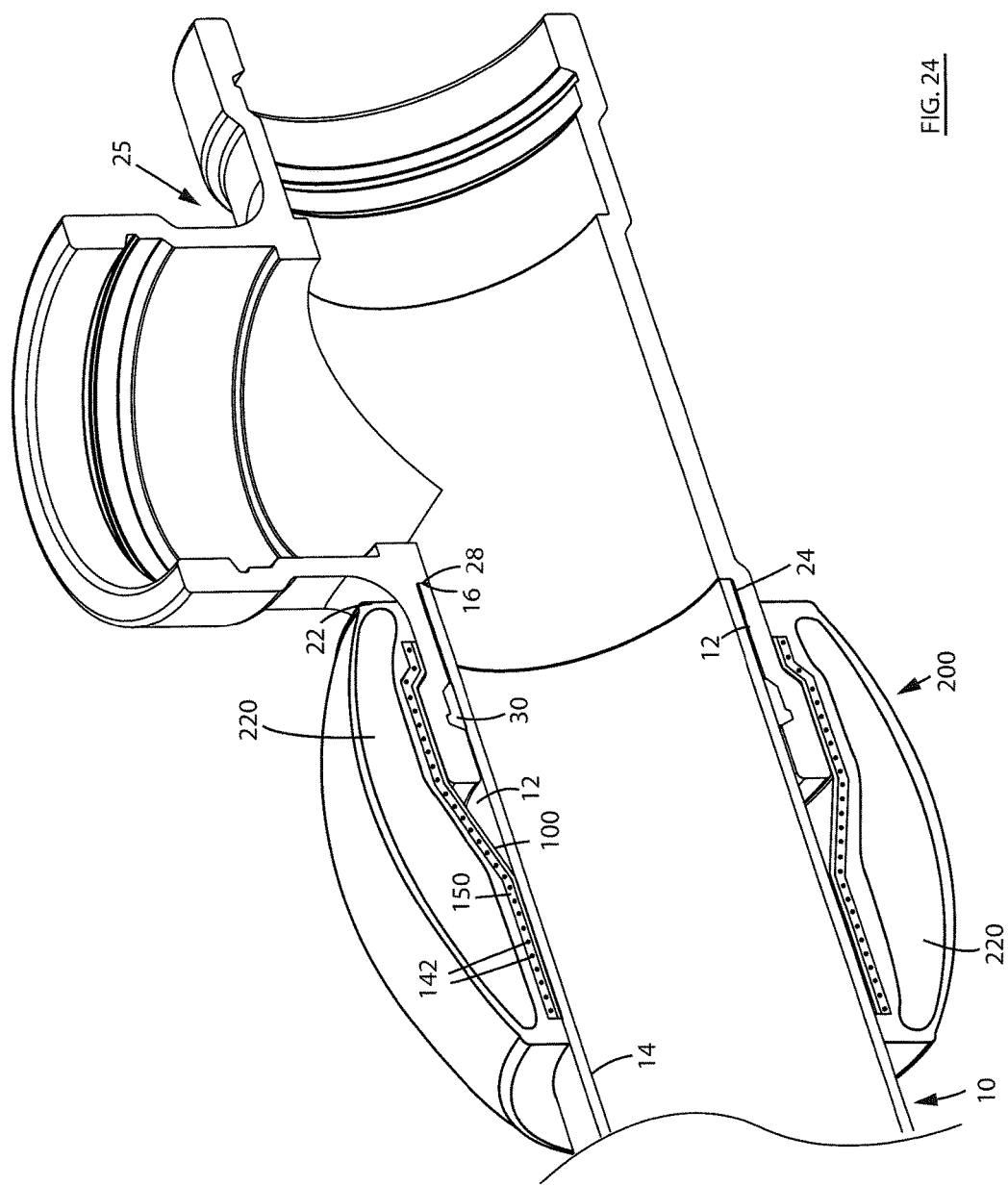
FIG. 24 is a perspective cross-section view of FIG. 23, with the pressure cuff in an inflated state.

FIGS. 22 to 24 exemplify another example of a method of applying a mechanical restraint member to secure two components of a piping system. In this example, after flexible substrate 110 has been positioned about the joint between piping system components 10, 25, a heating blanket 150 having a heating member (e.g. resistive heating element 142) may positioned against the outer surface 112 of flexible substrate 110. As illustrated in FIG. 22, the components are joined using an insertion fit, a sheet of flexible substrate 110 having a bonding agent 120 applied to at least a portion of the inner surface 114 of flexible substrate 110 at each of the first and second ends 116, 118 is wrapped around all or a portion of the joint and may be temporarily secured in position about the joint as discussed previously.

Next, a flexible heating blanket 150 is wrapped around all or a portion of the joint, so that all or a portion of inner surface 154 of heating blanket 150 is in contact with the outer surface 112 of flexible substrate 110. Heating blanket 150 may be temporarily secured in position about the flexible substrate 110 using any suitable means. For example, heating blanket 150 may have one or more hook and loop (or other) fasteners so that once the heating blanket 150 is wrapped around substantially all of the flexible substrate 110, it may be secured to itself. Alternatively or additionally, any of the methods discussed previously with respect to temporarily securing flexible substrate 110 about the joint may be used with heating blanket 150.

Once heating blanket 150 is in position, as illustrated in FIG. 23 a pressure cuff 200 is positioned around the heating blanket and around the perimeter of the joint. In the illustrated embodiment, pressure cuff 200 includes a pressure chamber 220, but does not include a heating element. In accordance with this embodiment, pressure cuff 200 may have a heating element 210 as a backup, in case resistive heating element 142 of heating blanket 150 does not function correctly. Once pressure cuff 200 is in position, it may be inflated as shown in FIG. 24 to apply pressure to flexible substrate 110 and bonding agent 120, while heating element 142 in heating blanket 150 may be energized to apply sufficient heat to activate bonding agent 120. As will be discussed further subsequently, heating element 142 may be energized via pressure cuff 200. For example, heating element 142 may be electrically coupled to a power source via pressure cuff 200.

As above, once bonding agent 120 has cured to provide a sufficient bond strength, pressure cuff 200 may be removed, leaving mechanical restraint member 100 in place to prevent components 10, 25 from separating.

Figure 25:
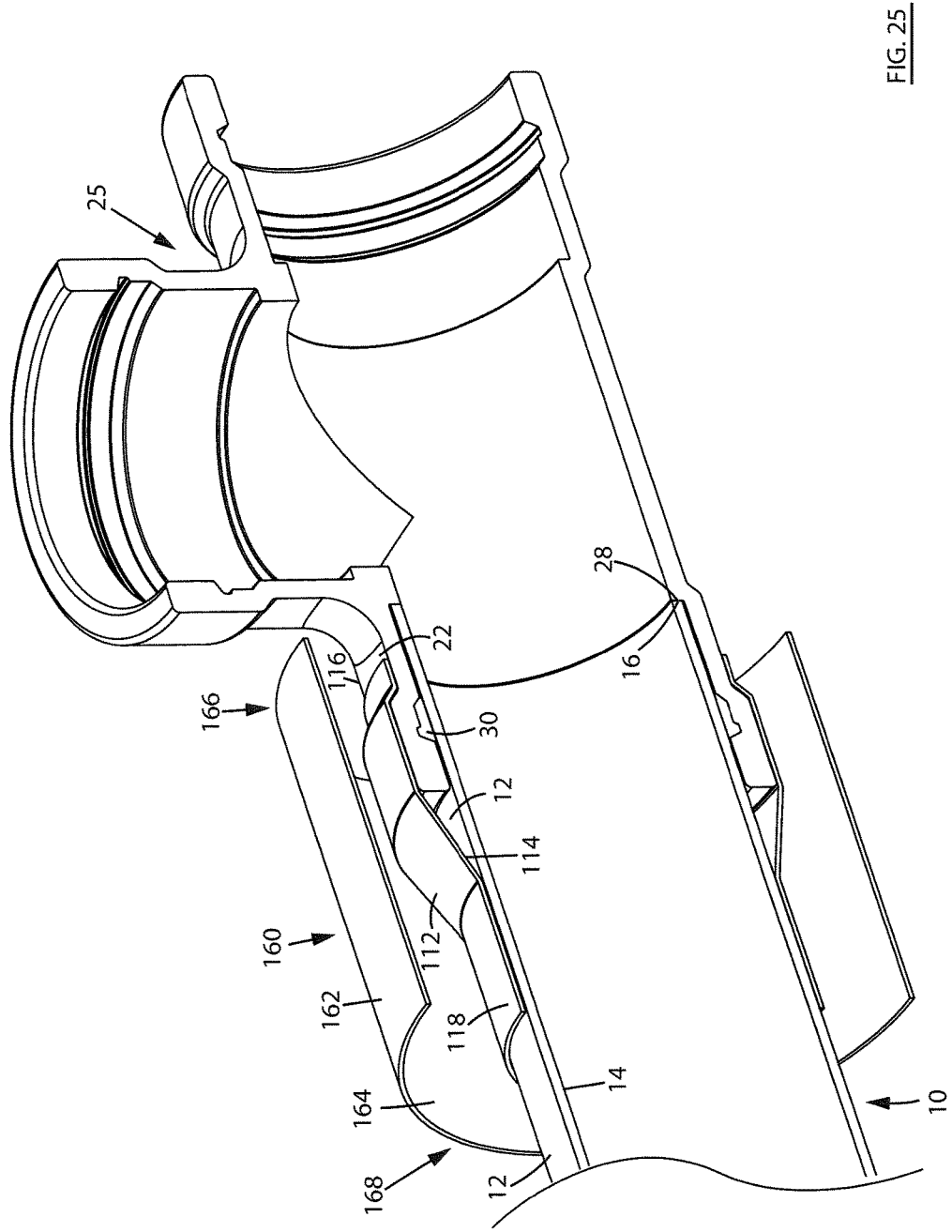
FIG. 25 is a perspective cross-section view of the pipe end and T-fitting of FIG. 3, with the flexible substrate of FIG. 16 wrapped around the joint, and with a heat shrink being wrapped around the joint and the flexible substrate in accordance with another embodiment.

As discussed previously, mechanical restraint member 100 may comprise one or more optional protective layers on the outer surface of flexible substrate 110. FIGS. 25 to 28 exemplify one example of a method of applying a mechanical restraint member with a protective layer. First, as illustrated in FIG. 25, the components are joined using an insertion fit, a sheet of flexible substrate 110 having a bonding agent 120 applied to at least a portion of the inner surface 114 of flexible substrate 110 at each of the first and second ends 116, 118 is wrapped around all or a portion of the joint and temporarily secured in position about the joint as discussed above.

Next, a sheet of protective material 160 is applied to the outer surface 112 of flexible substrate 110. For example, a protective layer may comprise a heat shrink material, such as a thermoplastic material (e.g. polyolefin, fluoropolymer such as FEP, PTFE or the like, or PVC and the like) may be provided.

As shown in FIG. 25, a sheet of a heat shrink material 160 may be wrapped around all or a portion of flexible substrate 110 so that all or a portion of inner surface 164 of heat shrink 160 is in contact with the outer surface 112 of flexible substrate 110. Heat shrink 160 may be temporarily secured in position about the flexible substrate 110 using any suitable means, examples of which were discussed previously.

Figure 26:
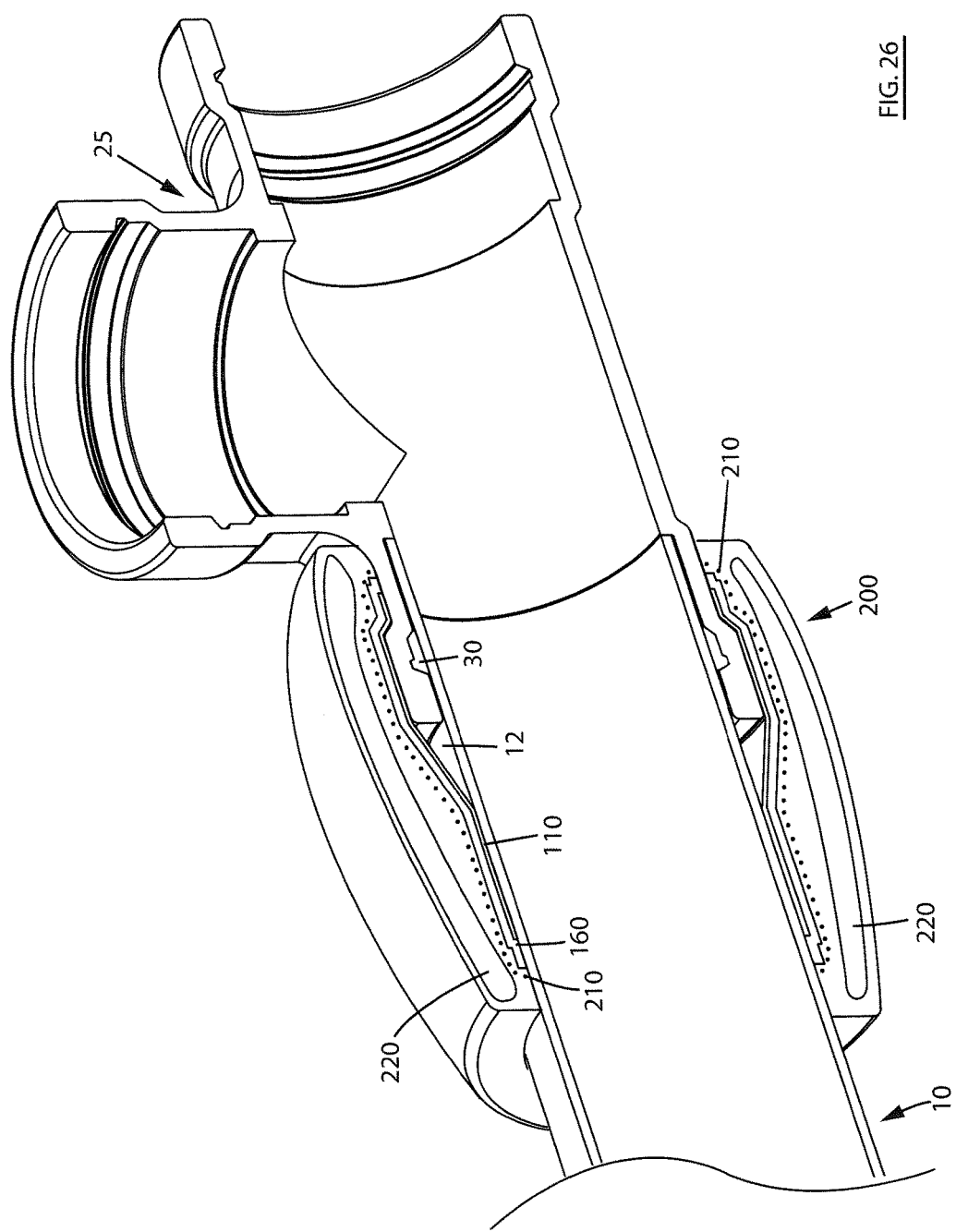
FIG. 26 is a perspective cross-section view of the pipe end and T-fitting of FIG. 3, with the flexible substrate and heat shrink of FIG. 25 and a pressure cuff wrapped around the joint in accordance with another embodiment, wherein the pressure cuff is in an un-inflated state.

Next, as illustrated in FIG. 26, a pressure cuff 200 (examples of which will be discussed further subsequently) is positioned around the sheet of flexible substrate 110 and around the perimeter of the joint. In the illustrated embodiment, pressure cuff 200 includes a heating element 210 and a pressure chamber 220. It will be appreciated that pressure cuff 200 need not include a heating member is a heating member is provided using one of the other constructs disclosed herein.

Once pressure cuff 200 is in position, it may be used to apply heat and/or pressure to heat shrink 160, flexible substrate 110, and bonding agent 120. For example, pressure chamber 220 may be inflated to exert pressure on heat shrink 160 and flexible substrate 110, and heating element 210 may be energized to apply sufficient heat to activate heat shrink 160 and bonding agent 120.

Figure 27:
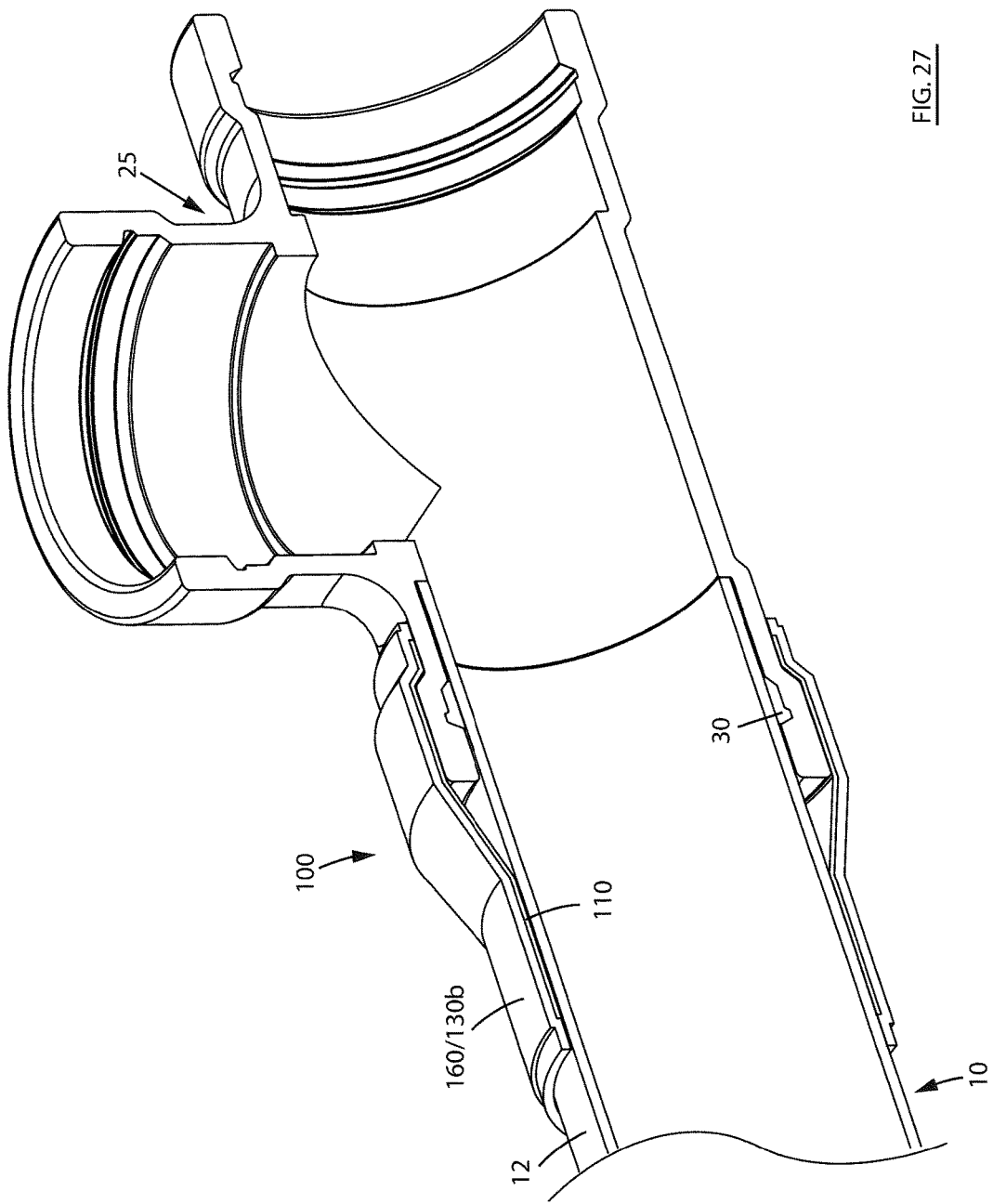
FIG. 27 is a perspective cross-section view of FIG. 28.
Figure 28:
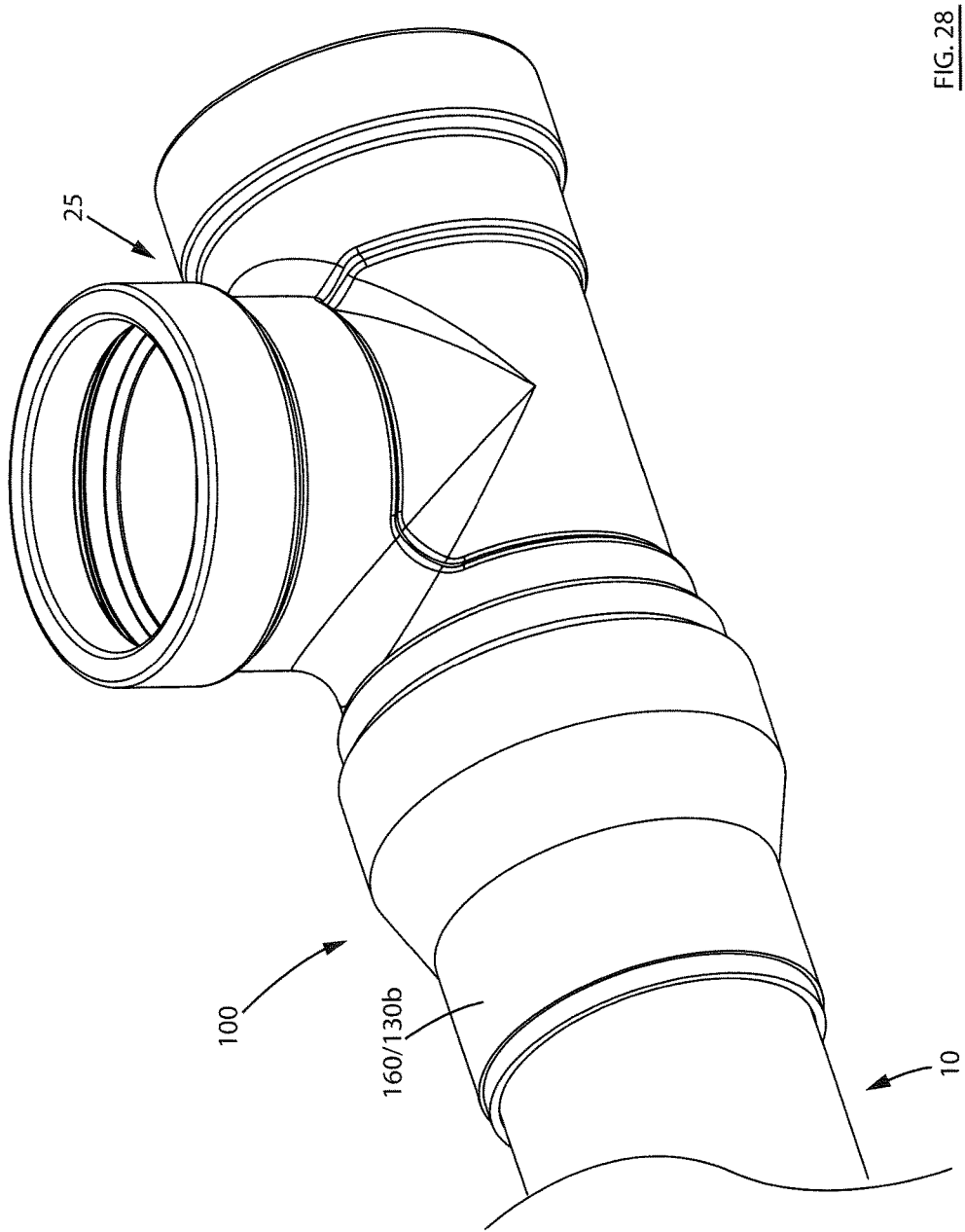
FIG. 28 is a perspective view of the pipe end and T-fitting of FIG. 3 secured with a mechanical restraint member in accordance with another embodiment.

As above, once bonding agent 120 has cured to provide a sufficient bond strength, and heat shrink 160 has shrunk to form a protective layer 130b, pressure cuff 200 may be removed, leaving the heat shrink-wrapped mechanical restraint member 100 in place to secure conduits 10, 25, as shown in FIGS. 27 and 28.

While in the methods described above, bonding agent 120 was thermally activated by an external heat source, in other embodiments the bonding agent may be heated using a heating member part or all of which is incorporated into flexible substrate 110. For example, flexible substrate 110 may have bonding agent 120 applied to its inner side 114, and another composition provided on, e.g., outer side 112, this other composition capable of being activated by applying a catalytic agent (e.g. as a spray, or as another sheet of material applied to the outer surface 112 of flexible substrate 110) to initiate an exothermic reaction. Alternatively, the exothermically reactive compositions may be placed is separate pockets which are rupturable to enable to reagents to react and produce heat. For example, the pockets may be designed to rupture when pressure cuff 200 is inflated (e.g., the walls of the pockets may be sufficiently thin such that they will rupture when pressure is applied, or one or more piercing members may be provided to break an adjoining wall of the pockets when pressure is applied. Such an exothermic composition and catalyst may comprise components that achieve a Grignard reaction (an organo-metallic chemical reaction), iron metal powder and an oxidizer such as sodium chloride, and the like.

It will be appreciated that the features of mechanical restraint member 100 and methods of applying mechanical restraint member 100 to secure two component of a piping system may be used in any particular combination or subcombination.

Figure 29:
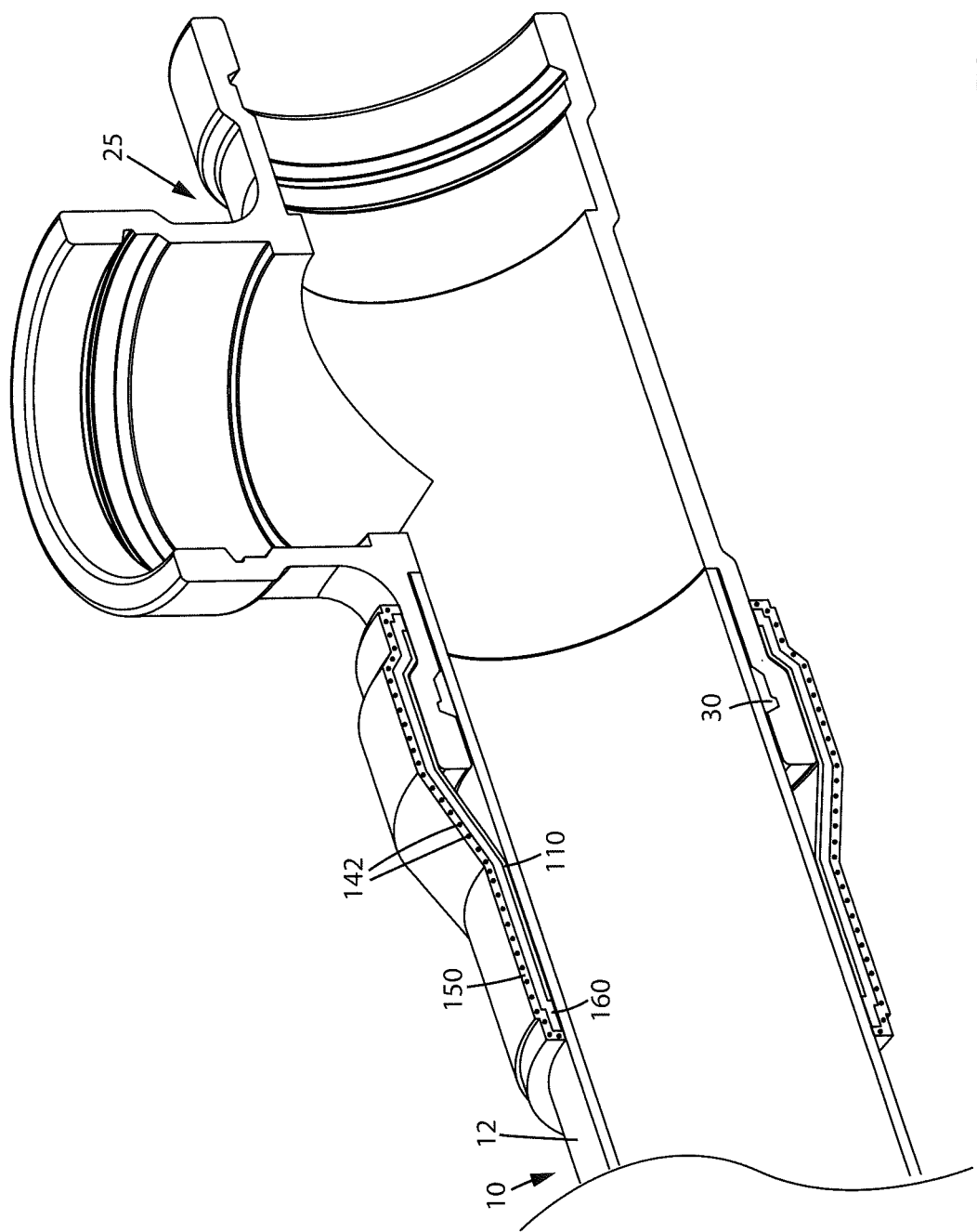
FIG. 29 is a perspective cross-section view of the pipe end and T-fitting of FIG. 3, with the flexible substrate and heat shrink of FIG. 25 wrapped around the joint, and with a heating blanket wrapped around the heat shrink in accordance with another embodiment.
Figure 30:
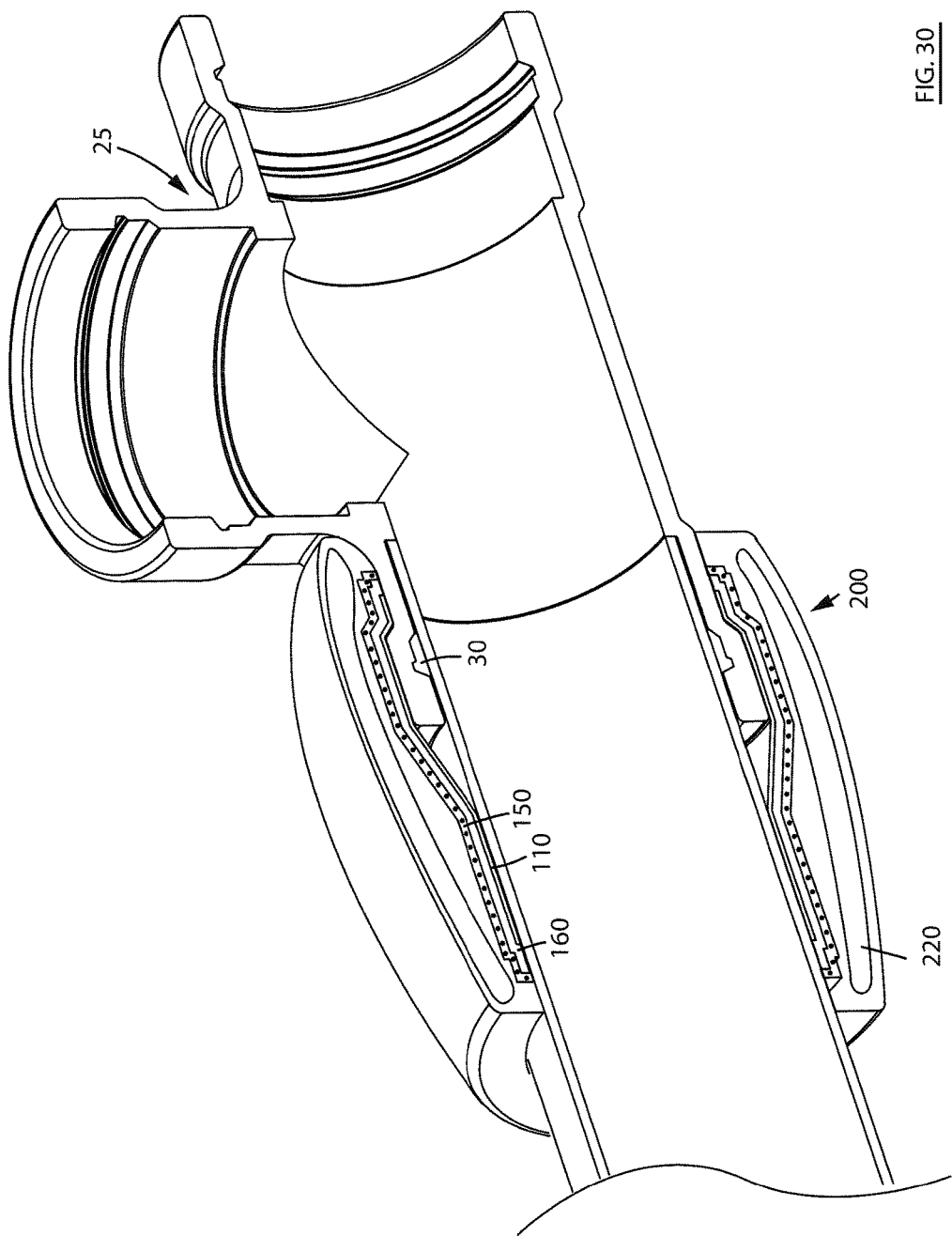
FIG. 30 is a perspective cross-section view of the pipe end and T-fitting of FIG. 3, with the flexible substrate, heat shrink, and heating blanket of FIG. 29 and a pressure cuff wrapped around the joint, wherein the pressure cuff is in an un-inflated state.
Figure 31:
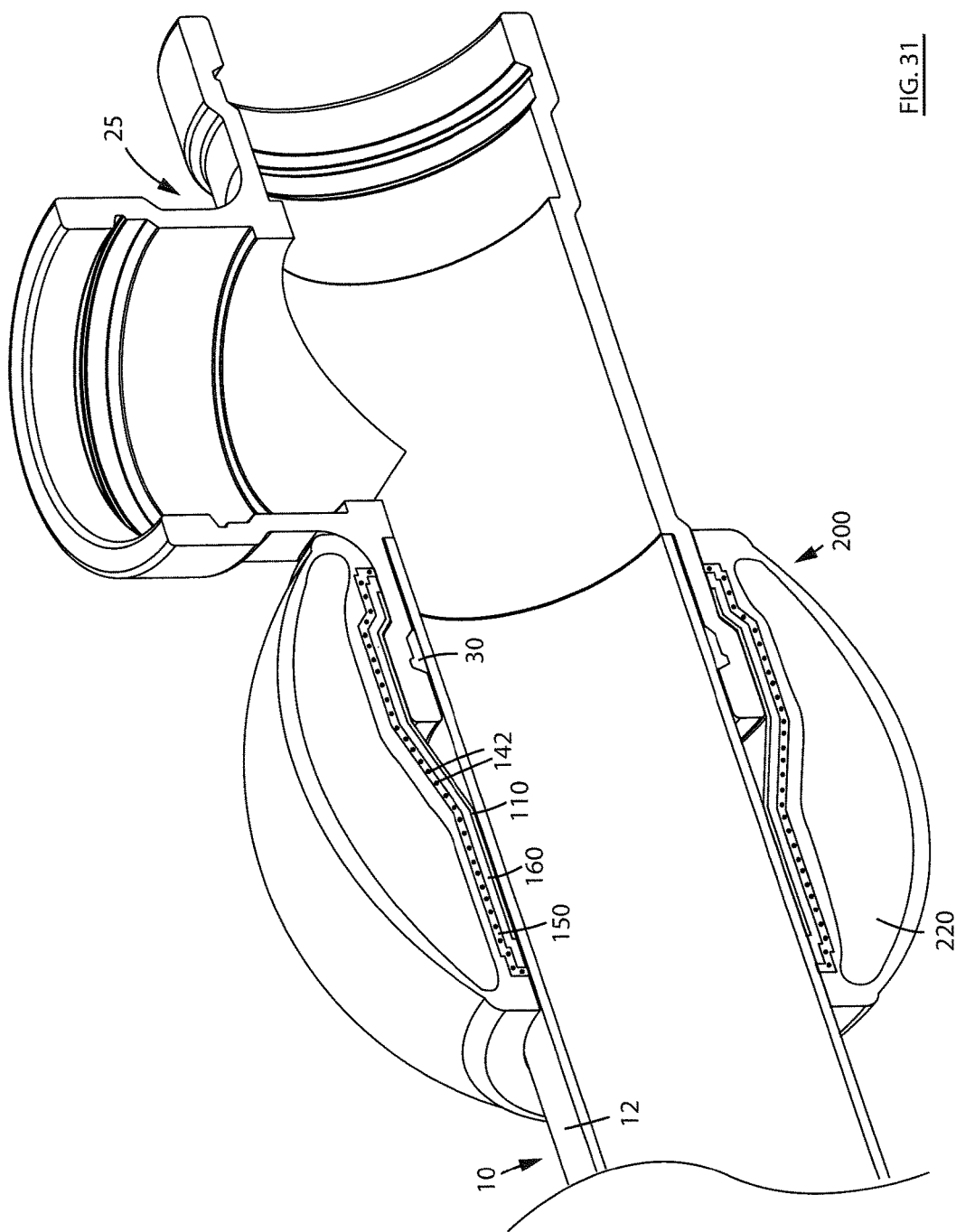
FIG. 31 is a perspective cross-section view of FIG. 30, with the pressure cuff in an inflated state.

For example, as illustrated in FIGS. 29 to 31, a mechanical restraint member 100 may be applied by layering a flexible substrate 110, a shrink wrap 160, and a heating blanket 150 about a joint, and using resistive heating elements 142 in heating blanket 150 to apply heat while applying pressure using pressure cuff 200.

Figure 32:
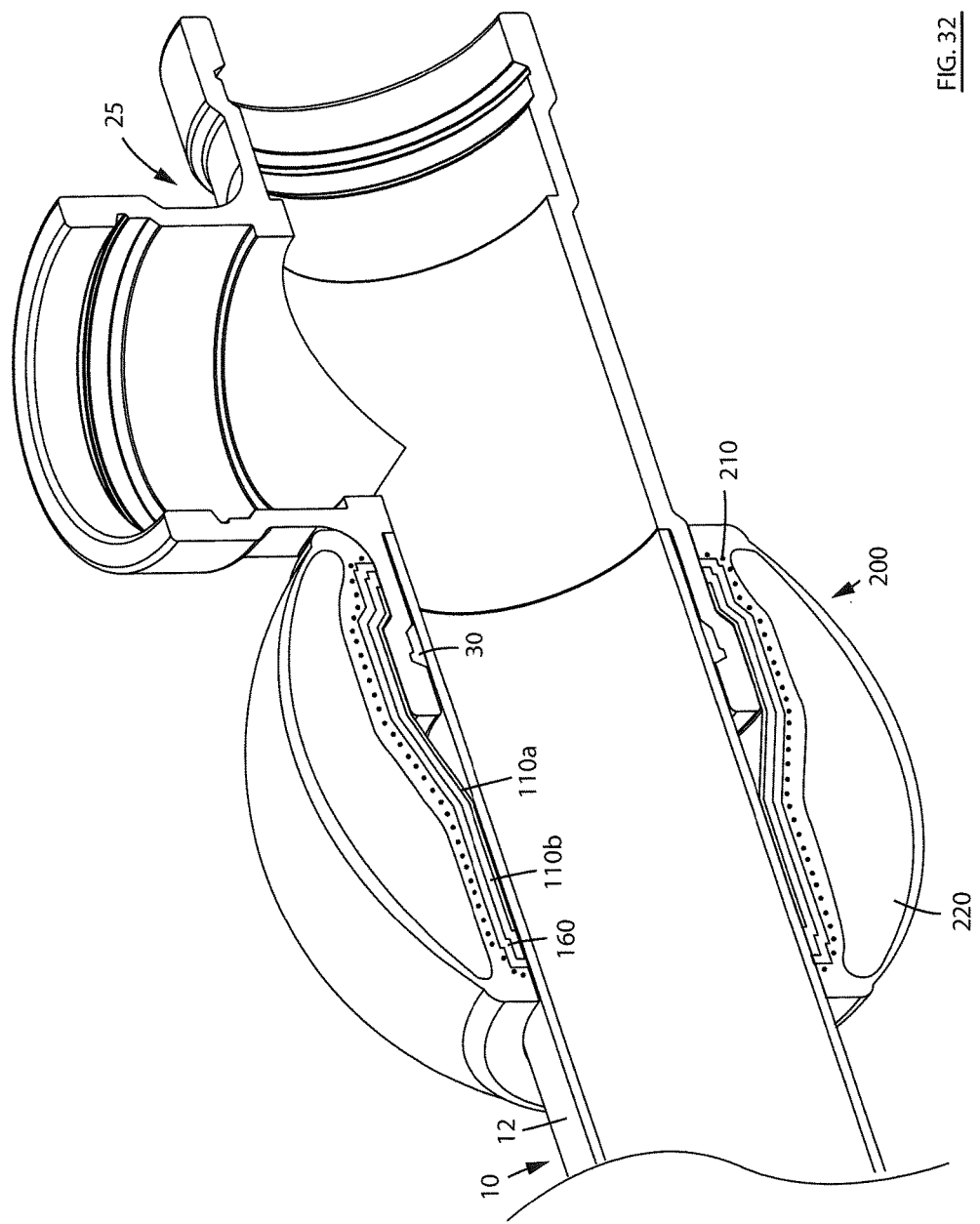
FIG. 32 is a perspective cross-section view of the pipe end and T-fitting of FIG. 3, with two layers of flexible substrate and a heat shrink being around the joint, and a pressure cuff wrapped around the joint and in an inflated state in accordance with another embodiment.

Another example is shown in FIG. 32, where mechanical restraint member 100 is applied by layering two flexible substrates 110a, 110b impregnated with bonding agent 120, a layer of heat shrink 160, and then using a pressure cuff 200 having both a pressure cavity 220 and a heating element 210 to apply heat and pressure.

As previously noted, the bonding agent 120 of a mechanical restraint member 100 may be provided on all or only on portions of the inner surface 114 of flexible substrate 110. Examples of various different configurations of bonding agent 120 and flexible substrate 110 are exemplified in FIGS. 33-40. It will be appreciated that other configurations may be possible, in variant embodiments.

Figure 33:
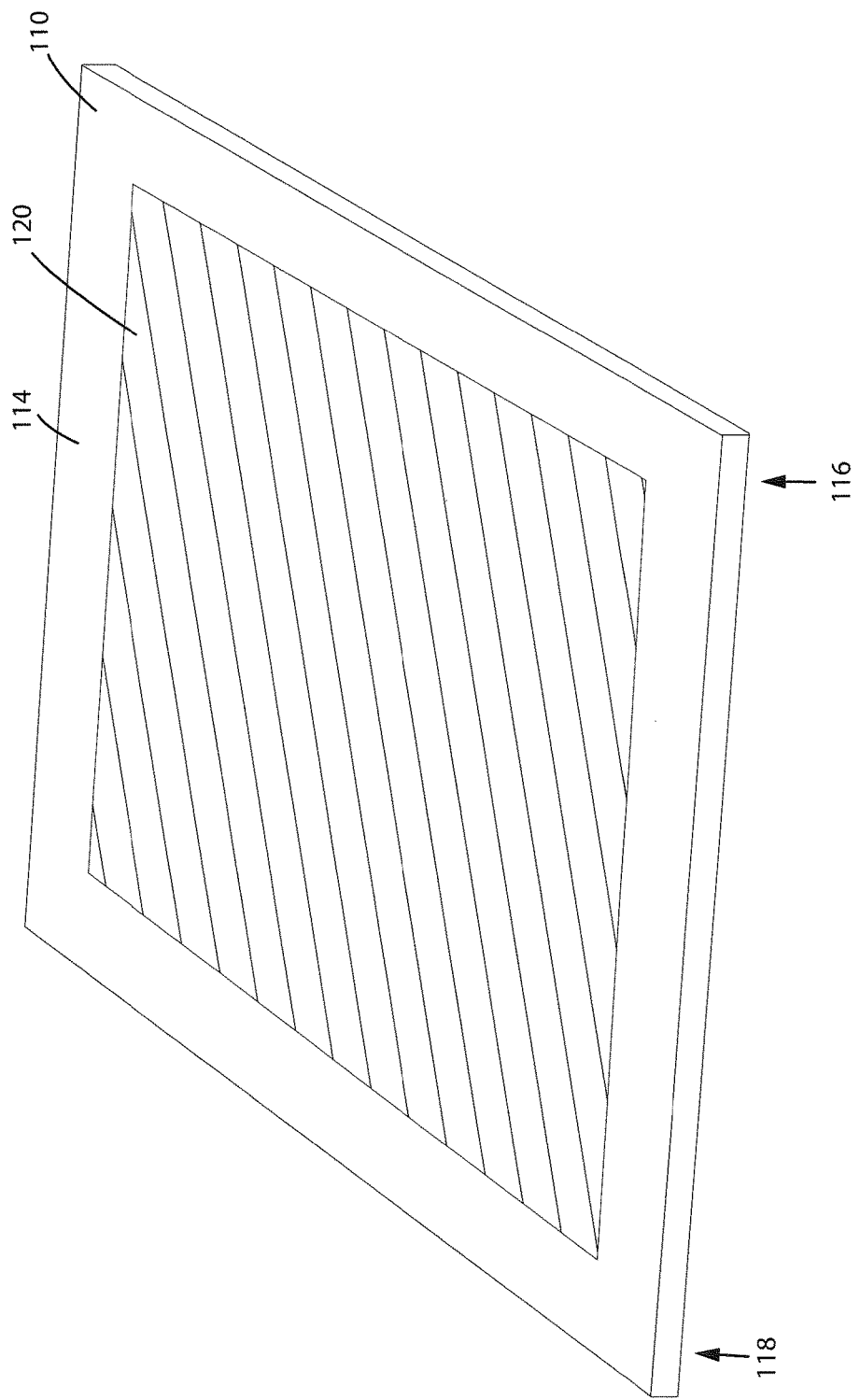
FIG. 33 is a perspective view of a sheet of flexible substrate with a first bonding agent applied to substantially all of the sheet in accordance with an embodiment.

In FIG. 33, a contiguous area of bonding agent 120 has been applied to substantially all of the inner surface 114 of a flexible substrate 110. It will be appreciated that bonding agent may be applied to all of inner surface 114.

Figure 34:
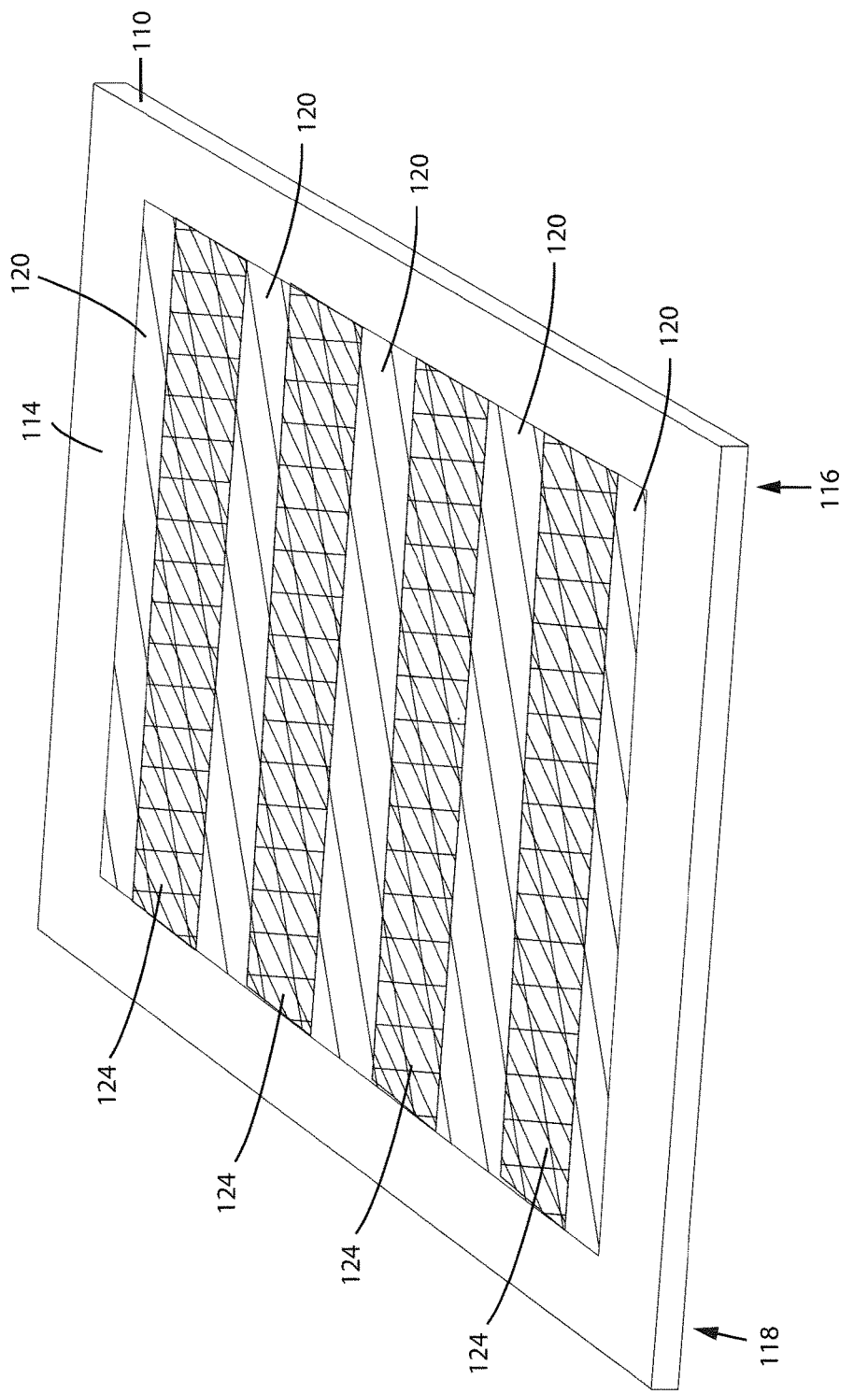
FIG. 34 is a perspective view of the sheet of flexible substrate of FIG. 33, with strips of a temporary adhesive applied to the bonding agent in accordance with another embodiment.

In FIG. 34, a contiguous area of bonding agent 120 has been applied to substantially all of the inner surface 114 of a flexible substrate 110. Also, longitudinal strips of temporary adhesive 124 have been applied to the surface of bonding agent 120, to assist in temporarily positioning flexible substrate 110 about the piping system components, prior to activating the bonding agent 120.

Figure 35:
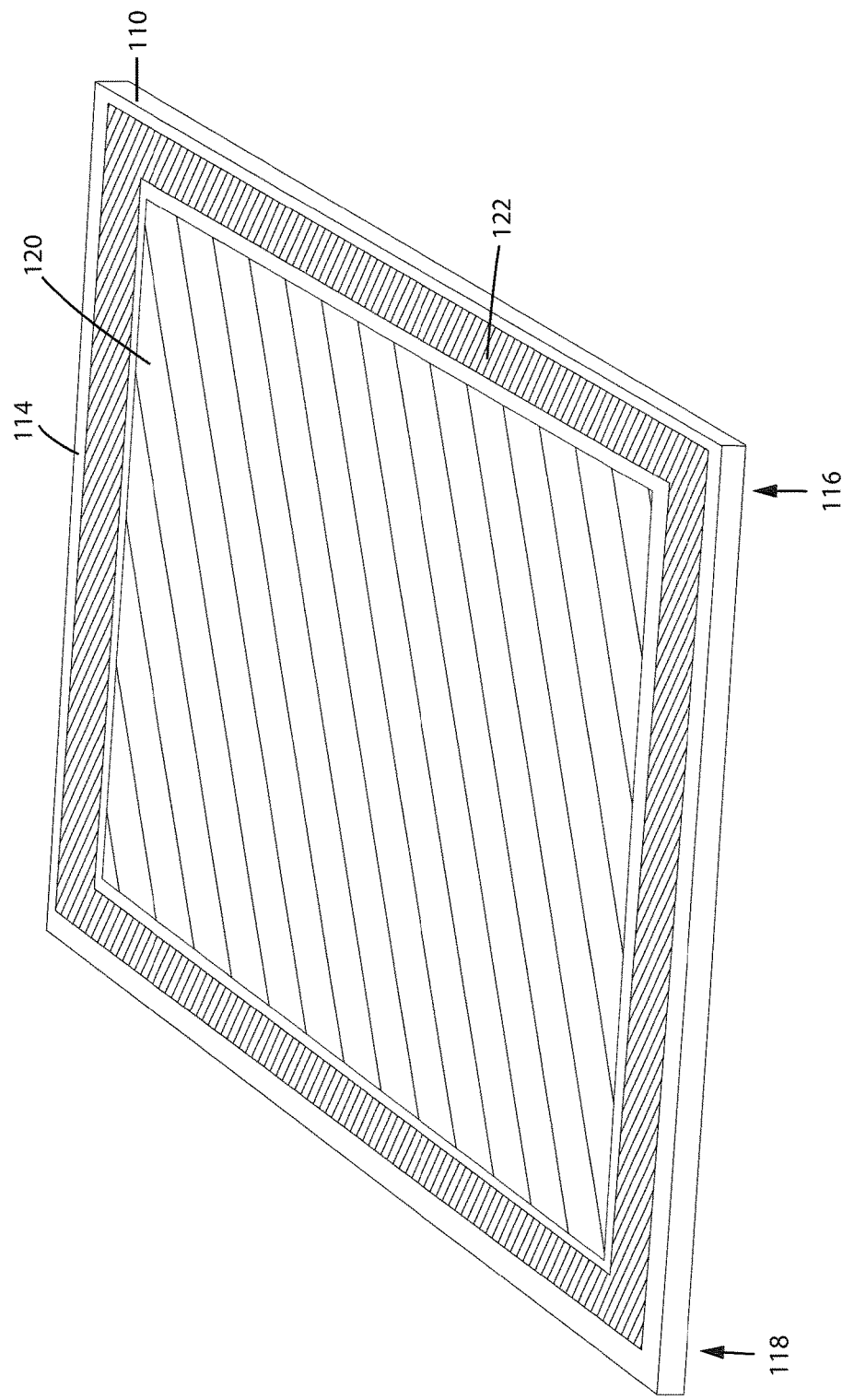
FIG. 35 is a perspective view of the sheet of flexible substrate of FIG. 33, with a second bonding agent applied around the first bonding agent in accordance with another embodiment.

In FIG. 35, a contiguous area of a first bonding agent 120 has been applied to substantially all of the inner surface 114 of a flexible substrate 110. Also, a second bonding agent 122 has been applied around the perimeter of the area to which the first bonding agent 120 has been applied. This second bonding agent 122 may be selected to have different properties than first bonding agent 120. For example, be second bonding agent 122 may be more resistant to chemical degradation from water. The second bonding agent 122 may comprise an adhesive compatible with the mechanical restraint member and the pipe system component and resistant to degradation from water such as one or more of a hot melt glue, any type of adhesive which is inert e.g., a silicon based adhesive including those that are acetic acid or platinum reaction curing, and the like.

An advantage of providing a second bonding agent 122 around the perimeter of bonding agent 120 is that when a flexible substrate 110 with this configuration of bonding agents is bonded to a piping system, the first bonding agent 120 may primarily provide the bond strength necessary to prevent the piping system components from separating, while second bonding agent 122 may form a protective barrier around the first bonding agent 120, preventing water or other environmental contaminants from contacting and possibly degrading the bond formed by bonding agent 120. Accordingly, the second bonding agent need not provide any resistance to mechanical separation of the components of the joint.

Figure 36:
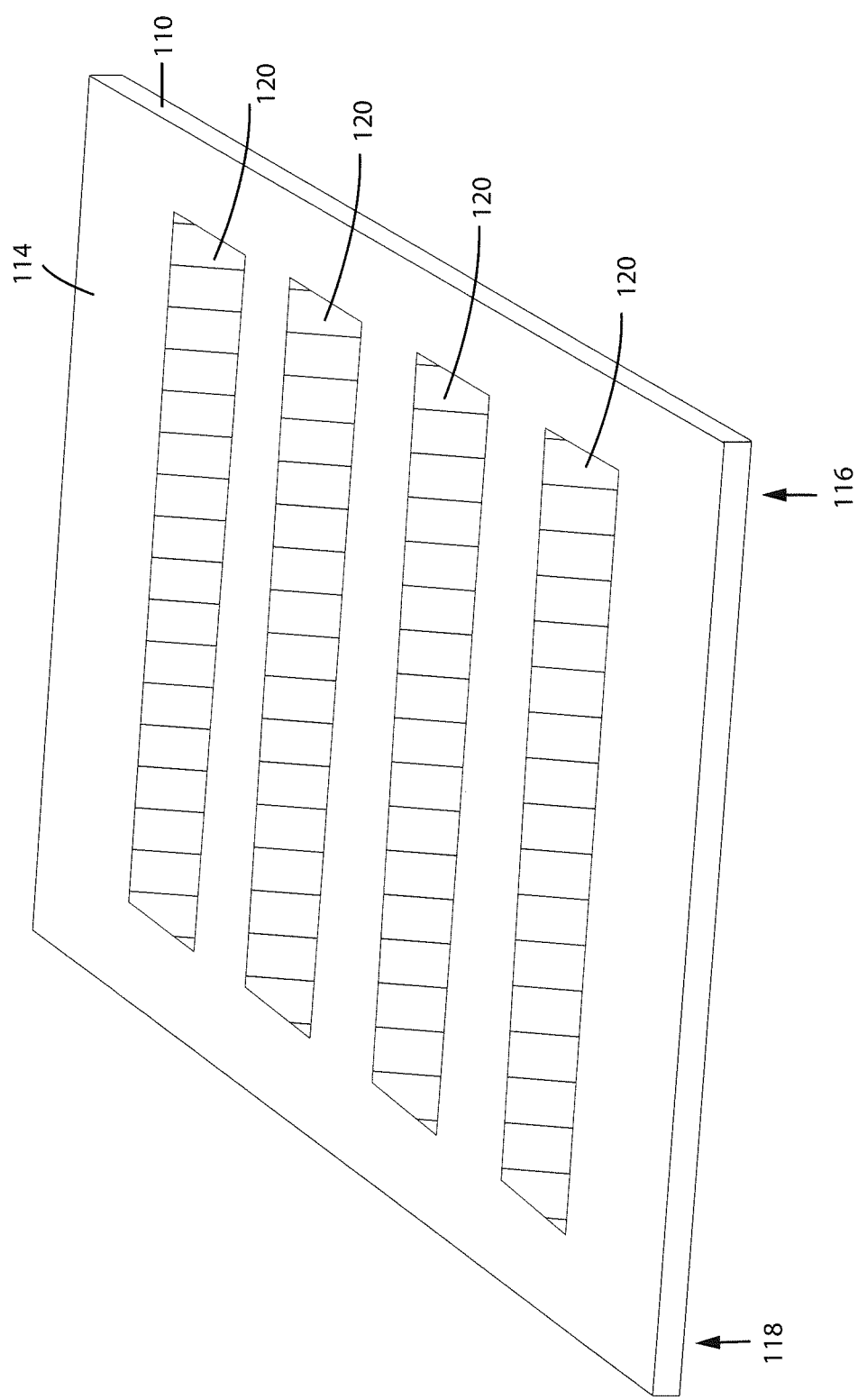
FIG. 36 is a perspective view of a sheet of flexible substrate with a first bonding agent applied in discrete strips in accordance with another embodiment
Figure 37:
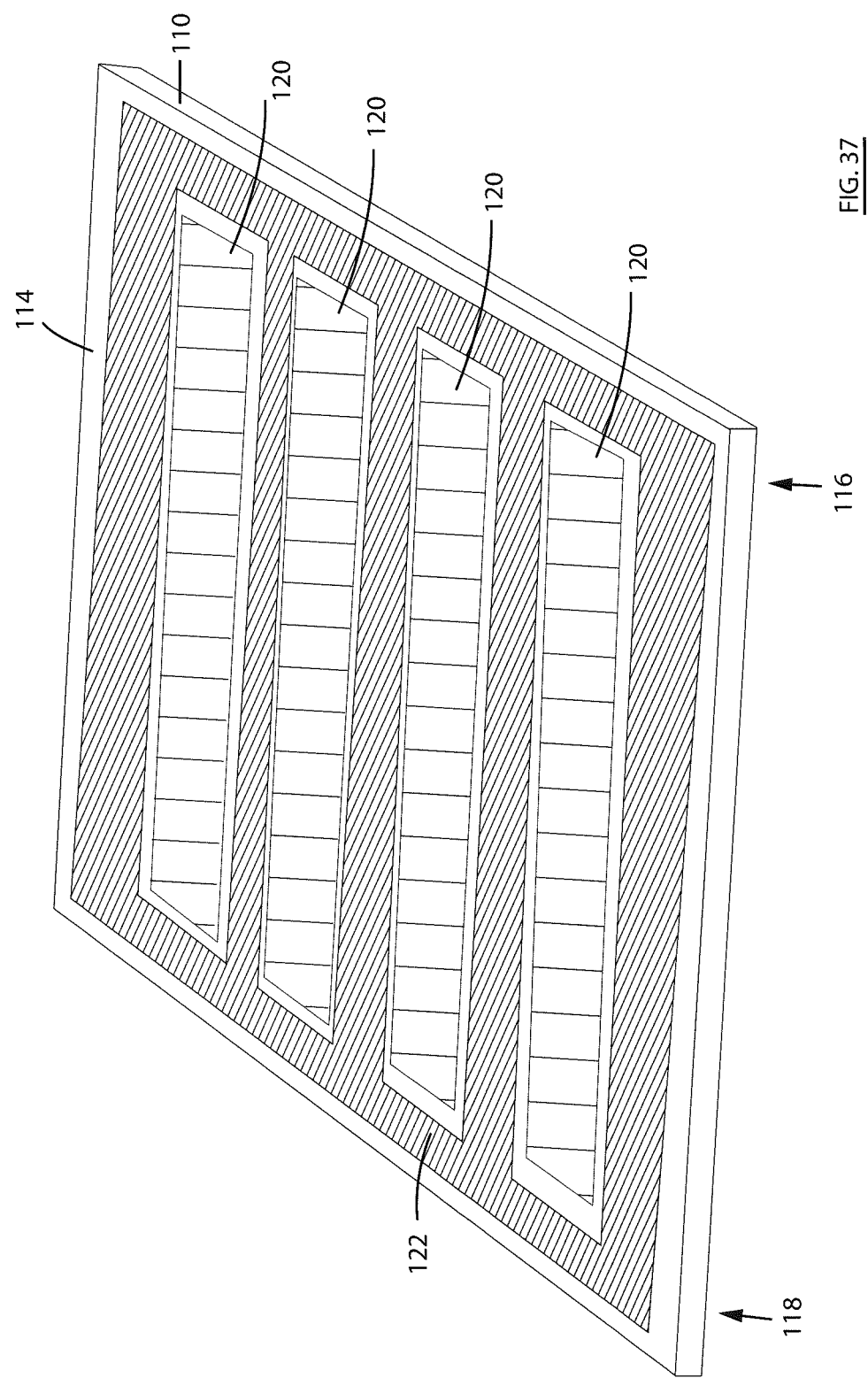
FIG. 37 is a perspective view of the sheet of flexible substrate of FIG. 36, with a second bonding agent applied around the first bonding agent in accordance with another embodiment.
Figure 38:
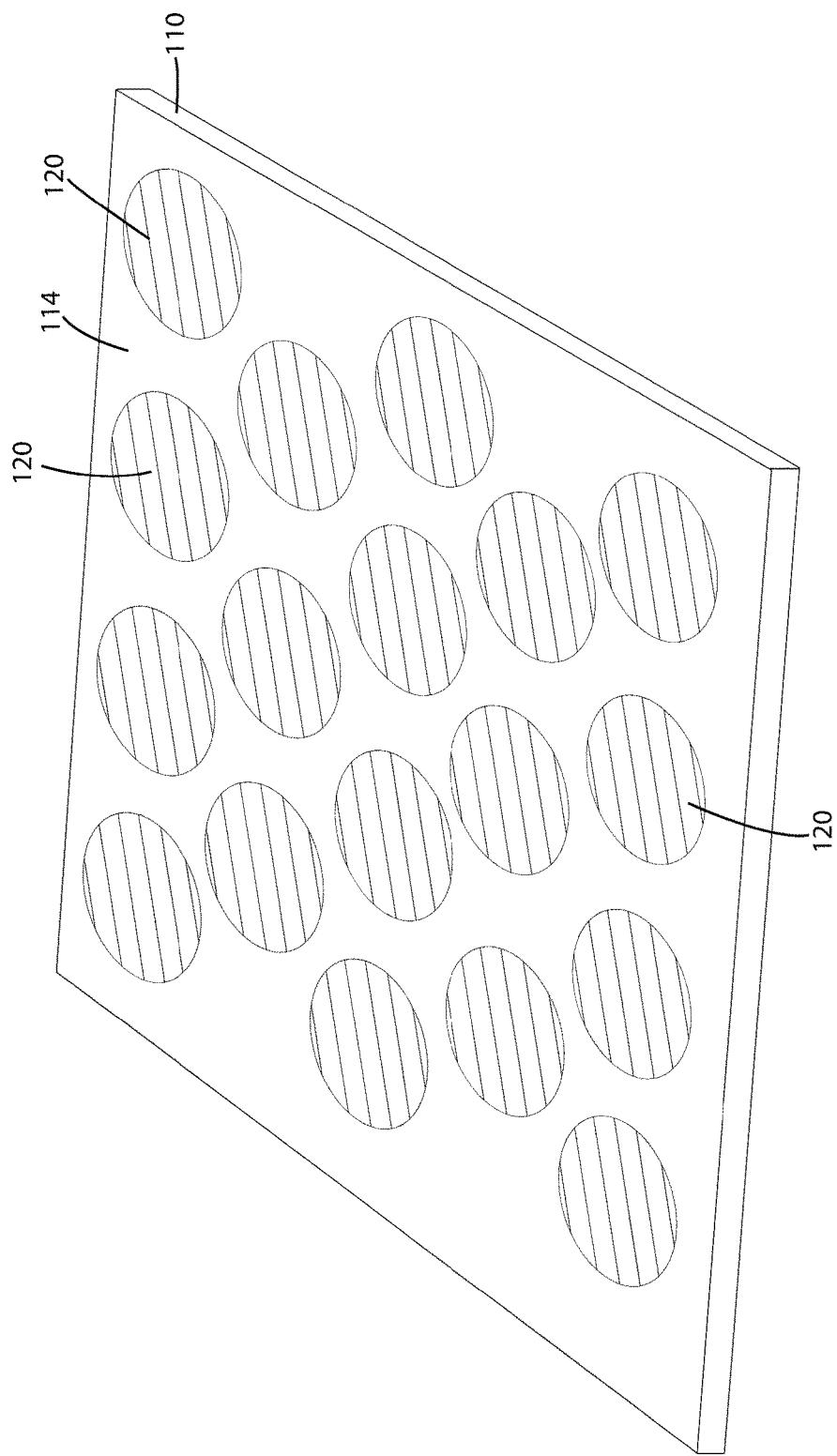
FIG. 38 is a perspective view of a sheet of flexible substrate with a first bonding agent applied in a pattern of discontinuous dots in accordance with another embodiment.

As discussed previously, bonding agent 120 need not be applied continuously over inner surface 114. For example, as shown in FIG. 36, strips of bonding agent 120 have been applied to the inner surface 114 of a flexible substrate 110. In FIG. 37, each strip of bonding agent 120 has been provided with a continuous perimeter of a second bonding agent 122. FIG. 38 illustrates a pattern of discontinuous dots of bonding agent 120 that have been applied to the inner surface 114 of a flexible substrate 110.

Figure 39:
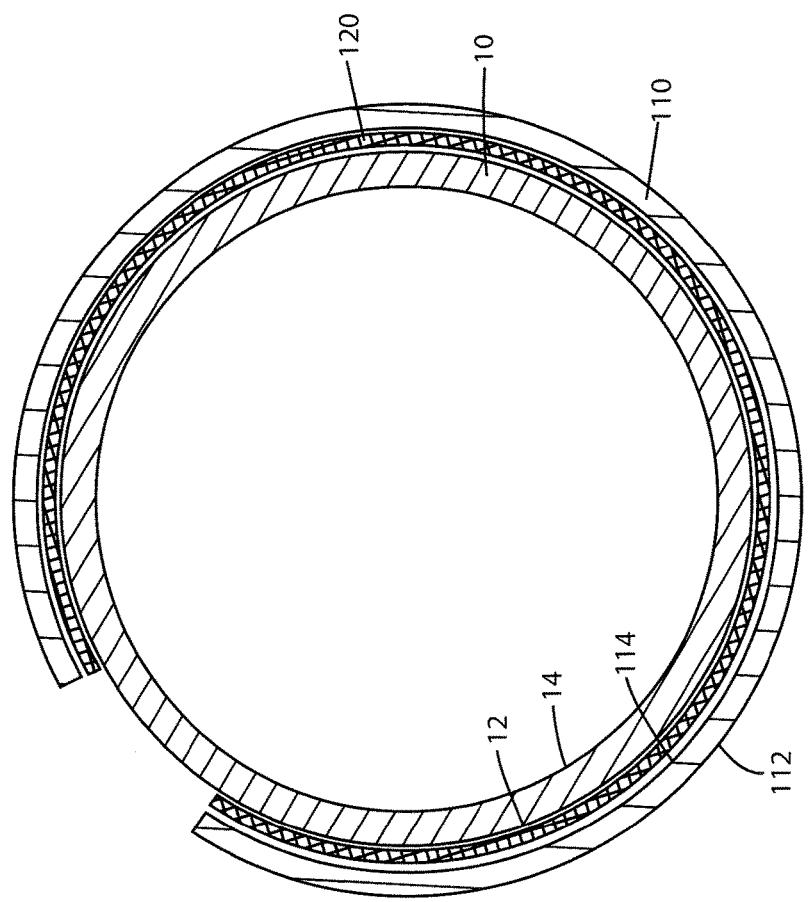
FIG. 39 is an end-section of a pipe end with the sheet of flexible substrate of FIG. 33 bonded to the pipe end in accordance with another embodiment.
Figure 40:
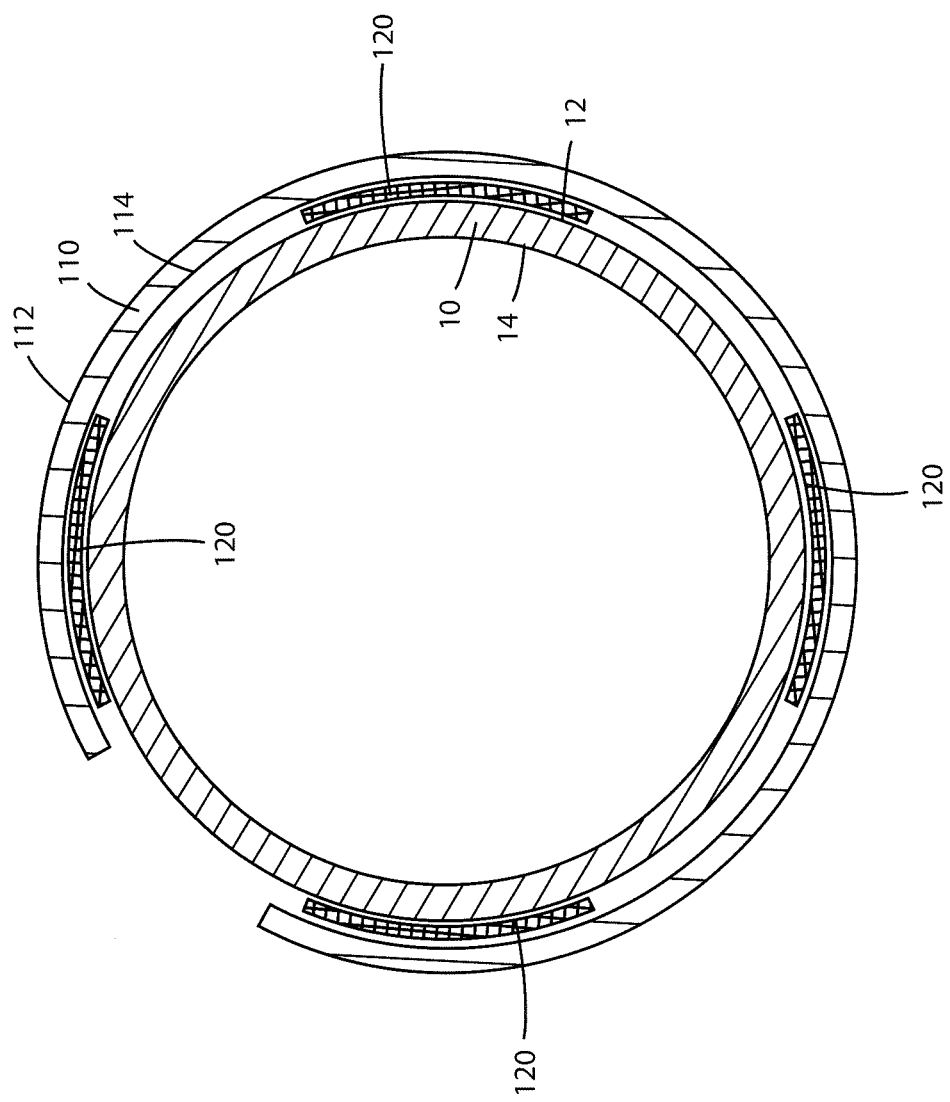
FIG. 40 is an end-section of a pipe end with the sheet of flexible substrate of FIG. 36 bonded to the pipe end in accordance with another embodiment.

FIG. 39 illustrates an end section view of a pipe 10 to which a sheet of flexible substrate 110 has been bonded, where the bonding agent 120 was applied to substantially all of the inner surface 114 of flexible substrate 110 prior to bonding (e.g. as shown in FIG. 33). As exemplified, a continuous band of bonding agent 120 is provided circumferentially around the joint. FIG. 40 illustrates an end section view of a pipe 10 to which a sheet of flexible substrate 110 has been bonded, where the bonding agent 120 was applied in discrete strips to the inner surface 114 of flexible substrate 110 prior to bonding (e.g. as shown in FIG. 36). As exemplified, a discontinuous band of bonding agent 120 is provided circumferentially around the joint.

Figures 41A, 41B:
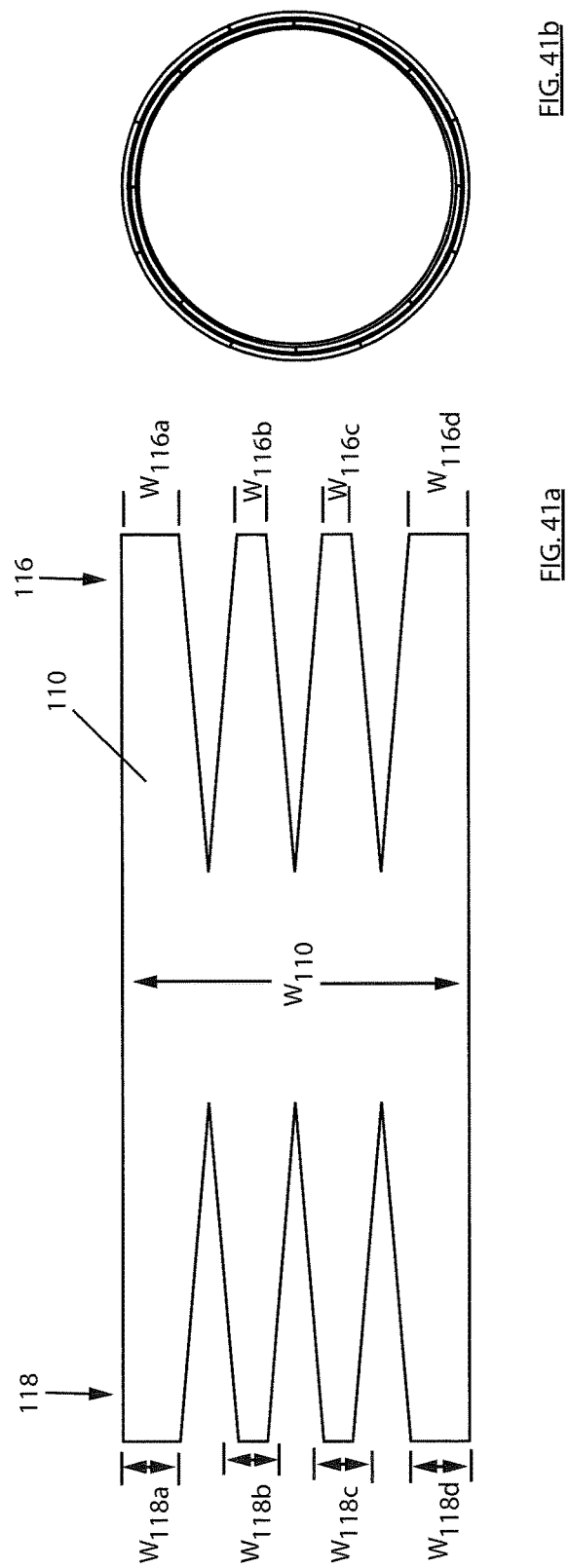
FIG. 41a is a top view of a sheet of the flexible substrate of FIG. 36, with a plurality of cutouts provided at each end, in accordance with another embodiment.
FIG. 41b is an end-section of a pipe end with the sheet of flexible substrate of FIG. 41a bonded to the pipe end in accordance with another embodiment.

It will be appreciated that flexible substrate 110 may be provided in any suitable shape. For example, flexible substrate 110 may be a substantially planar sheet shaped so as to facilitate wrapping flexible substrate 110 around a joint between two piping system conduits, where the joint has two or more different outer dimensions. For example, as illustrated in FIG. 41a, one or more notches, grooves or the like may be provided at the ends 116, 118 of flexible substrate 110. Accordingly, when wrapped around a pipe, the substrate may overlap itself less, or optionally, there may be no overlap. In the illustrated example, the total width of first end 116 (i.e. $W_{116_a}+W_{116_b}+W_{116_c}+W_{116_d}$) may be substantially equal to the outer circumferential length of one of the two piping system components being joined (e.g. junction 25) axially offset away from the widest part of the junction, the total width of flexible substrate 110 (i.e. $W_{110}$) may be substantially equal to the outer circumferential length at the widest part of the junction, and the total linear width of second end 118 (i.e. $W_{118_a}+W_{118_b}+W_{118_c}+W_{118_d}$) may be substantially equal to the outer circumferential length of the other of the two piping system components being joined (e.g. pipe 10) axially offset from the widest part of the junction. In this way, when flexible substrate 110 is wrapped around the joint between components 10, 25 (i.e., the flexible substrate is wrapped in the width direction circumferentially around a joint), most or preferably all of inner face 114 of flexible substrate 110 may lie substantially flush with the outer surface of the components to which it is being bonded, as illustrated in FIG. 41b. It will be appreciated that notches may be provided at one end, at both ends, or at neither end.

Optionally, the outer surface of mechanical restraint member 100 may be provided with a material that undergoes a visually observable change when heated, e.g. a thermochromic substance such as leuco dyes, liquid crystals, and the like. The use of such a material may allow a visual indication that the outer surface of flexible substrate 110 was raised to a certain temperature (i.e. the transition temperature at which the thermochromic material changes colour), which may be used to infer that sufficient heat was applied to flexible substrate 110 during the bonding process to activate a thermally-activated bonding agent. It will be appreciated that the thermochromic material may be selected and/or modified to provide a colour change at predetermined temperature (e.g. 100%, or from 100% to 110%, or higher than 110% of the temperature required to activate bonding agent 120).

Figure 43:
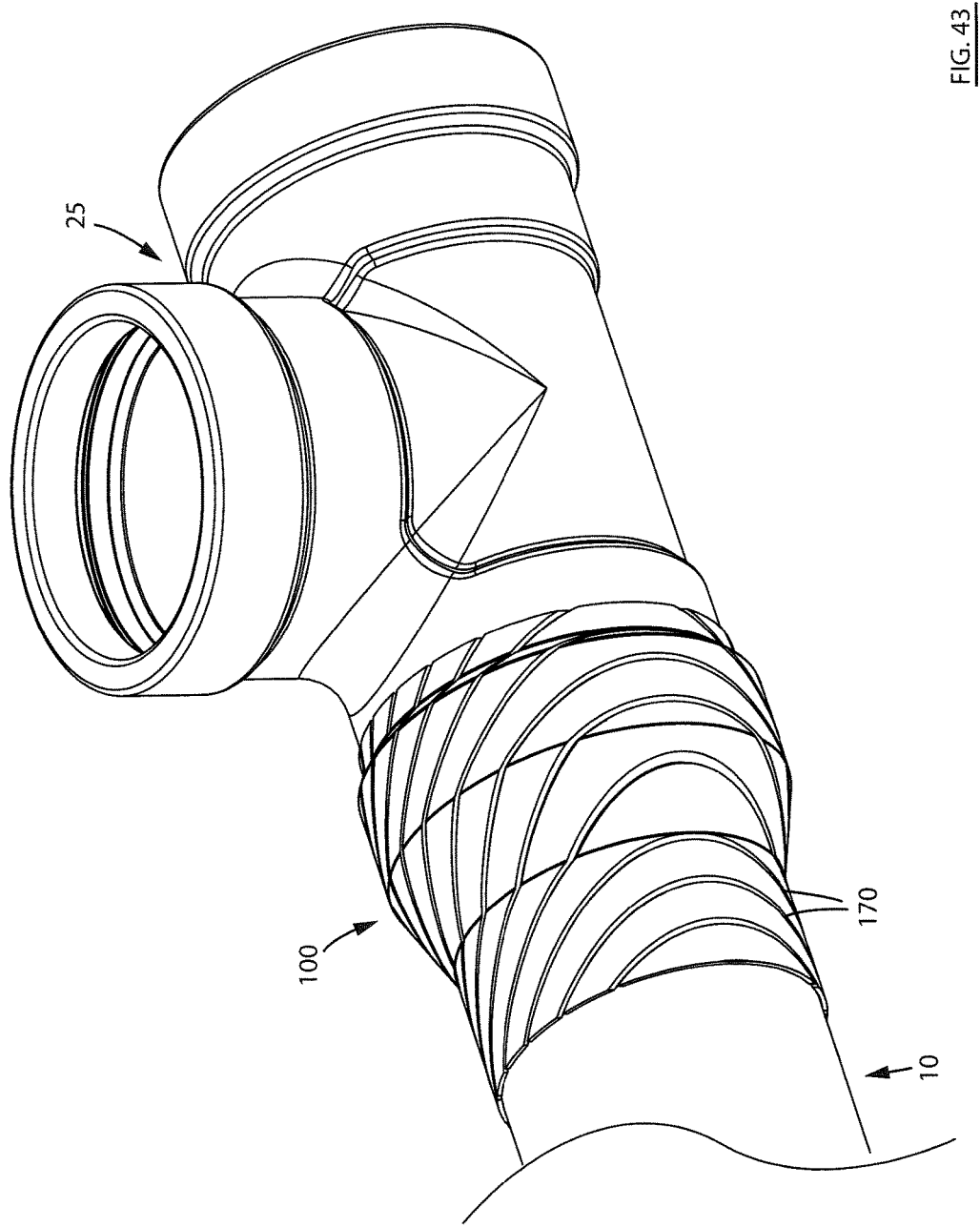
FIG. 43 is a perspective view of the pipe end and T-fitting of FIG. 3 secured with a mechanical restraint member, the mechanical restraint member having a visual pattern of thermochromic material in accordance with another embodiment.

A thermochromic material may be applied to substantially all of the outer surface of flexible substrate 110. Thus, a colour change could be observed to confirm that substantially all of flexible substrate 110 reached the predetermined. Alternatively, or additionally, a thermochromic substance 170 may be applied in a pattern such as the pattern exemplified in FIG. 43, to reduce the amount of thermochromic material required and/or to locate the thermochromic material at areas of greater importance—for example, where discontinuous strips of bonding agent 120 are applied to the inner surface 114 of flexible substrate 110 (see e.g. FIG. 36), thermochromic material 170 may only be applied at corresponding locations on outer surface 112.

As discussed previously, a mechanical restraint member 100 may be bonded to a portion of the outer surfaces 12, 22 of each of the piping system components, thereby restraining the components from separating (see e.g. the embodiments illustrated in FIGS. 6 to 9). In an alternative embodiment, two piping system components may be restrained by bonding one or more securement members to the outer surfaces of each of the piping system components using a bonding agent, and then mechanically coupling the securement member(s) bonded to one component to the securement member(s) bonded to the other component. For example, one or more mechanical restraint members according to any embodiment herein, each of which may have one or more securement members, may be bonded to one component and one or more mechanical restraint members according to any embodiment herein, each of which may have one or more securement members, may be bonded to the other component. Once bonded, the securement members may be mechanically coupled together thereby inhibiting the outward axial movement of one component with respect to the other component of the joint. The securement members act as an interface between the flexible substrate that has been bonded to the piping system component and a mechanical coupling mechanism that is used to mechanical couple two or more securement members to each other. Examples of securement members include eyelets, hooks, posts, and the like affixed to an outer surface of the flexible substrate, openings provided in the flexible substrate itself and the like. The securement members may be mechanically coupled or otherwise engaged to each other using any suitable means, such as using a flexible elongate tie member e.g., wire or rope made of metallic (e.g., steel, brass, copper and the like) or non-metallic members, which may be natural and/or synthetic fibers (such as glass fiber, aramid fiber, polypropylene fiber, carbon fiber), chains, and/or rigid tie members such as mechanical fasteners (e.g. bolts, screws, and the like), turnbuckles, and the like. The tie members may optionally be tensioned during or after their coupling to the securement members. It will be appreciated that any suitable combination of securement member and mechanical fastener may be used.

Figure 44:
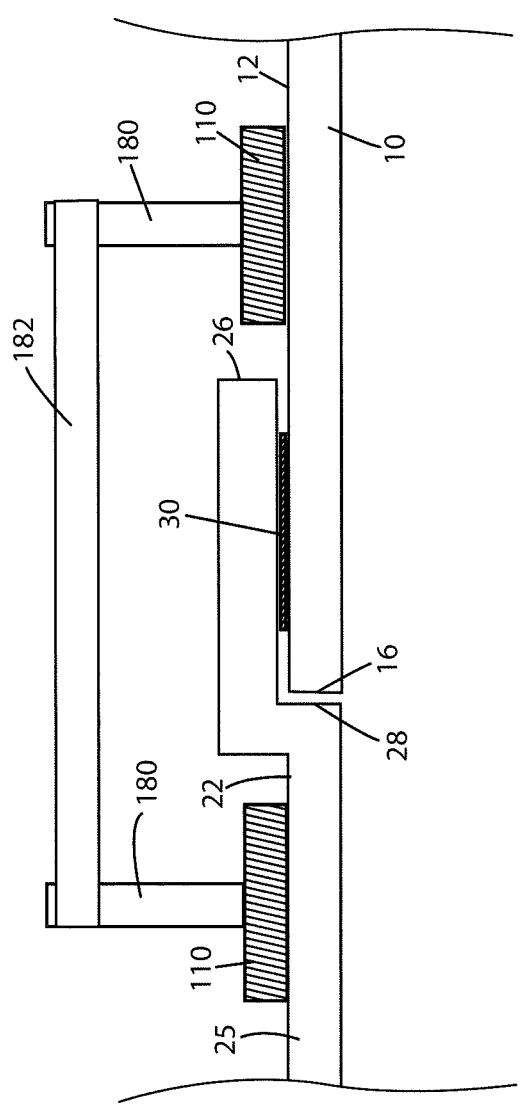
FIG. 44 is a schematic cross-section view of a pipe end and a fitting secured in accordance with another embodiment.

In the example illustrated in FIG. 44, components 10, 25 have been joined using an insertion fit, as discussed previously. A piece of flexible substrate 110 to which a securement member 180 is secured is bonded to the outer surface 22 of conduit 25, and another piece of flexible substrate 110 to which a securement member 180 is secured is bonded to the outer surface 12 of conduit 10. Securement members 180 are mechanically coupled to each other to restrain the securement members (and thereby the pipe system components to which they are bonded) in the axial direction. It will be appreciated that securement members 180 may be the same or different. For example, securement members bonded to one component may have a threaded bore for receiving the threaded end of a mechanical fastener 182 (e.g. a screw or bolt), while securement members bonded to the other component may have a plain bore. In this way, mechanical fastener 182 (e.g. a screw or bolt) may be inserted through one securement member, and threaded into another securement member.

It will be appreciated that the securement members may be attached to the flexible substrate prior to the flexible substrate being bonded to the component. However, in other embodiments, the securement members may be attached to the flexible substrate concurrently with the flexible substrate being bonded to the component or thereafter.

In another variant embodiment, mechanical restraint member 100 may be applied to the pipe system components to be restrained by positioning a flexible substrate across the joint, and injecting a bonding agent through or around the flexible substrate to bond the flexible substrate to the piping system components. In other words, a flexible substrate is positioned across the joint, and a bonding agent is injected in situ.

Figure 45:
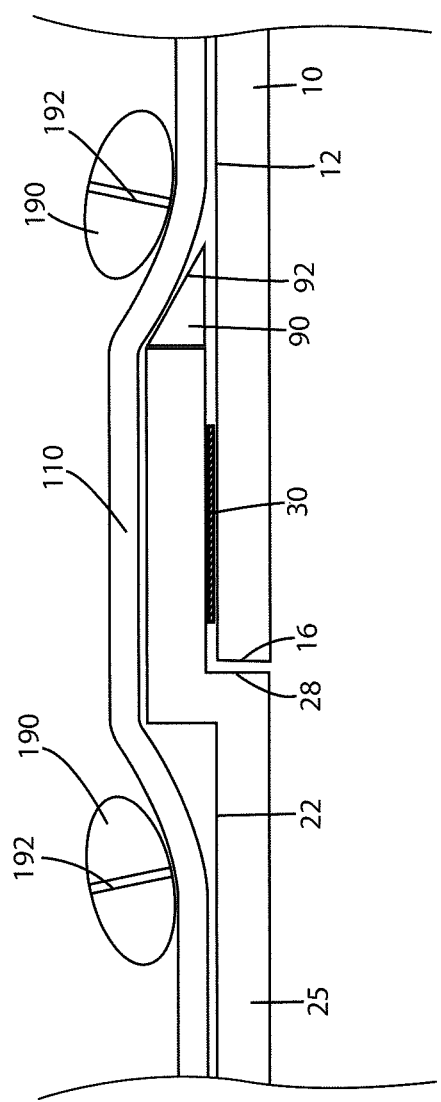
FIG. 45 is a schematic cross-section view of a pipe end and a fitting being secured with an mechanical restraint member using a bonding apparatus in accordance with another embodiment.

For example, as illustrated in FIG. 45, components 10, 25 have been joined using an insertion fit, as discussed previously. Flexible substrate 110 is positioned on the outer surface of the components to overlie the joint between components 10, 25. Once flexible substrate 110 is in position, a bonding apparatus may be used to inject a bonding agent through the flexible substrate 110 (e.g. through the openings in a perforated substrate or through the pores in a woven flexible substrate 110) so that the bonding agent is operable to bond flexible substrate 110 to the piping system components. For example, the bonding apparatus may have one or more heads 190 for applying pressure to flexible substrate 110 (e.g. to maintain flexible substrate 110 in position during the injection of bonding agent 120, and/or to act as a seal against the outer surface 112 of flexible substrate 110 to force bonding agent 120 into the flexible substrate 110). One or more injection passages 192 may be provided through heads 190 for delivering bonding agent 120 to flexible substrate 110. In some embodiments, one or more heads 190 may be incorporated into the inner surface of a pipe securing apparatus, as will be discussed subsequently.

Pipe Securing Apparatus

Reference is now made to FIGS. 46 to 55, which exemplify different embodiments of a pipe securing apparatus 200, each of which may be used with the methods disclosed herein. Pipe securing apparatus 200 may also be referred to as a pressure cuff. Pressure cuff 200 may be of any construct that enables pressure to be applied to the outer surface of flexible substrate 110. Pipe securing apparatus 200 includes one or more pressure chambers, referred to generally as 220, and may include one or more heat producing elements, referred to generally as 220, as will be discussed further subsequently. Pipe securing apparatus 200 may be used with one or more of mechanical restraint member 100, the application method, and the quality control module 300 disclosed herein.

Figure 46:
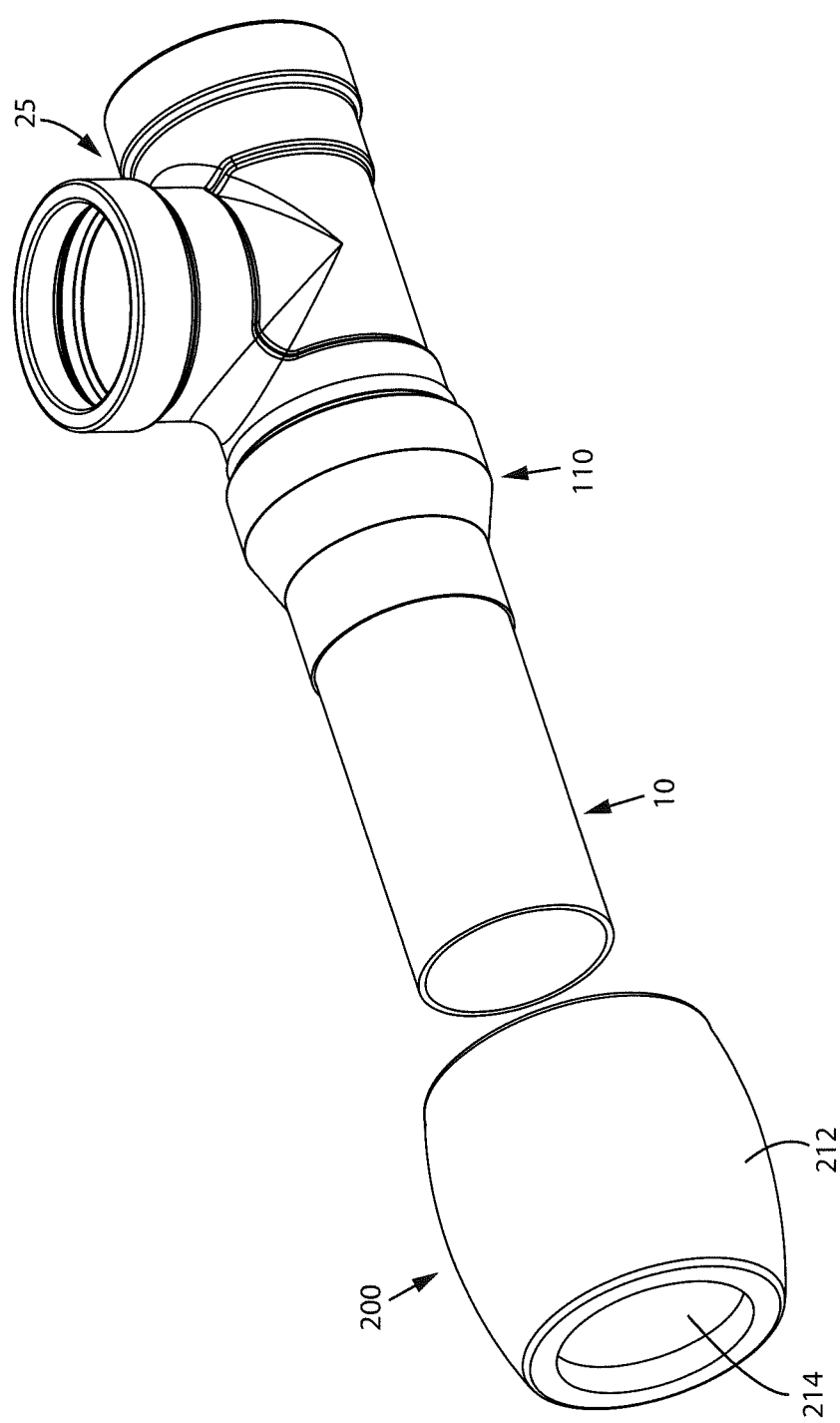
FIG. 46 is a perspective view of a pipe end and T-fitting, with the flexible substrate of FIG. 16 wrapped around the joint, and a pipe securing apparatus in accordance with one embodiment.
Figure 47:
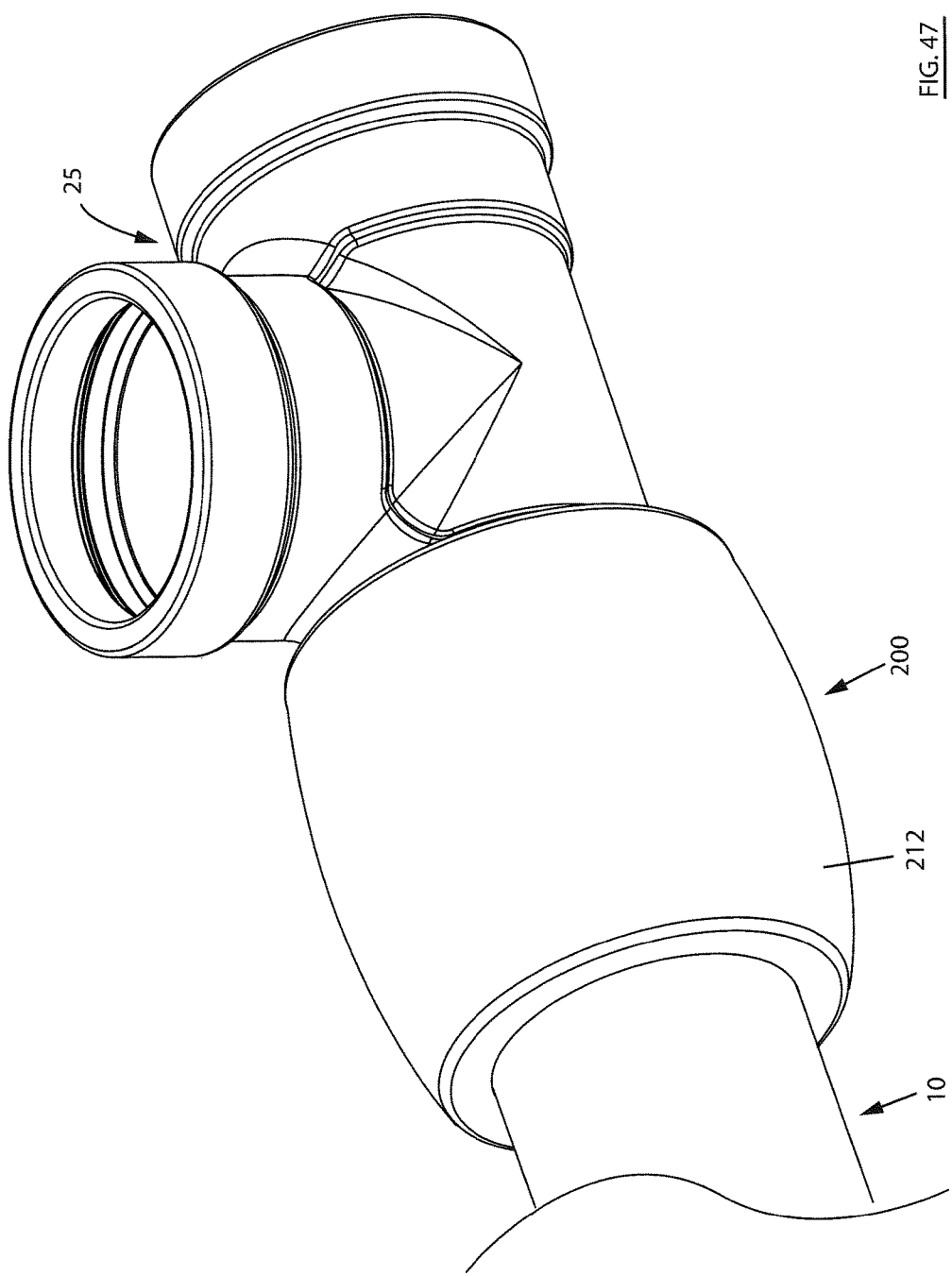
FIG. 47 is a perspective view of the pipe end and T-fitting of FIG. 46, with the pipe securing apparatus positioned over the flexible substrate wherein the pipe securing apparatus is in an un-inflated state.
Figure 48:
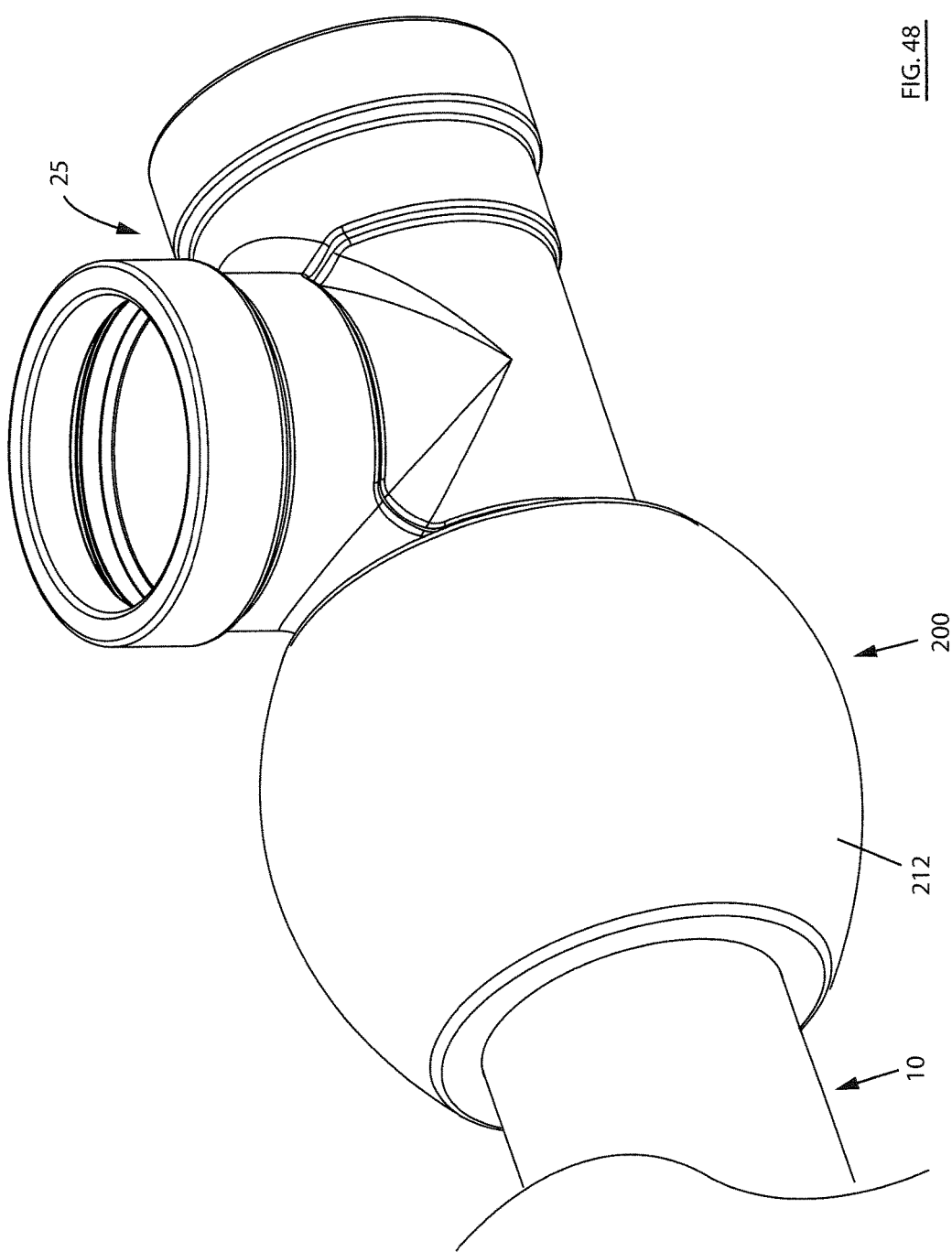
FIG. 48 is a perspective view of the pipe end and T-fitting of FIG. 46, with the pipe securing apparatus positioned over the flexible substrate wherein the pipe securing apparatus is in an inflated state.

FIGS. 46 to 48 exemplify one embodiment of a pipe securing apparatus that may be used in applying a mechanical restraint member to secure two components of a piping system. As exemplified in FIG. 46, pressure cuff 200 is an annular cuff sized to fit over at least one end of a component to be joined, and having an outer surface 212 and an inner surface 214. Pressure cuff 200 may be brought into position by sliding pressure cuff 200 over a free end of one component being joined (e.g. pipe 10) and then along the component until it overlies flexible substrate 110 and, accordingly, around the perimeter of the joint. Once pressure cuff 200 is in position, as shown in FIG. 47, it may be used to apply pressure and/or heat to flexible substrate 110 and bonding agent 120. As illustrated in FIG. 48, one or more pressure chambers—e.g. a singular continuous annular inflatable pocket (not shown)—may be inflated to exert pressure on flexible substrate 110, and a heating element may be energized to apply sufficient heat to activate bonding agent 120.

Figure 49:
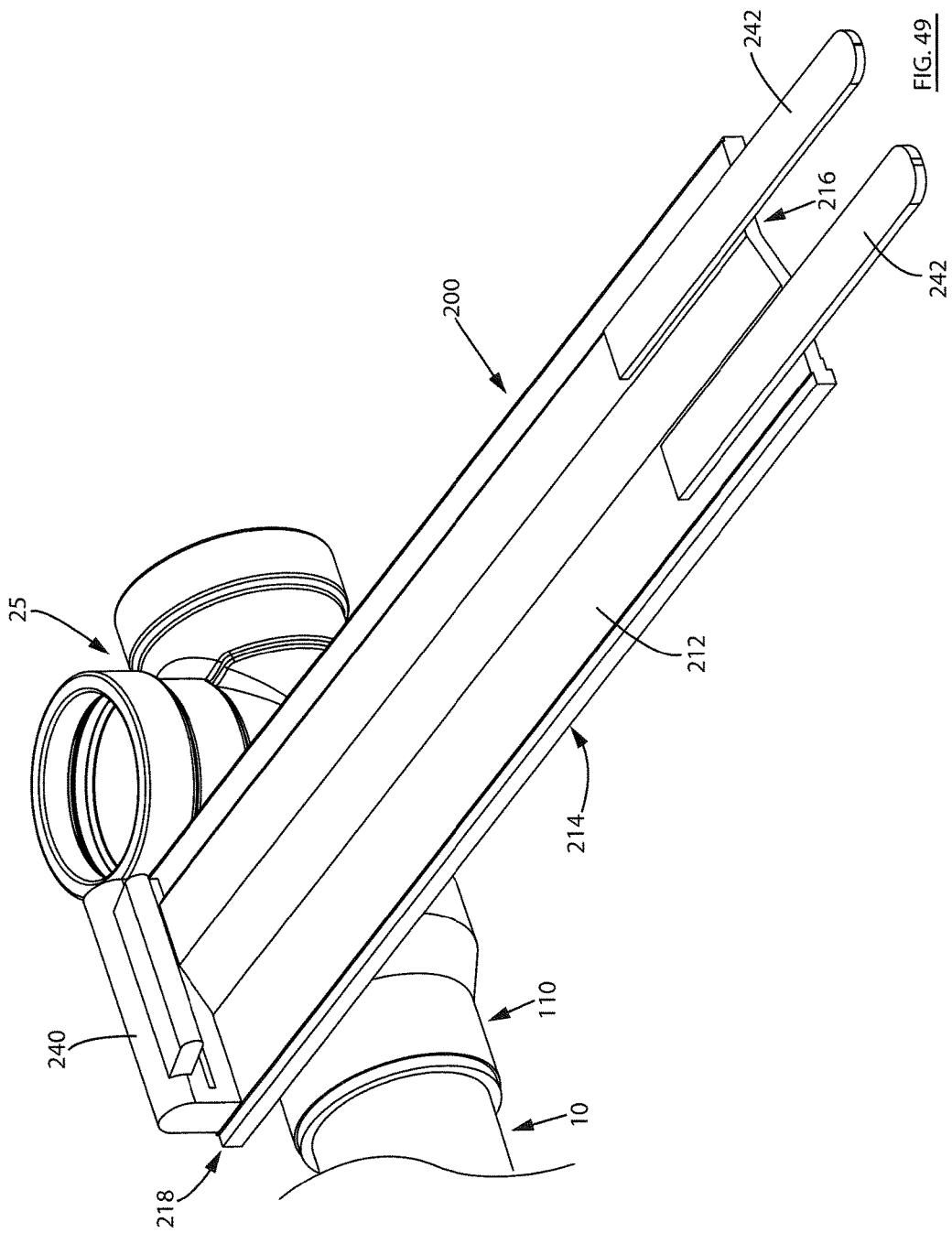
FIG. 49 is a perspective view of a pipe end and T-fitting, with the flexible substrate of FIG. 16 wrapped around the joint, and a pipe securing apparatus in accordance with another embodiment.
Figure 50:
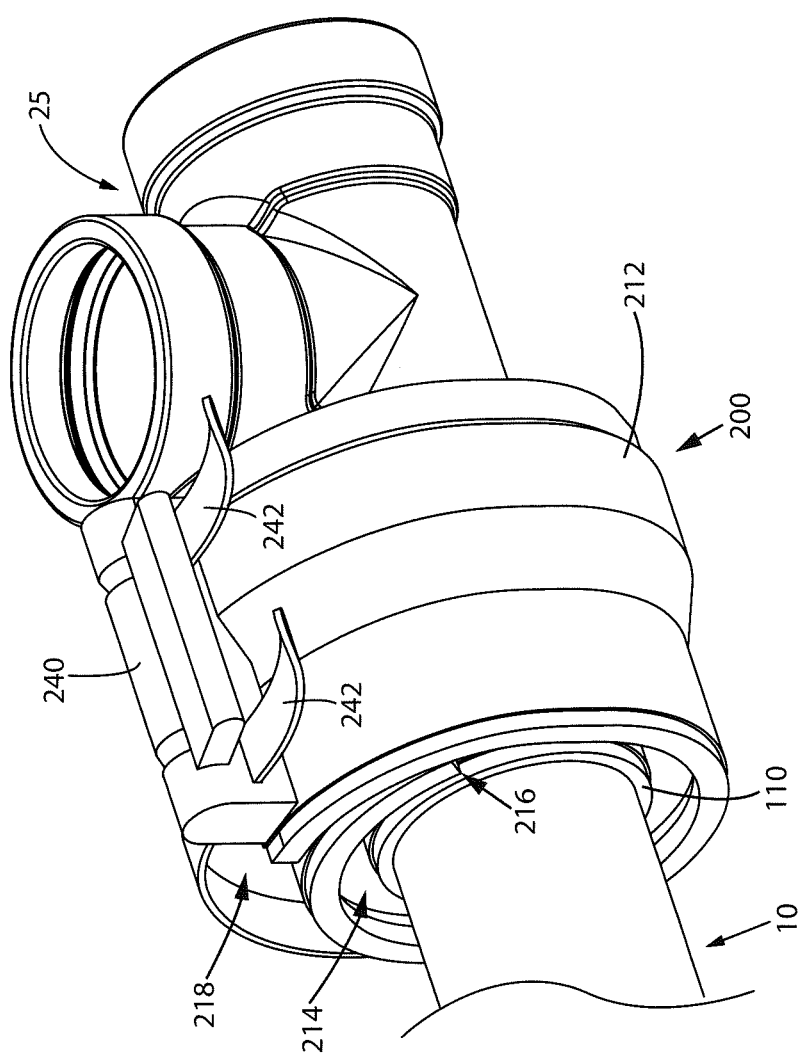
FIG. 50 is a perspective view of the pipe end and T-fitting of FIG. 49, with the pipe securing apparatus wrapped around the flexible substrate and coupled to itself.

An alternate embodiment of a pipe securing apparatus that may be used in applying a mechanical restraint member to secure two components of a piping system is exemplified in FIGS. 49 and 50. As illustrated in FIG. 49, pressure cuff 200 is an linear cuff having an outer surface 212, an inner surface 214, a first end 218, and a second end 218. This linear pressure cuff 200 may be brought into position by wrapping pressure cuff 200 around flexible substrate 110 and, accordingly, around the perimeter of the joint, bringing at least a portion of inner surface 214 in contact with flexible substrate 110. Once pressure cuff 200 is in position, it may be secured to itself using one or more mechanical fasteners, which may be part of pressure cuff 200 or may be a separate member, examples of which include belts and corresponding buckles (including friction buckles), hook and loop fasteners, hook-and-eye closures, zippers, snap fasteners, lacing, the like. In the illustrated example, belts 242 located at first end 216 of pressure cuff 200 may cooperate with a buckle 240 located at the second end 218 to releasably couple the first and second ends to each other. It will be appreciated that mechanical fasteners may be provided at a plurality of locations at one or both ends 216, 218, so as to allow the ends to be connected to provide an open interior of varying diameters.

Figure 51:
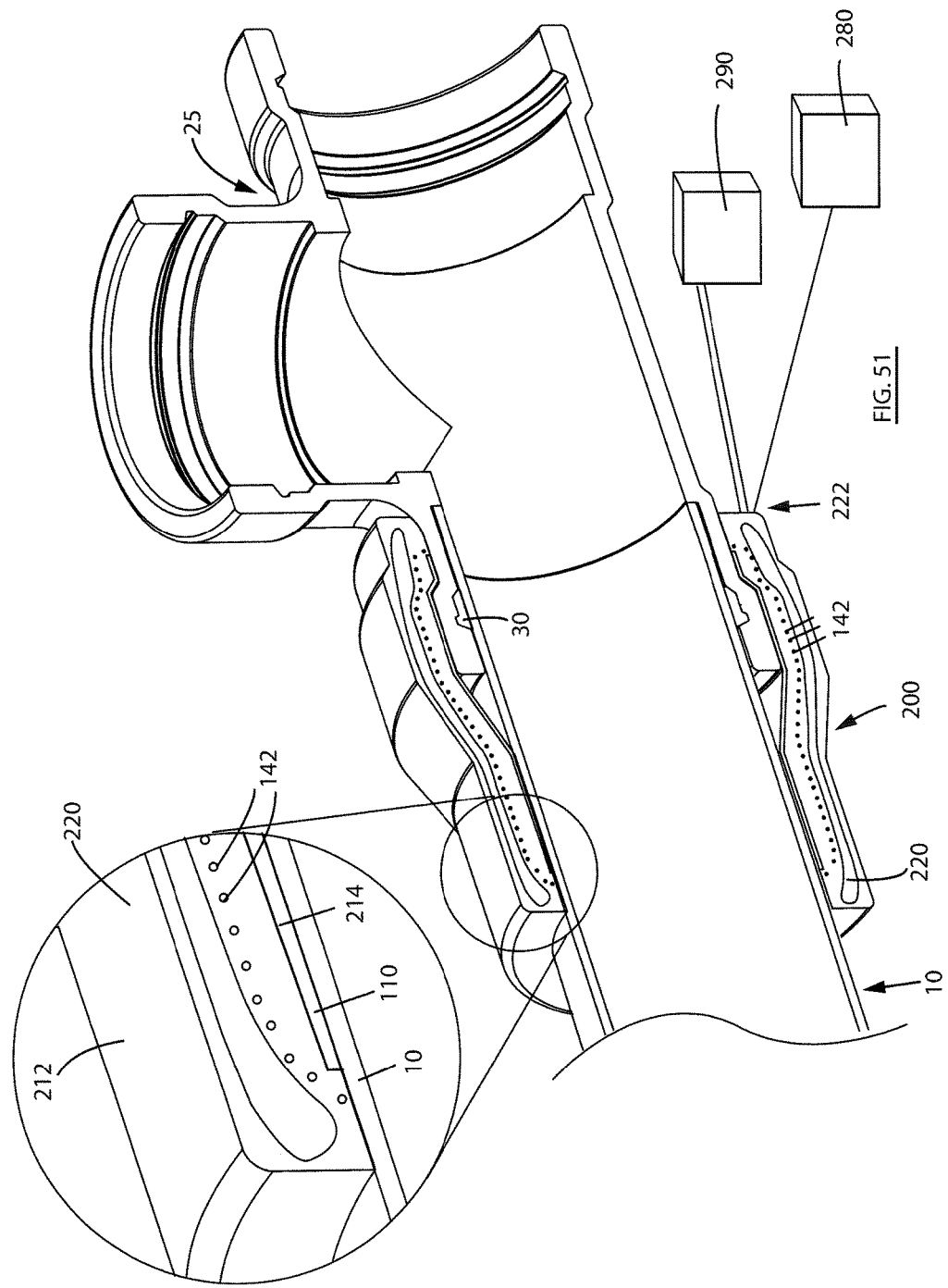
FIG. 51 is a perspective cross-section view of the pipe end and T-fitting of FIG. 3, with the flexible substrate of FIG. 16 and a pipe securing apparatus wrapped around the joint, with the pipe securing apparatus coupled to a source of pressure and to a source of power in accordance with one embodiment, wherein the pipe securing apparatus is in an un-inflated state.
Figure 52:
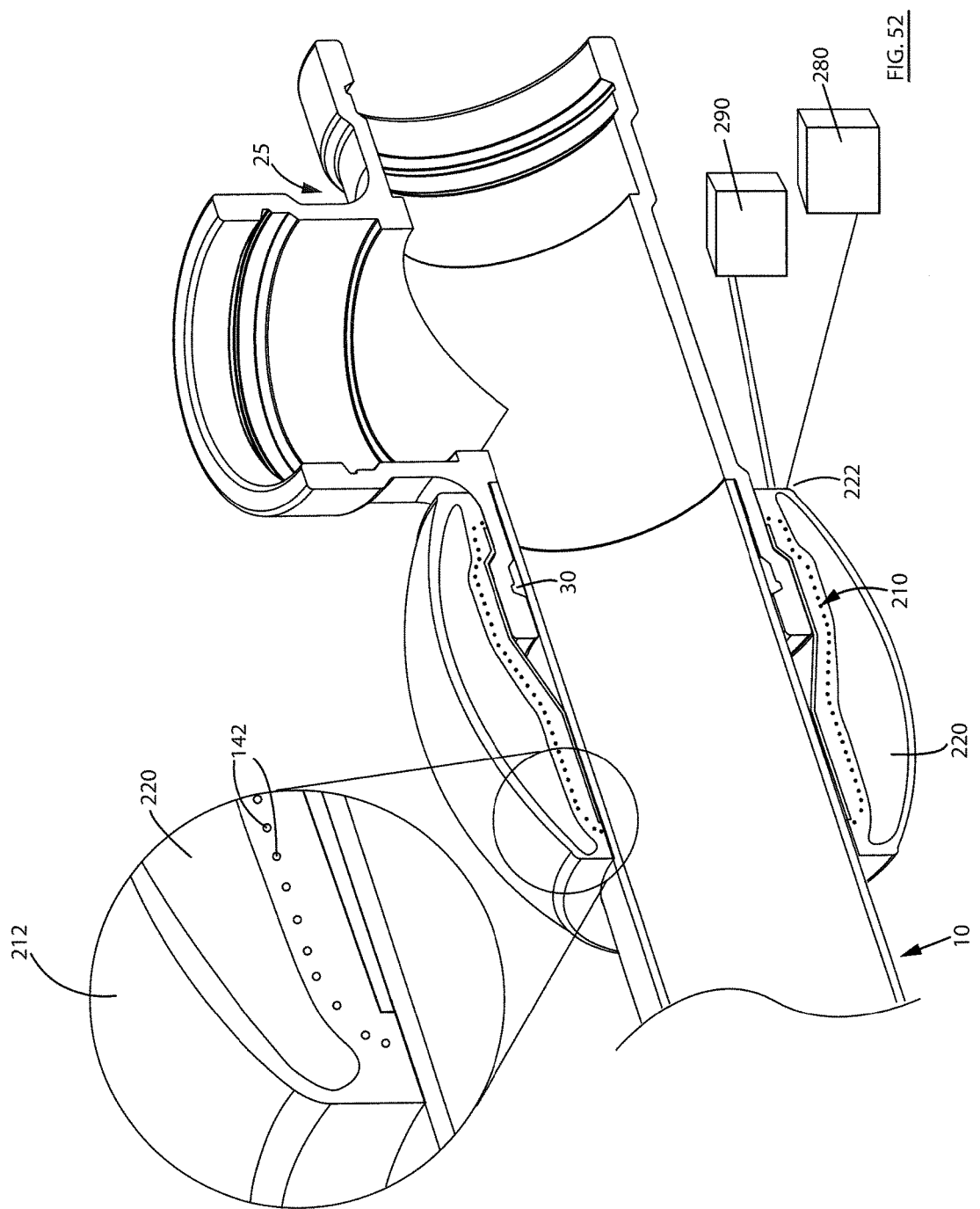
FIG. 52 is a perspective cross-section view of FIG. 51, with the pipe securing apparatus in an inflated state.

Once pressure cuff 200 is in position, it may be used to apply pressure to flexible substrate 110 and bonding agent 120. As illustrated in FIGS. 51 and 52, a pressure chamber 220 may be inflated to exert pressure on flexible substrate 110. Pressure chamber 220 may be inflated by any means known in the art. For example, pressure chamber may have one or more fluid inlet ports 222. Accordingly, a pressure source 280, such as a compressor, a tank of pressurized gas, or the like, may be connected to the inlet port 222. It will be appreciated that the inlet port may be used to subsequently depressurize the pressure cuff 200 and/or one or more fluid outlet ports may be provided. Pressure chamber 220 may also be inflated by, e.g., a fluid pumped into the pressure chamber 220, gas released by chemical reaction, or the like. The fluid may be a heated fluid. Accordingly, the fluid may supplement or be the heating member. For example, the fluid (liquid and/or gas) may be continually circulated in a loop (e.g., into a heat exchanger and then into the pressure chamber prior to being returned to the heat exchanger) to continually supply heat to the pressure chamber 220. Alternately, a mechanical or electromechanical turnbuckle, electro- or magneto-constrictive wires or other exterior constriction member could be used to supplement or replace the pressure chamber 220.

Figure 53:
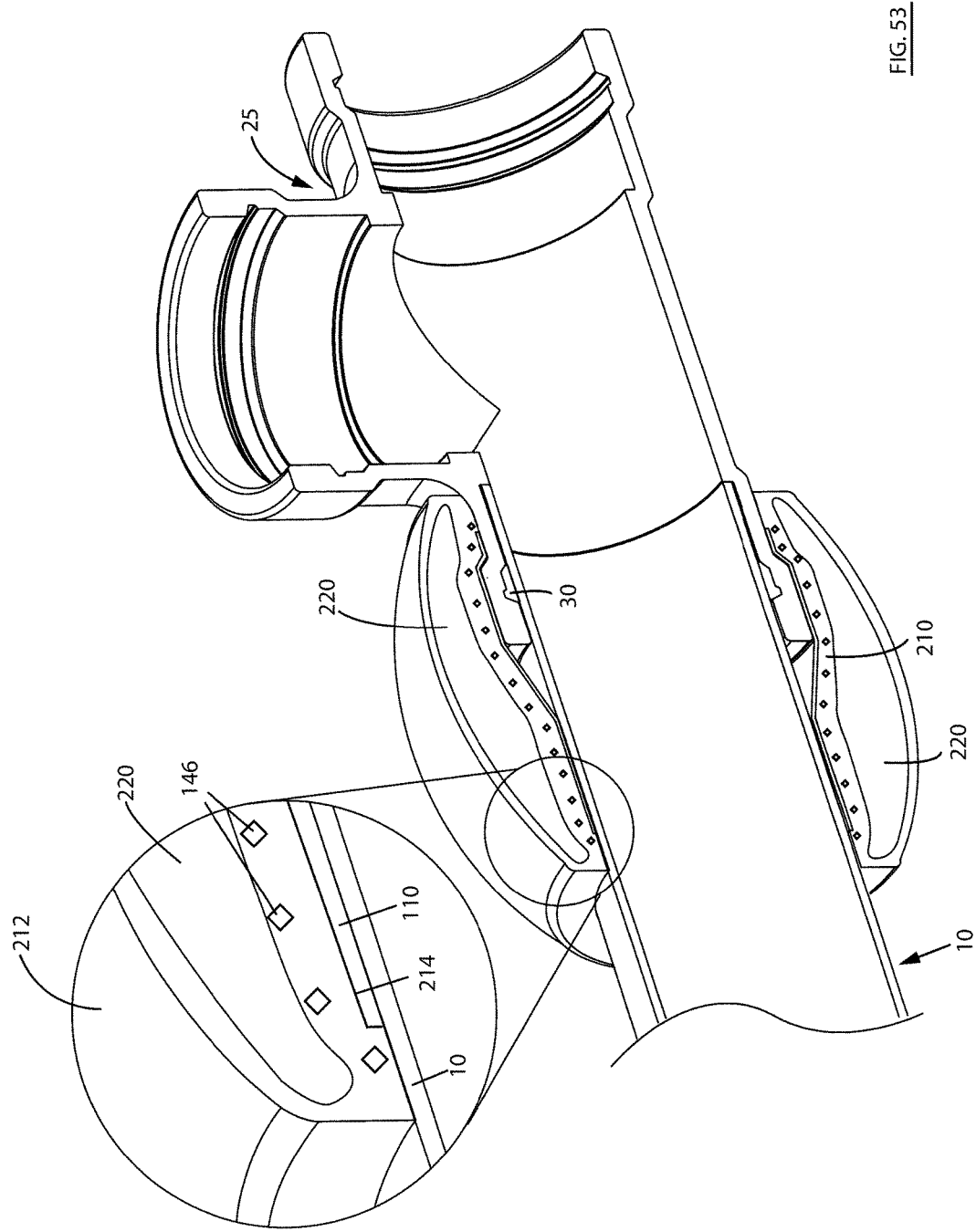
FIG. 53 is a perspective cross-section view of the pipe end and T-fitting of FIG. 3, with the flexible substrate of FIG. 16 and a pipe securing apparatus wrapped around the joint, the pipe securing apparatus having a plurality of infrared energy sources in accordance with another embodiment.
Figure 54:
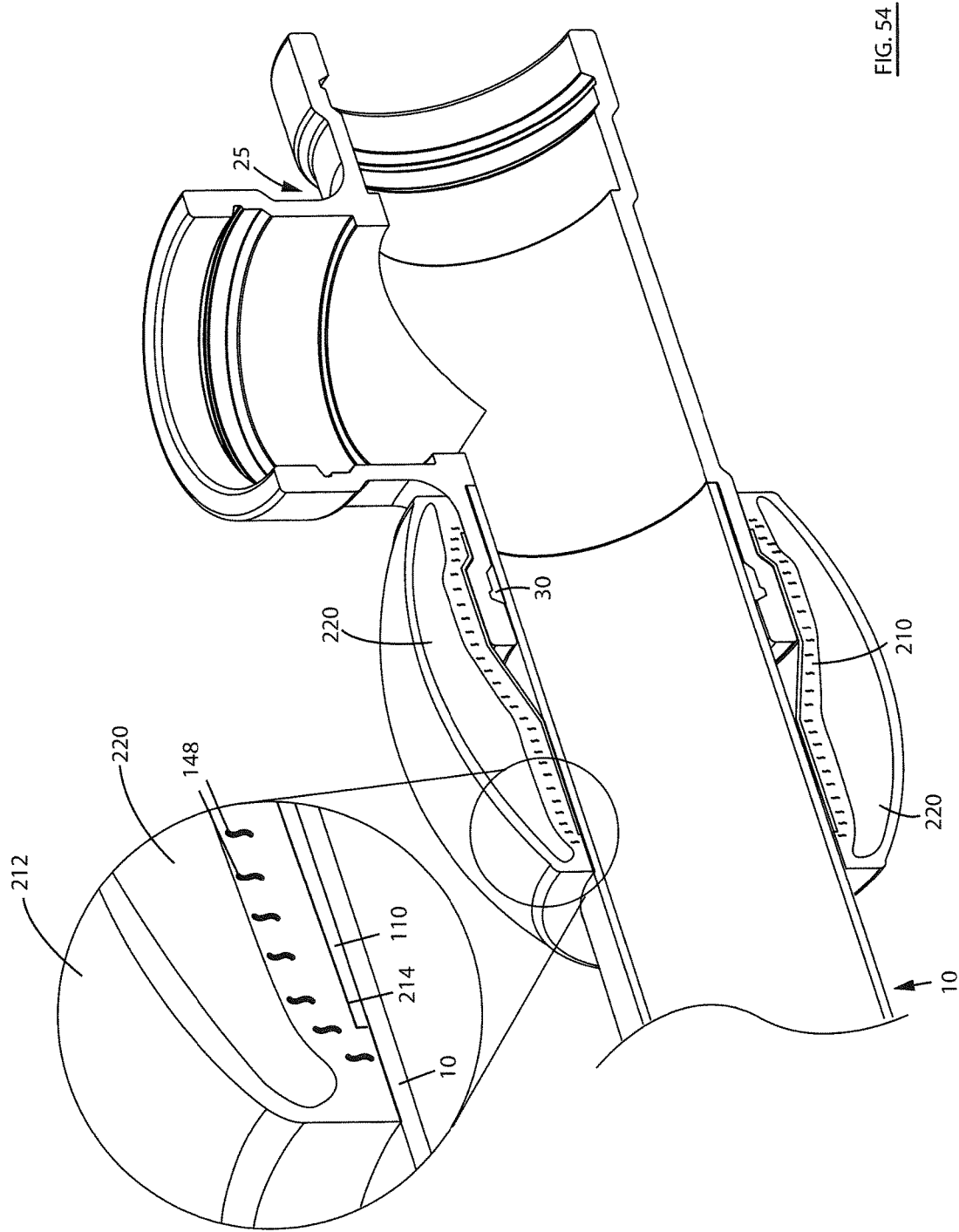
FIG. 54 is a perspective cross-section view of the pipe end and T-fitting of FIG. 3, with the flexible substrate of FIG. 16 and a pipe securing apparatus wrapped around the joint, the pipe securing apparatus having a plurality of microwave energy sources in accordance with another embodiment.

In some embodiments, pressure cuff 200 may also include a heat producing member, such as a heating element 210 to apply heat to flexible substrate 110 and bonding agent 120, e.g. to raise the temperature of bonding agent to or past its activation temperature, thus initiating bonding between flexible substrate 110 and the piping conduits being joined. Heating element 210 may be any member that is capable of raising the bonding agent to the bonding temperature. As exemplified, heating element 210 comprises a resistive heating element 142. Resistive heating element 142 may be energized by an on-board power source (e.g., batteries that are provided in pressure cuff 200), or it may be connectable to an external power source 290, such as by electrical contacts or terminals that may be provided on pressure cuff 200 (similar to leads 144 shown in FIG. 19). In other embodiments, heating element 210 may comprise a radiant energy source, such as an infrared (IR) source, a microwave source, and the like. For example, pressure cuff 200 may incorporate one or more IR emitters 146 (as shown in FIG. 53), or one or more microwave emitters 148 (as shown in FIG. 54), or a combination of radiant energy sources. These may be positioned around pressure cuff 200 so as to provide the required degree of heating. Preferably, radiant emitters are provided on (or proximate) inner surface 214 of pressure cuff 200, to facilitate energy transfer to flexible substrate 110. Alternatively, heating element 210 may comprise a chemical source of heat, such as chambers containing components that, when the chambers are ruptured and the components mixed, form an exothermic mixture, and the like.

Figure 55:
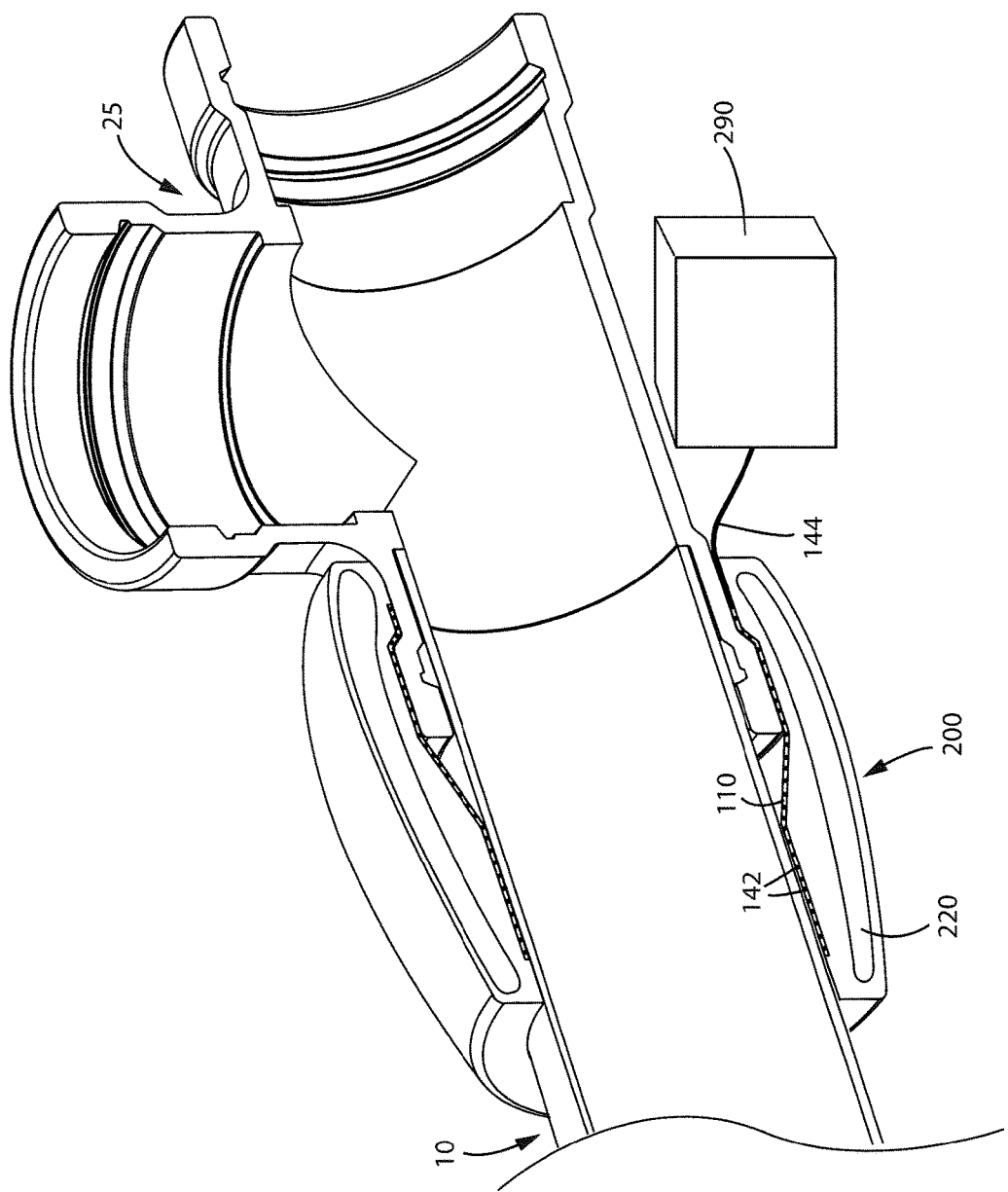
FIG. 55 is a perspective cross-section view of the pipe end and T-fitting of FIG. 3, with the flexible substrate of FIG. 19 and a pipe securing apparatus wrapped around the joint in accordance with another embodiment, wherein heating element in the flexible substrate is coupled to a power source via the pipe securing apparatus.
Figure 56:
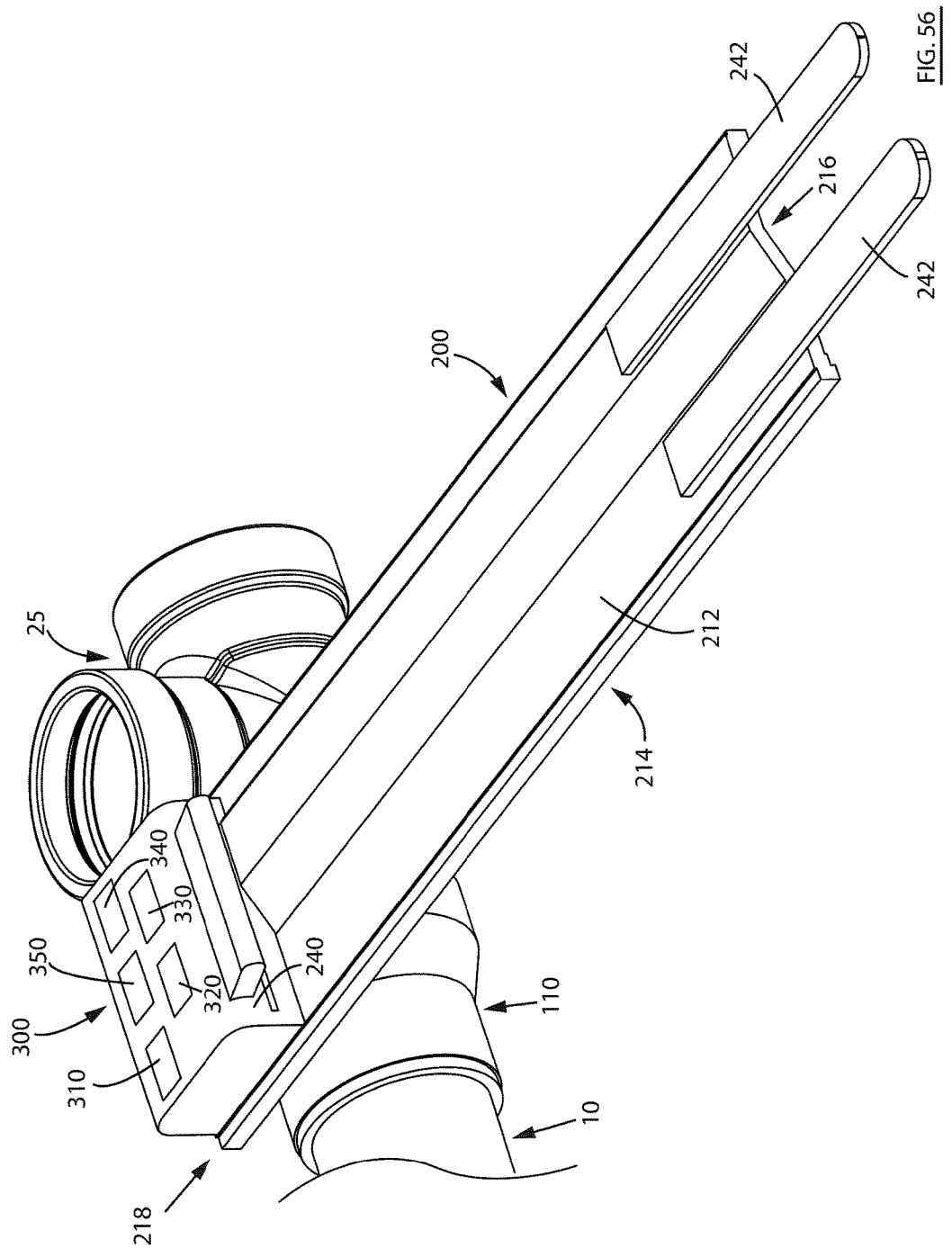
FIG. 56 is a perspective view of a pipe end and T-fitting, with the flexible substrate of FIG. 16 wrapped around the joint, and a pipe securing apparatus with a quality control module in accordance with another embodiment.
Figure 57:
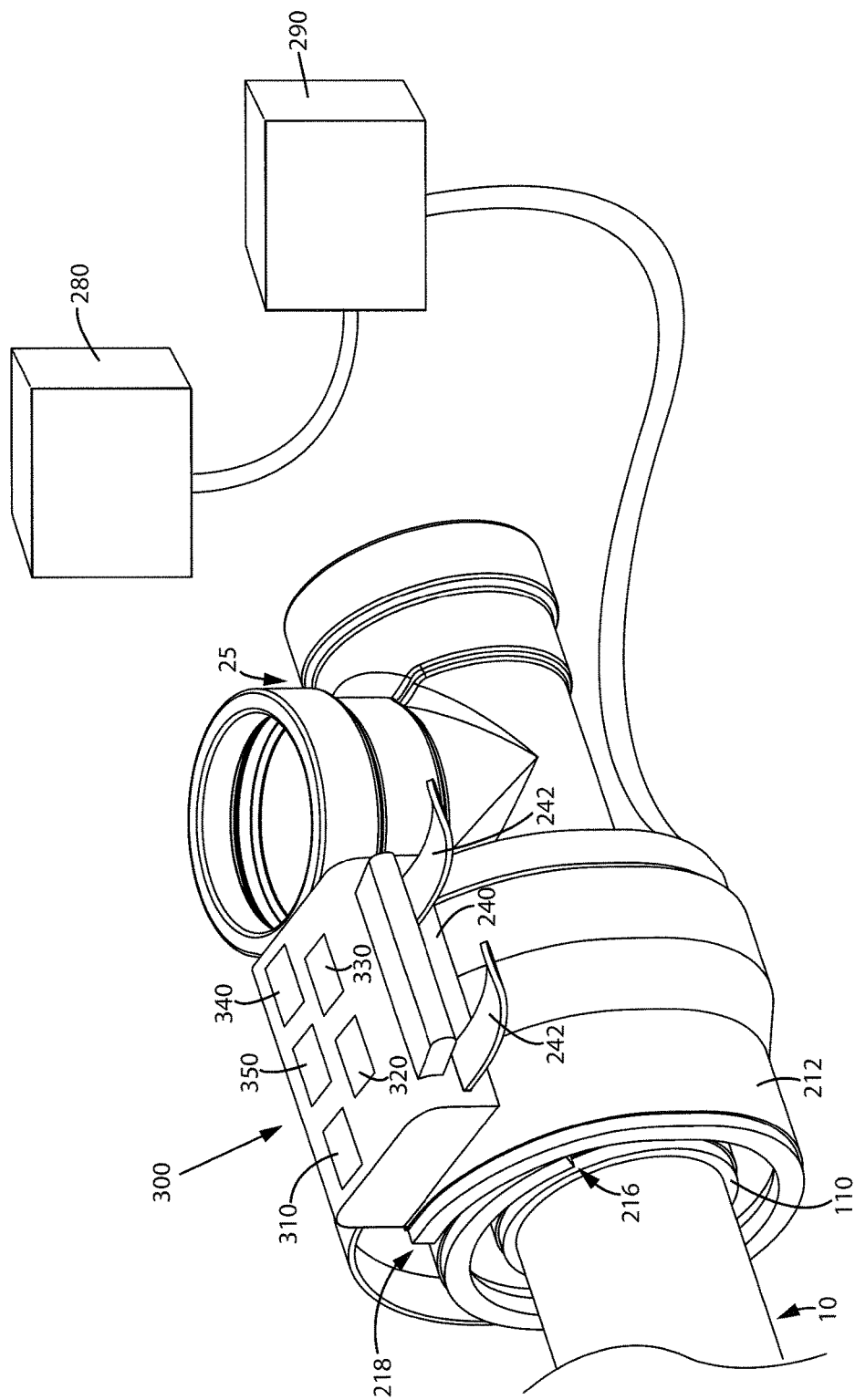
FIG. 57 is a perspective view of the pipe end and T-fitting of FIG. 56, with the pipe securing apparatus wrapped around the flexible substrate and coupled to itself, with the pipe securing apparatus coupled to a source of pressure and to a source of power in accordance with one embodiment.
Figure 58:
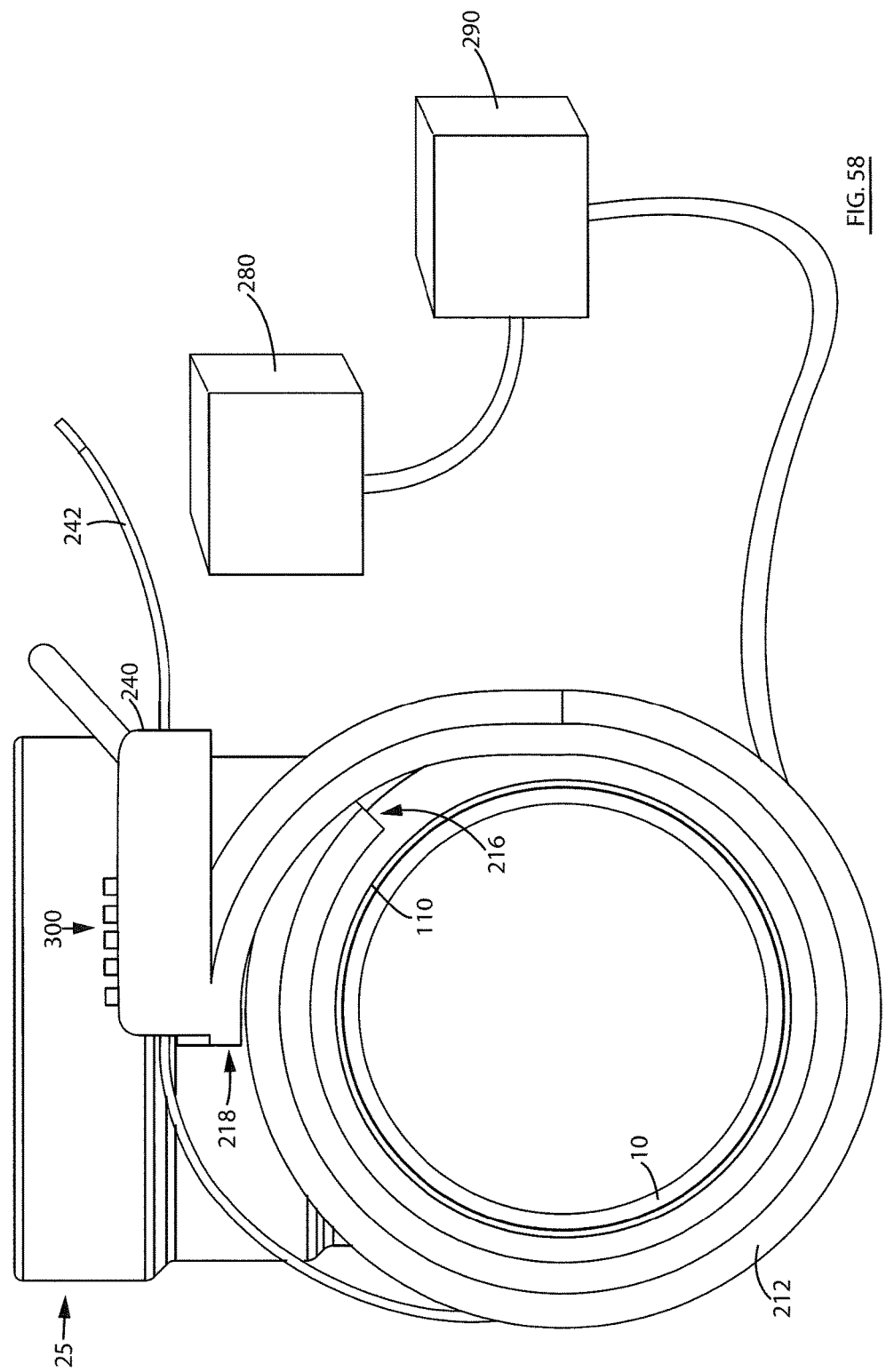
FIG. 58 is an end view of FIG. 57, viewed along the axis of the joined conduits.
Figure 59:
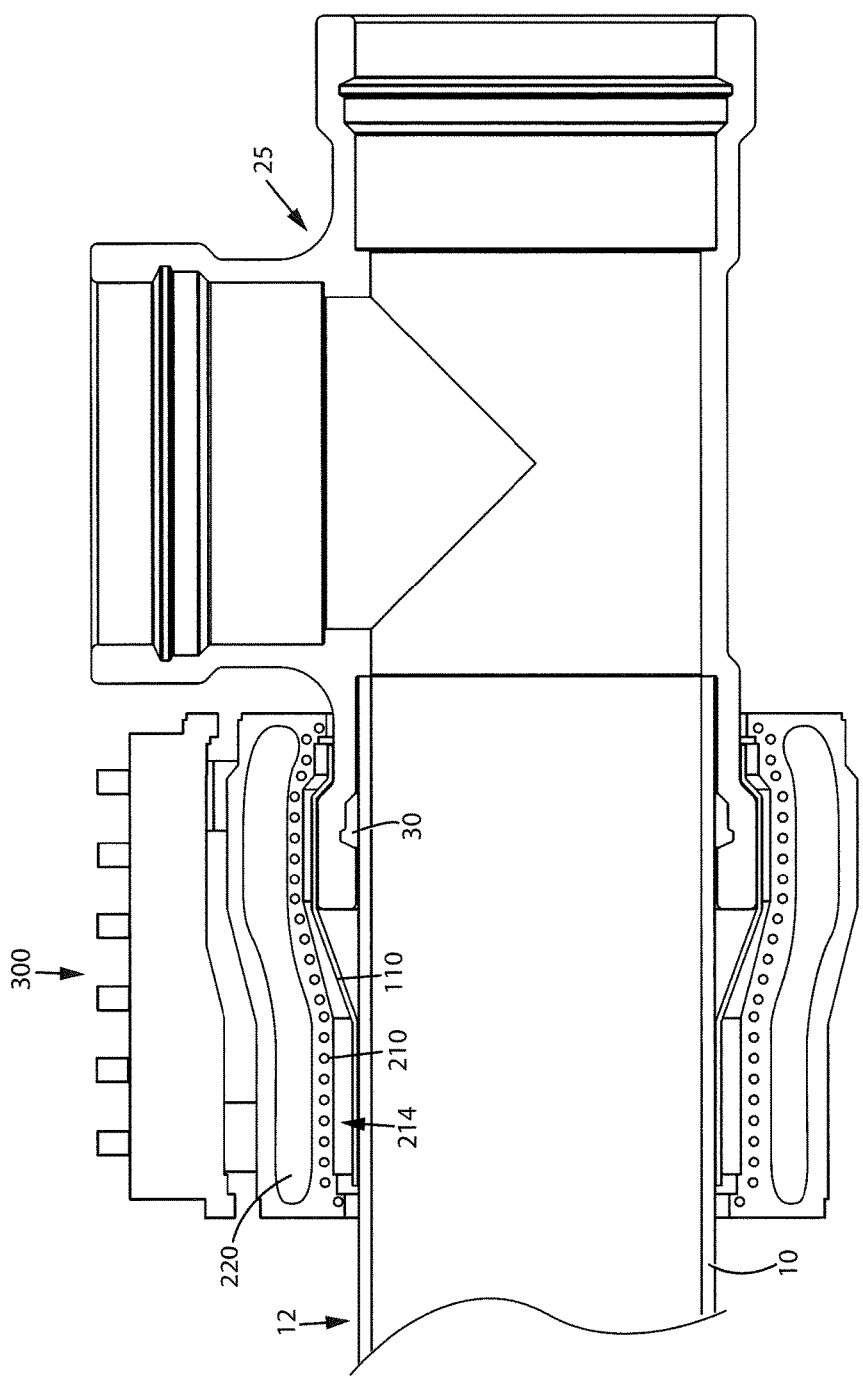
FIG. 59 is a cross-section view of the pipe end and T-fitting of FIG. 3, with the flexible substrate of FIG. 16 and pipe securing apparatus of FIG. 56 wrapped around the joint.

Alternatively, pressure cuff 200 may not include a heating element 210, but may nonetheless be used to apply heat to flexible substrate 110 and bonding agent 120. For example, a pressure cuff 200 may lack an internal heating element, but may provide one or more electrical contacts to energize a resistive heating element located external to pressure cuff 200. As illustrated in FIG. 55, such a pressure cuff may be used in configurations where flexible substrate 110 has an embedded resistive heating element (see e.g. FIGS. 19 and 20). In such a configuration, the resistive heating element 142 may be coupled to a source of power, such as external power source 290, via wiring 211 located within pressure cuff 200. In other words, a resistive heating element 142 located in e.g. flexible substrate 110, heating blanket 150, or heat wrap 160, may be 'plugged in' to pressure cuff 200.

Pipe securing apparatus 200 may be made from any suitable material that has sufficient tensile strength to withstand the anticipated forces imposed by the inflation of the pressure chamber(s) 220 during operation of the pressure cuff. Preferably, the inner face of pressure cuff 200 (i.e. the surface that contacts flexible substrate 110 when used to apply heat and/or pressure to flexible substrate 110) comprises a material that bonding agent 120 does not bond to (or does not strongly bond to) to e.g. facilitate removal of pressure cuff 200. Examples of such anti-stick agents include Teflon, PVDF, ultrahigh molecular weight polyethylene, a fluropolymer, a mixture of titanium and ceramic and the like.

Quality Control Apparatus

Reference is now made to FIGS. 56 to 59, which exemplify different embodiments of a pipe securing apparatus 200 having an optional quality control module 300. Such an apparatus may be used with the methods, mechanical restraint member 100, and/or pipe securing apparatus 200 disclosed herein. Quality control module 300 may be used to determine and/or record one or more physical parameters during or after the application of a mechanical restraint member 100 to a piping system, to provide data to an operator during or after operation of a pipe securing apparatus 200 so as to advise a user or allow a user to determine that the pipe securing apparatus 200 is operating correctly and/or that the pipe securing apparatus is or was used correctly, and/or to provide an auditable record of the use of pipe securing apparatus 200 and/or the application of one or more mechanical restraint members to a piping system. It will be appreciated that quality control module 300 need not be part of pipe securing apparatus 200 but may be a separate unit.

Quality control module 300 may include one or more sensors—such as a temperature sensor, pressure sensor, optical sensor, continuity sensor, force sensor, and/or location sensor—for determining one or more operational parameters before, during, and/or after the application of a mechanical restraint member 100.

For example, quality control module 300 may have one or more temperature sensors, such as an infra-red (IR) thermometer, a thermocouple, a thermistor and the like, that may be located, e.g., on the inner surface of a pipe securing apparatus 200, and configured to measure a surface temperature of an object (e.g. a pipe or a housing to which a mechanical restraint member 100 is being applied, a flexible substrate, a heating blanket, etc.). A signal representing the temperature of the object may be indicative of an adjacent object. For example, the temperature of the outer surface 112 of flexible substrate 110 may be indicative of the temperature of a bonding agent on the inner surface 114 of the flexible substrate 110.

Alternatively, or additionally, quality control module 300 may have one or more pressure sensors such as a pressure transducer, a piezoelectric transducer and the like, operable to measure the pressure being applied by a pipe securing apparatus 200 to a flexible substrate 110. For example, a pressure sensor may be located in fluid communication with one or more pressure chambers 220 of pipe securing apparatus 200. A signal representing an increase in the internal pressure of pressure chambers 220 may be indicative of the pressure being applied by pipe securing apparatus 200 to a flexible substrate 110. Other suitable pressure sensors may be used, such as or one or more strain gauges located on e.g. the inner surface of a pipe securing apparatus 200.

Alternatively, or additionally, quality control module 300 may have one or more optical sensors operable to determine a colour and/or a colour change of flexible substrate 110. For example, one or more optical sensors may be located on the inner surface of a pipe securing apparatus 200. A signal representing a colour and/or a change in colour of all or a portion of the outer surface 112 of flexible substrate 110 may be indicative of a thermochromic material applied thereon changing colour in response to flexible substrate 110 (and, by proxy, bonding agent 120) reaching a predetermined temperature, such as the activation temperature of bonding agent 120.

Alternatively, or additionally, quality control module 300 may have one or more location sensors such as a GPS (Global Positioning System) locator and the like, operable to determine a location of quality control module 300 and/or pipe securing apparatus 200. For example, a GPS may comprise a GPS receiver or transceiver for communicating with a GPS satellite network to determine a geographic location of quality control module 300. Accordingly, the location at which quality control module 300 and/or pipe securing apparatus 200 is used may be recorded along with the data provided by the other sensors.

Alternatively, or additionally, quality control module 300 may have one or more continuity sensors. Continuity sensor may be used, e.g., with a linear pressure cuff. Continuity sensors may be utilized to determine if, e.g., the pressure cuff has been wrapped around the pipe (e.g., the distal end of the linear pressure cuff may be looped or connected to the proximate end as exemplified in FIG. 50). Alternately, or in addition, a continuity sensor may be used to determine if the pressure cuff is in sufficient contact with the conduits such that the pressure cuff will apply pressure to the conduits when used (e.g., by determining if an electric current will be conveyed around the pressure cuff).

Alternatively, or additionally, quality control module 300 may have one or more force sensors, such as a piezoelectric transducer, force sensing resistor and the like, to measure the force, e.g., applied by the pressure cuff at the outer surface 112 of the substrate.

Quality control module 300 preferably includes control electronics 310 operatively coupled to the sensors and/or other electrical components of pipe securing apparatus 200. For example, control electronics 310 may be coupled to heating element 210 and/or one or more temperature sensors (not shown) to regulate and/or record the heat being applied to flexible substrate 110, and/or the surface temperature of flexible substrate 110.

Control electronics 310 may also be operatively coupled to one or more signaling members to convey information to a user of pipe securing apparatus 200 regarding the status of one or more monitored conditions. For example, a display screen 350 may be provided to provide an indication that flexible substrate 110 has reached a suitable temperature to activate bonding agent 120. Display screen 350 may also provide an indication that a sufficient amount of pressure is or has been applied to flexible substrate 110 to promote a good bond between flexible substrate 110 and the piping system components.

Display screen 350 may be any suitable display device, such as, for example, a liquid crystal display (LCD), a segment display, an Organic LED (OLED) display, a light emitting diode (LED) display, or an electrophoretic display. Display screen 350 may also be a touch screen display, capable of receiving input from a user.

Other signaling members may be provided as an alternative to, or in addition to, display screen 350. For example, an audio signalling member such as an electroacoustic transducer (or speaker) may be configured to provide an audible tone in response to a sensor detecting that a predetermined temperature and/or pressure has been reached, and/or when otherwise directed by control electronics 310. As another example, one or more indicator lights (such as LEDs) may be provided on quality control module 300 and configured to emit a signal (e.g. illuminate, strobe, and/or change colour) in response to detecting that a predetermined temperature and/or pressure has been reached, and/or when otherwise directed by control electronics 310. For example, one or more power indicator lights (not shown) may be provided to convey information to a user regarding the status of a power source (e.g. a battery) coupled to pipe securing apparatus 200.

Control electronics 310 may also comprise a data logging module 320 for logging or recording data related to one or more sensors and/or operations of pipe securing apparatus 200. For example, the data logging module may record data corresponding to an amount of heat applied by heating element 210, a temperature reached by flexible substrate 110, a pressure applied by pressure chambers 220, a location of pipe securing apparatus 200 during use, and this information may be time stamped or otherwise tagged to provide an output, e.g., of the number of mechanical restraint member's applied per hour or per shift, and/or the locations at which they were applied. The data logging module may also record data corresponding to a number of signals issued by a signaling member.

The data logging module may also record operational parameters one or more components of pipe securing apparatus 200, such as temperature readings from heating element 210, electrical current draw by resistive heating element 142, pressure data from a pressure sensor within or in communication with pressure chamber 220, temperature data from an IR thermometer, etc.

The data logging module may also include a timing module (not shown), and be configured to record data corresponding to the time(s) at which a pipe securing apparatus 200 was used to apply heat and/or pressure to a flexible substrate 110, which may be an absolute time (e.g. 12:00 am on May 24), and/or a relative time (e.g. 20 minutes since the last time pipe securing apparatus was used, and/or a duration (i.e. a period of time, e.g. 8 minutes) of an application of heat and/or pressure by pipe securing apparatus 200). Time information may also be recorded for other operational parameters, such as when pipe securing apparatus 200 was turned on and off and/or the length of time of each step in the operation, such as the length of time that heat and/or pressure is applied.

In this way, the data logging module may be operable to record a detailed log of the use of the tool throughout a predetermined time period, such as a working day, work week, or throughout a particular piping system installation project.

Control electronics 310 may be configured to display some or all of the logged data on display screen 350. Alternatively, or additionally, control electronics may comprise a communications module 330 configured to establish a communication channel between the data logging module and remote device, e.g., a computing device, such as a laptop computer, tablet computing device, mobile communication device, remote server, etc. The communication channel may be established by the communication module using any suitable wired or wireless protocol, and may be configured as a personal area network (PAN), a point-to-point network, or any other suitable network topology. Wired communication may be conducted in accordance with Universal Serial Bus (USB) standards, and pipe securing apparatus 200 may be provided with a Standard, Mini, or Micro USB port (not shown). Examples of wireless communication include standards developed by the Infrared Data Association (IrDA), Near Field Communication (NFC), and the 803.11 family of standards developed by the Institute of Electrical and Electronics Engineers (IEEE). In some embodiments, a relatively short-range wireless communications protocol such as Bluetooth® or Wireless USB may be used.

The communications module may be configured to transmit some or all of the recorded data to the computing device over the communication channel, as the data is recorded or subsequent thereto, so that data logged by pipe securing apparatus 200 may be reviewed, stored, and/or audited. For example, data logged by pipe securing apparatus 200 may be audited to confirm that one or more mechanical restraint members were applied correctly. The logged data may also be compared with an installation plan for a piping system being assembled, to confirm that the total number of mechanical restraint members actually applied using pipe securing apparatus 200 corresponds with the total number of mechanical restraint members required to be applied to correctly install the piping system and/or that the pipe securing apparatus 200 was used at the location of some or all of the joints.

Figure 60:
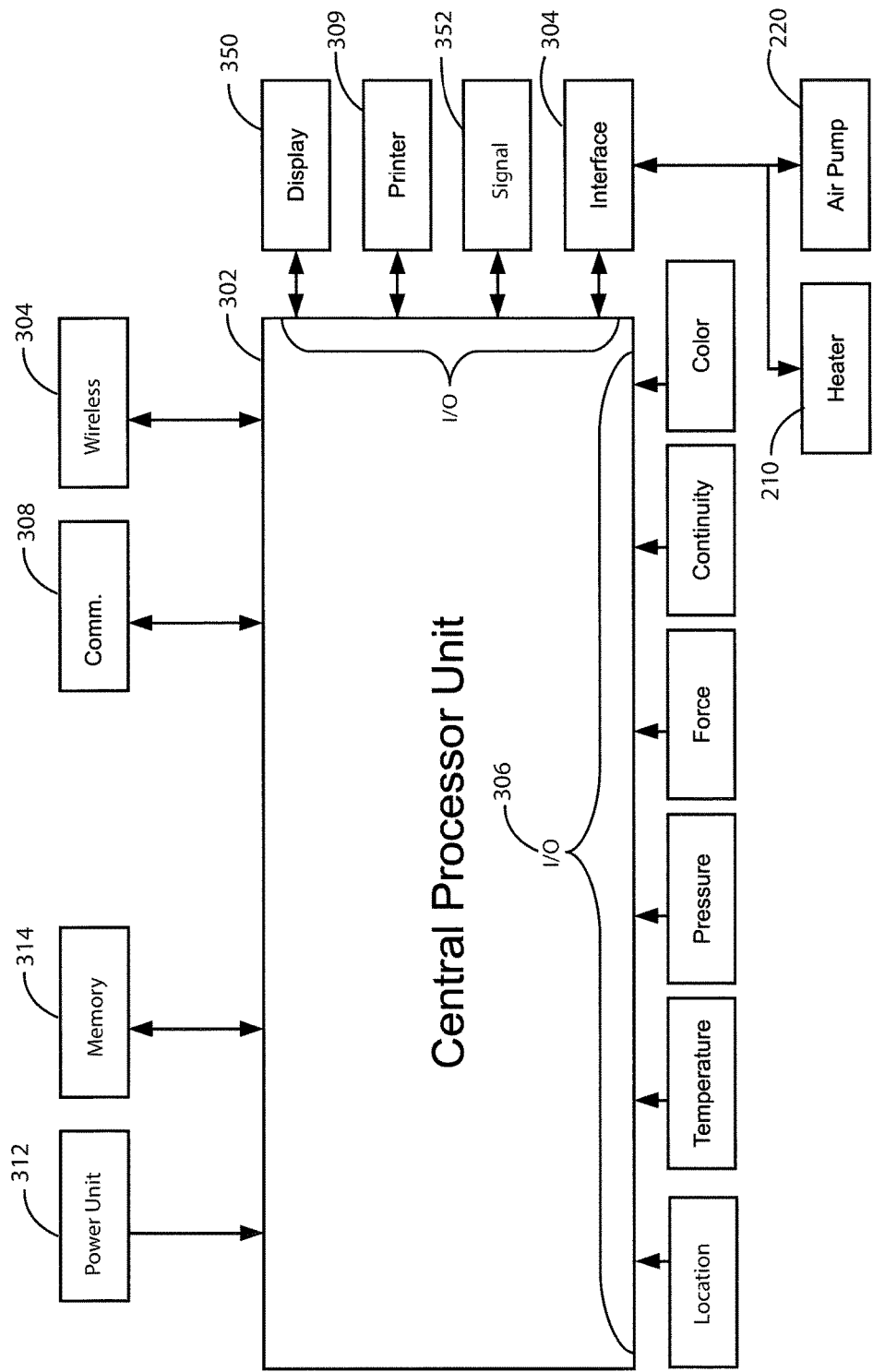
FIG. 60 is a schematic block diagram of control electronics for a pipe securing apparatus with a quality control module in accordance with at least one embodiment; and, FIG. 61 is a flow diagram illustrating a sequence of events for using a pipe securing apparatus with a quality control module to apply a mechanical restraint member in accordance with at least one embodiment.

Reference is next made to FIG. 60 illustrating a block diagram of control electronics 310 in accordance with an example embodiment. Control electronics 310 are provided as an example and there can be other embodiments of control electronics 310 with different components or a different configuration of the components described herein.

Control electronics 310 comprises processing unit 302, display 350, user interface 304 (e.g. for receiving control instructions for the heating element 210 and/or pressure chamber 220), and other input/output (I/O) hardware 306, communications unit 308 (which may include wireless unit 309), power unit 312 and memory unit 314.

Processing unit 302 controls the operation of the pipe securing apparatus 200 and/or quality control module 300. Processing unit 302 can be any suitable processor, controller or digital signal processor that can provide sufficient processing power processor depending on the configuration, purposes and requirements of quality control module 300 as is known by those skilled in the art. For example, processing unit 302 may be a high performance general processor. In alternative embodiments, processing unit 302 can include more than one processor with each processor being configured to perform different dedicated tasks. In alternative embodiments, specialized hardware may be used to provide some of the functionality provided by processing unit 302.

Display 350 can be any suitable display that provides visual information depending on the configuration of quality control module 300. For instance, display 350 can be a display suitable for a laptop, tablet, or handheld device such as an LCD-based display and the like.

User interface 304 can include at least one of a keyboard, a touch screen, a thumbwheel, a track-pad, a track-ball, and the like again depending on the particular implementation of quality control module 300. In some cases, some of these components can be integrated with one another.

Communications unit 308 can be any interface that allows the quality control module 300 to communicate with other devices or computers. In some cases, the communications unit 308 can include at least one of a serial port, a parallel port or a USB port that provides USB connectivity. Wireless unit 309 is optional and can be a radio (e.g. a transceiver or a transmitter) that communicates utilizing CDMA, GSM, GPRS or Bluetooth protocol according to standards such as IEEE 802.11a, 802.11b, 802.11g, or 802.11n. Wireless unit 309 can be used by quality control module 300 to wirelessly communicate with other devices or computers.

I/O hardware 306 generally includes a temperature sensor, pressure sensor, optical sensor, and location sensor, or any other suitable sensor(s). I/O hardware 306 may optionally also include at least one of a microphone, a speaker, and a printer, for example.

Power unit 312 can be any suitable power source that provides power to pipe securing apparatus 200 and/or quality control module 300 such as a power adaptor or a rechargeable battery pack depending on the implementation of pipe securing apparatus 200 as is known by those skilled in the art.

Memory unit 314 can include RAM, ROM, one or more hard drives, one or more flash drives or some other suitable data storage elements such as disk drives, etc. Memory unit 314 may be used to store an operating system and programs as is commonly known by those skilled in the art. For instance, an operating system may provide various basic operational processes for pipe securing apparatus 200 and/or quality control module 300. Programs may include various user programs so that a user can interact with the pipe securing apparatus 200 and/or quality control module 300 to perform various functions such as, but not limited to, inputting controls, viewing and manipulating data as well as sending messages as the case may be.

Memory unit 314 may also accept data from one of the input devices, communications module 308, and I/O hardware 306. Memory unit 314 uses the received data to define and store, for example, at least a subset of recorded sensor data (e.g. temperature, pressure and/or location data) for one or more operations of pipe securing apparatus 200, as discussed above.

Figure 61:
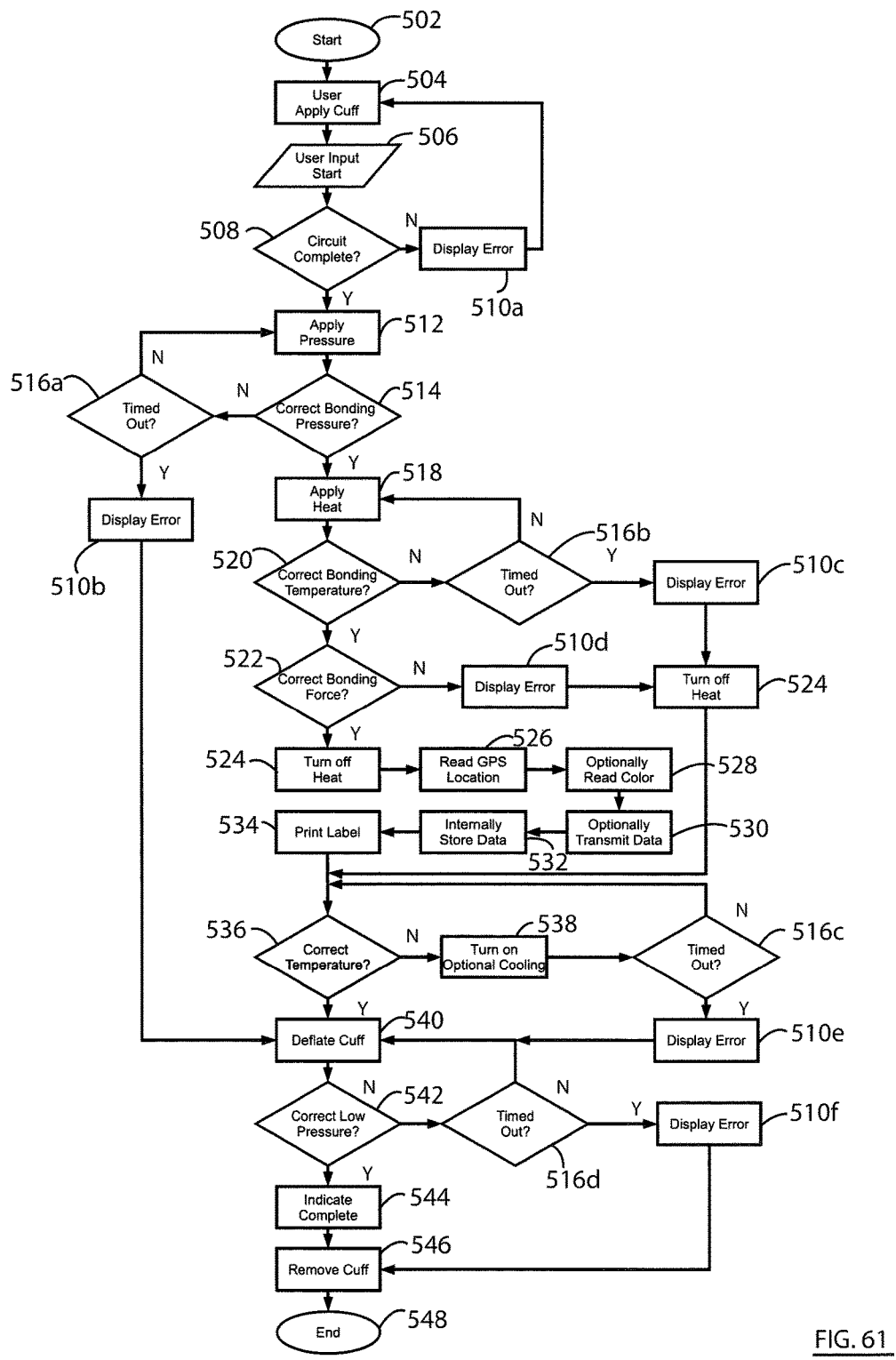

An example embodiment for a method for applying a mechanical restraint member 100 using a pipe securing apparatus 200 having a quality control module 300 will now be described with reference to FIG. 61 and is shown generally as 500.

The method starts at 502. At 504, after joining the two components together, using, for example, an insertion fit, and positioning a flexible substrate 110 about the joint, a user positions a pipe securing apparatus 200 about the joint and the flexible substrate 110. If the pipe securing apparatus 200 is an annular cuff, it may be slid over one end of one of the piping system components. If the pipe securing apparatus 200 is a linear cuff, it may be wrapped around the joint and one end of the pipe cuff may be connected to the other end of the pipe cuff.

At 506, a user activates the controls for pipe securing apparatus 200 and/or quality control module 300, for example by interacting with touch screen display 350. During start-up, optionally at 508 the controller may confirm, for linear pipe cuffs, that the ends 216, 218 of the cuff are properly secured to each other by, for example, confirming that a circuit between them is complete, indicating that the pipe cuff has been connected to itself. If not, an error may be displayed at 510*a*. Otherwise, the method proceeds to 512.

At 512, the control electronics may actuate the pipe securing apparatus 200 to apply pressure. For example, a fluid inlet port coupled to a source or pressurized gas may be opened to inflate one or more pressure chambers 220.

At 514, the control electronics may verify, using e.g. one or more pressure sensors, that a correct bonding pressure has been reached (e.g., a desired pressure has been achieved in the pressure chamber). In the exemplified method, the control software may continuously monitor (e.g. using a timeout subroutine 516*a*) the duration of time that the pressure has been applied without reaching the specified bonding pressure. If subroutine 516*a* determines that pressure has been applied for a predetermined amount of time without reaching the specified bonding pressure, at 510*b* an error may be displayed.

Once the correct bonding pressure is determined to have been reached at 514, control electronics may direct the heating module 210 to apply heat to the flexible substrate 110, e.g. via one or more heating members 142 adjacent inner surface 214 of pressure cuff 200.

At 520, control electronics may monitor one or more temperature sensors to determine if a correct bonding temperature has been reached (e.g., the heating element has reached a desired temperature). Again, a time out subroutine 516*b* may be used to monitor the duration of time over which heat has been applied without reaching the correct bonding temperature. If a time out condition is reached, an error may be displayed at 510*c*, and the heat may be turned off at 524.

Once the control electronics determines at 520 that the correct bonding temperature has been reached, the method proceeds to 522, where one or more force sensors may be used to determine whether or not a correct bonding force has been reached (e.g., by determining if the pressure cuff has applied a desired pressure to the conduits). If a correct bonding force is not reached, an error may be displayed at 510*d*, and the heat may be turned off at 524. Otherwise, upon determining the correct bonding force has been reached, the control electronics may turn off the heat at 524 and begin a logging operation.

At 526, control electronics may optionally determine a geographical location of the pressure cuff 200 and/or quality control module 300, e.g. using a location sensor, and store this data to memory. At 528 control electronics may optionally use an optical sensor to determine a colour of, or colour change, or other visual change, of all or a portion of an outer surface of flexible substrate 110, as discussed previously. This GPS and/or optical data, along with any pressure, temperature, and force data collected earlier (e.g. during steps 512, 514, 518, 520, 522) may be transmitted to another computing device at 530, and/or internally stored to memory at 532. It will be appreciated that any of the data may also optionally be displayed at the device, e.g. via display 350.

At 534, after logging and storing the data, a label listing none, some, or all of the logged data may optionally be printed. The label may be affixed on or adjacent the joint that was checked to indicate that the application of the mechanical restraint member has been checked. It will be appreciated that the label may merely indicate that the application of the mechanical restraint member was checked and approved.

At 536, another temperature measurement may be taken. For example, one or more temperature sensors may be used to measure the surface temperature of the outer surface 112 of flexible substrate 110. If the temperature is determined to be too high for, e.g. safe removal of pipe securing apparatus 200, an optional cooling module may be turned on at 538 to cool the flexible substrate 110. If a cooling module is activated at 538, a timing subroutine 516*c* may be used to determine if the cooling has been on for a predetermined amount of time without reaching a predetermined temperature, and an error may optionally be displayed at 510*e*.

After optionally determining at 536 that the mechanical restraint member has sufficiently cooled, or after the errors at 510*b-e*, at 540 control electronics may reduce the pressure being applied (e.g. by deflating pressure chamber 220) in order to deflate the pressure cuff. At 542, the pressure may be monitored to confirm that the cuff has been sufficiently deflated to allow a safe removal. Again, a time out subroutine 516*d* may be used.

At 544, after determining that the pressure cuff has been sufficiently depressurized, a signal may be provided (e.g. either on display 350 or using some other mechanism, such as an indicator light) to confirm the application of mechanical restraint member 100 is complete.

At 546, a user may remove pipe securing apparatus 200 from its position about the joint, leaving behind one or more mechanical restraint members 100 secured in position.

As used herein, the wording "and/or" is intended to represent an inclusive—or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A method for joining a first conduit section having an open first end and an inner surface with a second conduit section having an outer surface, the method comprising:
   a) inserting a first end of the second conduit section in the open first end of the first conduit section with a gasket extending between the inner surface of the first conduit section and the outer surface of the second conduit section;
   b) positioning a flexible substrate to extend from an outer surface of the first conduit to an outer surface of the second conduit using a releasable adhesive, the flexible substrate comprising a heating element, a thermally activateable bonding agent provided on at least a portion of an inner side of the flexible substrate whereby the adhesive is repositionable;
   c) repositioning the flexible substrate to extend from an alternate portion of at least one of the outer surface of the first conduit and the outer surface of the second conduit; and,
   d) applying pressure and heat to the flexible substrate whereby the bonding agent is pressed against an outer surface of the first and second conduit sections while the bonding agent is heated by the heating element whereby the bonding agent is secured to the outer surface of the first and second conduit sections.

2. A method for joining a first conduit section having an open first end and an inner surface with a second conduit section having an outer surface, the method comprising:
   a) inserting a first end of the second conduit section in the open first end of the first conduit section with a gasket extending between the inner surface of the first conduit section and the outer surface of the second conduit section;
   b) positioning a flexible substrate on each of the first and second conduits using a releasable adhesive whereby the adhesive is repositionable wherein, when the flexible substrate is positioned on each of the first and second conduits, a thermally activateable bonding agent is positioned between an inner side of the flexible substrate and an outer surface of each of the first conduit and the second conduit, the flexible substrate also comprises a heating element;
   c) applying pressure and heat to the flexible substrate whereby the bonding agent is pressed against an outer surface of the first and second conduit sections while the bonding agent is heated by the heating element, whereby the bonding agent bonds to the outer surface of the first and second conduit sections.

3. The method of claim 2 wherein at least some of the activateable bonding agent is positioned between an inner side of the flexible substrate and an outer surface of each of the first conduit and the second conduit prior to the pressure being applied.

4. The method of claim 2 wherein at least some of the activateable bonding agent is positioned between an inner side of the flexible substrate and an outer surface of each of the first conduit and the second conduit after the pressure is applied.

5. The method of claim 2 wherein the step of positioning the flexible substrate comprises wrapping the flexible substrate around the exterior surface of the first and second conduits.

6. The method of claim 2 wherein the step of applying pressure comprises positioning an inflatable member around an exterior surface of the flexible substrate and inflating the inflatable member.

7. The method of claim 6 wherein the inflatable member comprises an inflatable annular member and the method further comprises sliding the inflatable member along one of the conduit sections and positioning the inflatable member to overlie at least a portion of the flexible substrate.

8. The method of claim 6 wherein the inflatable member comprises a longitudinally extending member having a first portion that is securable to a second portion and the method further comprises wrapping the longitudinally extending member around at least one of the conduit sections and securing the first portion to the second portion such that the inflatable member overlies at least a portion of the flexible substrate.

9. The method of claim 2 wherein the flexible substrate includes an inflatable member and the step of applying pressure comprises inflating the inflatable member.

10. The method of claim 2 wherein the flexible substrate comprises a plurality of discrete members and step (b) comprises positioning each of the discrete members on an outer portion of each of the first and second conduits.

11. The method of claim 1 wherein the heating element comprises one or more of a resistive heating element, an exothermic reactive composition, an infrared source or a microwave source.

12. The method of claim 11 wherein the step of applying pressure comprises positioning an apparatus comprising an inflatable member around an exterior surface of the flexible substrate.

13. The method of claim 1 wherein the heating element comprises at least one of a resistive heating element and an exothermic reactive composition and the step of heating the bonding agent comprises activating the at least one of the resistive heating element and the exothermic reactive composition.

14. The method of claim 1 wherein the first and second conduit sections comprise a thermoplastic material that has a melting temperature and the heating step comprises heating the bonding agent to a temperature above a melting point of the bonding agent.

15. The method of claim 14 wherein the melting temperature of the bonding agent is less than the melting temperature of the first conduit section and the second conduit section and the method further comprises heating the bonding agent to a temperature less that the melting temperature of the first conduit section and the second conduit section.

16. The method of claim 1 wherein the activateable bonding agent is settable at room temperature and the step of activating the bonding agent comprises exposing the bonding agent to ambient conditions.

17. The method of claim 2 wherein the heating element comprises one or more of a resistive heating element, an exothermic reactive composition, an infrared source or a microwave source.

18. The method of claim 2 wherein the step of applying pressure comprises positioning an apparatus comprising an inflatable member around an exterior surface of the flexible substrate and inflating the inflatable member.

19. The method of claim 2 wherein the first and second conduit sections comprise a thermoplastic material that has a melting temperature and the heating step comprises heating the bonding agent to a temperature above a melting point of the bonding agent.

20. The method of claim 19 wherein the melting temperature of the bonding agent is less than the melting temperature of the first conduit section and the second conduit section and the method further comprises heating the bonding agent to a temperature less that the melting temperature of the first conduit section and the second conduit section.

21. The method of claim 2 wherein the activateable bonding agent is settable at room temperature and the method further comprises exposing the bonding agent to ambient conditions.

* * * * *